(12) United States Patent
Mizuno et al.

(10) Patent No.: US 10,022,996 B2
(45) Date of Patent: Jul. 17, 2018

(54) INFRARED SENSITIVE COLOR-FORMING COMPOSITION, INFRARED CURABLE COLOR-FORMING COMPOSITION, LITHOGRAPHIC PRINTING PLATE PRECURSOR AND PLATE MAKING METHOD

(71) Applicant: FUJIFILM Corporation, Tokyo (JP)

(72) Inventors: Akio Mizuno, Haibara-gun (JP); Shota Suzuki, Haibara-gun (JP); Noriaki Sato, Haibara-gun (JP)

(73) Assignee: FUJIFILM Corporation, Tokyo (JP)

( * ) Notice: Subject to any disclaimer, the term of this patent is extended or adjusted under 35 U.S.C. 154(b) by 281 days.

(21) Appl. No.: 14/836,278

(22) Filed: Aug. 26, 2015

(65) Prior Publication Data
US 2015/0360498 A1  Dec. 17, 2015

Related U.S. Application Data

(63) Continuation of application No. PCT/JP2014/051711, filed on Jan. 27, 2014.

(30) Foreign Application Priority Data

Feb. 27, 2013 (JP) .................................. 2013-037965

(51) Int. Cl.
| | | |
|---|---|---|
| B41M 5/46 | (2006.01) | |
| C09B 69/06 | (2006.01) | |
| C09B 69/04 | (2006.01) | |
| B41M 5/337 | (2006.01) | |
| B41M 5/323 | (2006.01) | |
| C09B 23/01 | (2006.01) | |
| C09B 57/00 | (2006.01) | |
| B41C 1/10 | (2006.01) | |
| G03C 1/685 | (2006.01) | |
| B41N 1/14 | (2006.01) | |
| C09B 23/08 | (2006.01) | |

(52) U.S. Cl.
CPC .......... *B41M 5/465* (2013.01); *B41C 1/1008* (2013.01); *B41M 5/323* (2013.01); *B41M 5/3372* (2013.01); *C09B 23/0025* (2013.01); *C09B 23/0066* (2013.01); *C09B 23/086* (2013.01); *C09B 57/00* (2013.01); *C09B 69/04* (2013.01); *C09B 69/06* (2013.01); *G03C 1/685* (2013.01); *B41C 2210/04* (2013.01); *B41C 2210/08* (2013.01); *B41M 2205/04* (2013.01); *B41N 1/14* (2013.01)

(58) Field of Classification Search
CPC .... B41M 5/465; B41M 5/3372; B41M 5/323; B41M 2205/04; C09B 69/06; C09B 69/04; C09B 23/0066; C09B 23/0025; C09B 57/00; C09B 23/086; B41C 1/1008; B41C 2210/08; B41C 2210/04; G03C 1/685; B41N 1/14
See application file for complete search history.

(56) References Cited

U.S. PATENT DOCUMENTS

| | | |
|---|---|---|
| 5,137,964 A | 8/1992 | Lewis et al. |
| 2003/0064318 A1 | 4/2003 | Huang et al. |
| 2005/0075248 A1 | 4/2005 | Gore et al. |
| 2005/0089782 A1 | 4/2005 | Kasperchik et al. |
| 2005/0100817 A1 | 5/2005 | Kasperchik et al. |
| 2005/0271976 A1 | 12/2005 | Kakino et al. |
| 2006/0024612 A1 | 2/2006 | Oshima et al. |
| 2007/0082291 A1 | 4/2007 | Kakino et al. |
| 2013/0011791 A1* | 1/2013 | Suzuki .................... G03F 7/027 430/284.1 |

FOREIGN PATENT DOCUMENTS

| | | | |
|---|---|---|---|
| CN | 102140120 A | 8/2011 | |
| EP | 1956428 A2 * | 8/2008 | ........... B41C 1/1008 |
| EP | 1956428 A2 | 8/2008 | |

(Continued)

OTHER PUBLICATIONS

Supplemental Partial European Search Report dated Mar. 2, 2016 by the European Patent Office in counterpart European Application No. 14757732.4.

Gustav Kortiim et al: "Spektroskopische Untersuchungen zur Thermo-, Piezo- und Photochromie von Bixanthyliden-(9.9') und Biflavenyliden (4.4')", Jan. 1, 1969 (Jan. 1, 1969), pp. 3033-3045, XP055247560, Chem. Ber 102.

Fabian J: "Near-Infrared Absorbing Dyes", Chemical Reviews, American Chemical Society, US, vol. 92, No. 6, Jan. 1, 1992 (Jan. 1, 1992), pp. 1197-1226, XP001246550, ISSN: 0009-2665, DOI: 10.1021/CR00014A003.

(Continued)

*Primary Examiner* — Peter F Godenschwager
*Assistant Examiner* — Andrew J. Oyer
(74) *Attorney, Agent, or Firm* — Sughrue Mion, PLLC

(57) ABSTRACT

The invention is directed to an infrared sensitive color-forming composition containing a compound having an infrared absorbing skeleton and a thermochromic skeleton in a molecule thereof wherein the infrared absorbing skeleton and the thermochromic skeleton are connected with a covalent bond or an ionic bond and a binder; an infrared curable color-forming composition wherein the infrared sensitive color-forming composition further contains a radical initiator and a polymerizable compound; a lithographic printing plate precursor having an image-recording layer containing the infrared curable color-forming composition on a support; a plate making method including imagewise exposing the lithographic printing plate precursor and conducting on-press development processing by supplying printing ink and dampening water on a printing machine to remove a non-image area; a compound represented by the formula (7) as defined herein; and a compound represented by the formula (8) as defined herein.

7 Claims, No Drawings

(56) References Cited

FOREIGN PATENT DOCUMENTS

| | | | |
|---|---|---|---|
| JP | 2-293737 | A | 12/1990 |
| JP | 11-277927 | A | 10/1999 |
| JP | 2000-335129 | A | 12/2000 |
| JP | 2001-277740 | A | 10/2001 |
| JP | 2001-277742 | A | 10/2001 |
| JP | 2002-287334 | A | 10/2002 |
| JP | 2003-191657 | A | 7/2003 |
| JP | 2005-262708 | A | 9/2005 |
| JP | 2006-96027 | A | 4/2006 |
| JP | 2006-117629 | A | 5/2006 |
| JP | 2006-525881 | A | 11/2006 |
| JP | 2007-90850 | A | 4/2007 |
| JP | 2011-213114 | A | 10/2011 |

OTHER PUBLICATIONS

Extended European Search Report dated Jun. 29, 2016, issued by the European Patent Office in counterpart European Application No. 14757732.4.
Search Report dated Apr. 15, 2014 issued by the International Searching Authority in counterpart International Patent Application No. PCT/JP2014/051711 (PCT/ISA/210).
Written Opinion dated Apr. 15, 2014 issued by the International Searching Authority in counterpart International Patent Application No. PCT/JP2014/051711 (PCT/ISA/237).

* cited by examiner

INFRARED SENSITIVE COLOR-FORMING COMPOSITION, INFRARED CURABLE COLOR-FORMING COMPOSITION, LITHOGRAPHIC PRINTING PLATE PRECURSOR AND PLATE MAKING METHOD

CROSS REFERENCE TO RELATED APPLICATION

This is a continuation of International Application No. PCT/JP2014/051711 filed on Jan. 27, 2014, and claims priority from Japanese Patent Application No. 2013-037965 filed on Feb. 27, 2013, the entire disclosures of which are incorporated herein by reference.

TECHNICAL FIELD

The present invention relates to an infrared sensitive color-forming composition, an infrared curable color-forming composition, and a lithographic printing plate precursor in which the infrared curable color-forming composition is applied to an image-recording layer and a plate making method using the same. More specifically, it relates to a lithographic printing plate precursor capable of direct plate making by image exposure with laser, and a plate making method in which the lithographic printing plate precursor is on-press developed.

BACKGROUND ART

In general, a lithographic printing plate is composed of an oleophilic image area accepting ink and a hydrophilic non-image area accepting dampening water in the process of printing. Lithographic printing is a printing method utilizing the nature of water and oily ink to repel with each other and comprising rendering the oleophilic image area of the lithographic printing plate to an ink-receptive area and the hydrophilic non-image area thereof to a dampening water-receptive area (ink-unreceptive area), thereby making a difference in adherence of the ink on the surface of the lithographic printing plate, depositing the ink only to the image area, and then transferring the ink to a printing material, for example, paper.

In order to produce the lithographic printing plate, a lithographic printing plate precursor (PS plate) comprising a hydrophilic support having provided thereon an oleophilic photosensitive resin layer (image-recording layer) is heretofore used. Specifically, the PS plate is exposed through a mask, for example, a lith film, and then subjected to development processing, for example, with an alkaline developer to remove the unnecessary image-recording layer corresponding to the non-image area by dissolving while leaving the image-recording layer corresponding to the image area, thereby obtaining the lithographic printing plate.

Due to the recent progress in the technical field, nowadays the lithographic printing plate can be obtained by a CTP (computer-to-plate) technology. Specifically, a lithographic printing plate precursor is directly subjected to scanning exposure using laser or laser diode without using a lith film and developed to obtain a lithographic printing plate.

With the progress described above, the issue on the lithographic printing plate precursor has transferred to improvements, for example, in image-forming property corresponding to the CTP technology, printing property or physical property. Also, with the increasing concern about global environment, as another issue on the lithographic printing plate precursor, an environmental problem on waste liquid discharged accompanying the wet treatment, for example, development processing comes to the front.

In response to the environmental problem, simplification of development or plate making or non-processing has been pursued. As one method of simple plate making, a method referred to as an "on-press development" is practiced. Specifically, according to the method after exposure of a lithographic printing plate precursor, the lithographic printing plate precursor is mounted as it is on a printing machine without conducting conventional development and removal of the unnecessary area of image-recording layer is performed at an early stage of usual printing process.

In the simplification of plate making operation as described above, a system using a lithographic printing plate precursor capable of being handled in a bright room or under a yellow lamp and a light source is preferred from the standpoint of workability. Thus, as the light source, a semiconductor laser emitting an infrared ray having a wavelength of 760 to 1,200 or a solid laser, for example, YAG laser, is used. An UV laser is also used.

As the lithographic printing plate precursor capable of undergoing on-press development, for instance, a lithographic printing plate precursor having provided on a hydrophilic support, an image-recording layer (heat-sensitive layer) containing microcapsules having a polymerizable compound encapsulated therein is described in Patent Documents 1 and 2. Also, a lithographic printing plate precursor having provided on a support, an image-recording layer (photosensitive layer) containing an infrared absorbing dye, a radical polymerization initiator and a polymerizable compound is described in Patent Document 3. Further, a lithographic printing plate precursor capable of undergoing on-press development having provided on a support, an image-recording layer containing a polymerizable compound and a graft polymer having a polyethylene oxide chain in its side chain or a block polymer having a polyethylene oxide block is described in Patent Document 4.

In general, an operation (plate inspection) for inspection and discrimination of image formed on a printing plate is carried out in order to examine whether the image is recorded on the printing plate as intended, in advance of mounting the printing plate on a printing machine. In a conventional lithographic printing plate precursor subjected to a development processing step, since a color image is ordinarily obtained due to the development processing by means of coloration of the image-recording layer it is easily performed to confirm the image formed before the mounting the printing plate on a printing machine.

With respect to the lithographic printing plate precursor of the on-press development type or non-processing (non-development) type without accompanying the development processing, the image is not recognized on the lithographic printing plate precursor in the step of mounting lithographic printing plate precursor on a printing machine, and thus the plate inspection cannot be performed. In particular, it is vital in the printing operation to determine whether a registry guide (register mark) which acts as a landmark for the register in multicolor printing is recorded. Therefore, in the lithographic printing plate precursor of the on-press development type or non-processing (non-development) type, a means for confirming the image, that is, color formation or decoloration in the exposed area to form a so-called print-out image is required at the stage of exposure. Further, from the standpoint of improvement in the workability, it is required that the exposed area color-formed or decolored does not change after the lapse of time and the color-formed or decolored state is maintained.

A lithographic printing plate precursor is proposed wherein a compound capable of generating an acid, base or radical by means of light or heat and a compound capable of undergoing color change upon interaction with the acid, base or radical generated are used as a print-out agent (for example, see Patent Document 5). Also, it is proposed to utilize color change of thermally decomposable compound as the print-out agent of a direct-drawing type lithographic printing plate precursor having a heat-sensitive layer (for example, see Patent Document 6). Further, it is proposed to use a thermally decomposable dye having a thermally decomposable temperature of 250° C. or below as the print-out agent (for example, see Patent Document 7).

According to these techniques, although the color formation or decoloration occurs in the exposed area and the plate inspection property increases to some extent, it is still insufficient.

In Patent Document 8, a system containing an infrared absorbing dye of cyanine dye having a 5-membered ring in its methine chain and a radical generator is described. However, the technique is still insufficient in view of maintaining the good visibility after the lapse of time.

In Patent Document 9, a lithographic printing plate precursor having an image-recording layer containing a microgel having a polymer having a glass transfer temperature of 50° C. or more, a photoinitiator, an infrared absorbing dye and a spiropyran or spirooxazine acid color-forming agent incorporated therein is described. According to the technique, a certain level of improvement is observed as to the color-forming property and the color fading after the color formation, but the plate inspection property is still insufficient in comparison with a lithographic printing plate precursor subjected to a conventional development processing step, and further improvements have been required.

PRIOR ART DOCUMENT

Patent Document

Patent Document 1: JP-A-2001-277740
Patent Document 2: JP-A-2001-277742
Patent Document 3: JP-A-2002-287334
Patent Document 4: U.S. Patent Publication No. 2003/0064318
Patent Document 5: JP-A-11-277927
Patent Document 6: JP-A-2000-335129
Patent Document 7: JP-A-2003-191657
Patent Document 8: JP-A-2007-90850
Patent Document 9: JP-A-2011-213114

DISCLOSURE OF THE INVENTION

Problems that the Invention is to Solve

An object of the present invention is to provide a light-sensitive color-forming composition and a curable color-forming composition each of which forms color at a high density by exposure with an infrared laser and has a small fading due to aging. Another object of the invention is to provide a lithographic printing plate precursor which contains the curable color-forming composition in the image-recording layer, is extremely excellent in the plate inspection property, has a good preservation stability and maintains a high color-forming property, is excellent in the on-press development property, and provides a lithographic printing plate having a good printing durability. Still another object of the invention is to provide a plate making method of producing a lithographic printing plate using the lithographic printing plate precursor described above.

Means for Solving the Problems

The objects of the present invention are achieved by an infrared sensitive color-forming composition, an infrared curable color-forming composition, a lithographic printing plate precursor and a plate making method described below.
(1) An infrared sensitive color-forming composition containing (A) a compound having an infrared absorbing skeleton and a thermochromic skeleton in its molecule wherein the infrared absorbing skeleton and the thermochromic skeleton are connected with a covalent bond or an ionic bond, and (B) a binder.
(2) The infrared sensitive color-forming composition as described in (1) above, wherein the compound is represented by formula (1-1) shown below:

In formula (1-1), A represents a thermochromic skeleton, B1 represents a single bond or a connecting group, and C1 represents an infrared absorbing skeleton.
(3) The infrared sensitive color-forming composition as described in (1) or (2) above, wherein the infrared absorbing skeleton is a cyanine dye skeleton.
(4) The infrared sensitive color-forming composition as described in any one of (1) to (3) above, wherein the infrared absorbing skeleton is a cyanine dye residue represented by formula (2) shown below:

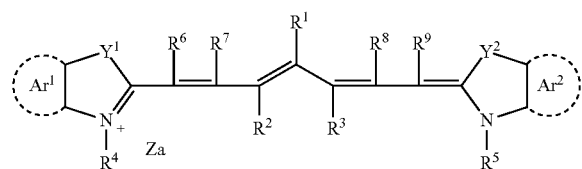

In formula (2), $R^1$ represents a hydrogen atom, a halogen atom, $-OR^{10}$, $-N(R^{11})(R^{12})$ or $-SR^{13}$. $R^{10}$ and $R^{13}$ each represents an alkyl group or an aryl group, and $R^{11}$ and $R^{12}$ each represents a hydrogen atom, an alkyl group or an aryl group, or $R^{11}$ and $R^{12}$ may be combined with each other to form a ring. $R^2$ and $R^3$ each represents a hydrogen atom or an alkyl group, or $R^2$ and $R^3$ may be combined with each other to form a ring. $Ar^1$ and $Ar^2$ each represents an atomic group necessary for forming a benzene ring or a naphthalene ring. $Y^1$ and $Y^2$ each represents a sulfur atom or a dialkylmethylene group. $R^4$ and $R^5$ each represents an alkyl group. $R^6$, $R^7$, $R^8$ and $R^9$ each represents a hydrogen atom or an alkyl group. Za represents a counter ion for neutralizing an electric charge. The cyanine dye residue is connected to the thermochromic skeleton in any of $R^1$, $R^4$ and $R^5$.
(5) The infrared sensitive color-forming composition as described in (4) above, wherein the infrared absorbing skeleton is a cyanine dye residue represented by formula (3) shown below:

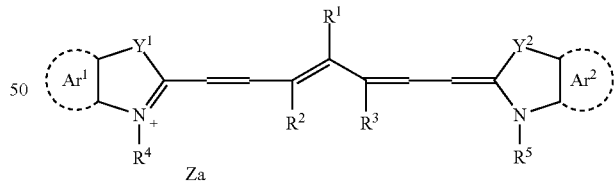

In formula (3), $R^1$ represents a hydrogen atom, a halogen atom, $-OR^{10}$, $-N(R^{11})(R^{12})$ or $-SR^{13}$. $R^{10}$ and $R^{13}$ each represents an alkyl group or an aryl group, and $R^{11}$ and $R^{12}$ each represents a hydrogen atom, an alkyl group or an aryl group, or $R^{11}$ and $R^{12}$ may be combined with each other to form a ring. $R^2$ and $R^3$ each represents a hydrogen atom or an alkyl group, or $R^2$ and $R^3$ may be combined with each other to form a ring. $Ar^1$ and $Ar^2$ each represents an atomic group necessary for forming a benzene ring or a naphthalene ring. $Y^1$ and $Y^2$ each represents a sulfur atom or a dialkylmethylene group. $R^4$ and $R^5$ each represents an alkyl group. Za represents a counter ion for neutralizing an electric charge. The cyanine dye residue is connected to the thermochromic skeleton in $R^1$.

(6) The infrared sensitive color-forming composition as described in any one of (1) to (5) above, wherein the thermochromic skeleton has a structure represented by formula (4) shown below:

(4)

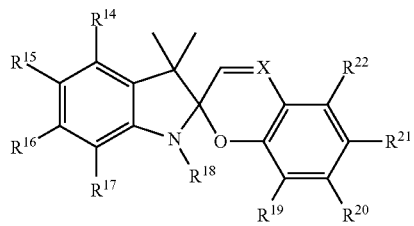

In formula (4), $R^{14}$ to $R^{22}$ each represents a hydrogen atom, a halogen atom, an alkyl group, an aryl group, $-OR^{23}$, $-NR^{24}R^{25}$, $-SR^{26}$ or a nitro group, or any adjacent two of $R^{14}$ to $R^{22}$ may be combined with each other to form a ring. $R^{23}$, $R^{24}$, $R^{25}$ and $R^{26}$ each represents a hydrogen atom or an alkyl group, or $R^{24}$ and $R^{25}$ may be combined with each other to form a ring. X represents a carbon atom or a nitrogen atom. The thermochromic skeleton is connected to the infrared absorbing skeleton in any of $R^{18}$, $R^{20}$ and $R^{22}$.

(7) The infrared sensitive color-forming composition as described in (6) above, wherein the thermochromic skeleton has a structure represented by formula (5) shown below:

(5)

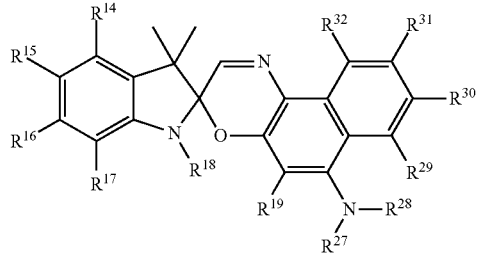

In formula (5), $R^{14}$ to $R^{19}$ each represents a hydrogen atom, a halogen atom, an alkyl group, an aryl group, $-OR^{23}$, $-NR^{24}R^{25}$, $-SR^{26}$ or a nitro group, or any adjacent two of $R^{14}$ to $R^{19}$ may be combined with each other to form a ring. $R^{23}$, $R^{24}$, $R^{25}$ and $R^{26}$ each represents a hydrogen atom or an alkyl group, or $R^{24}$ and $R^{25}$ may be combined with each other to form a ring. X represents a carbon atom or a nitrogen atom. $R^{27}$ and $R^{28}$ each represents an alkyl group or an aryl group, or $R^{27}$ and $R^{28}$ may be combined with each other to form a ring. $R^{29}$ to $R^{32}$ each represents a hydrogen atom, a halogen atom, an alkyl group, an aryl group, $-OR^{23}$, $-NR^{24}R^{25}$ or $-SR^{26}$. The thermochromic skeleton is connected to the infrared absorbing skeleton in any of $R^{27}$, $R^{28}$ and $R^{31}$.

(8) The infrared sensitive color-forming composition as described in any one of (1) to (7) above, wherein the compound is a compound represented by formula (6-1), (6-2) or (6-3) shown below:

(6-1)

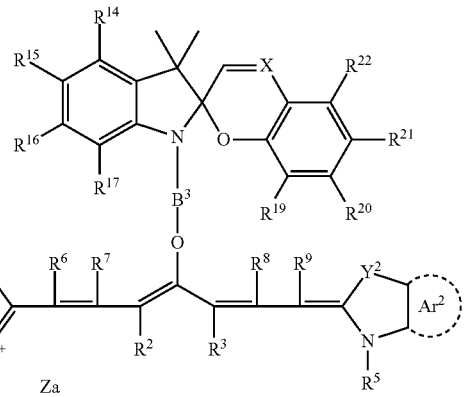

(6-2)

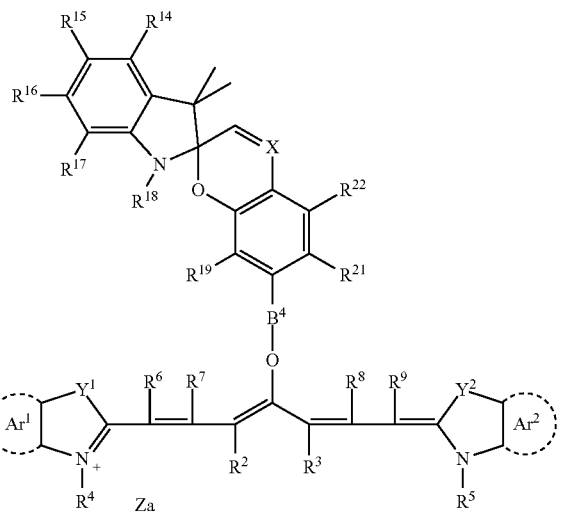

(6-3)

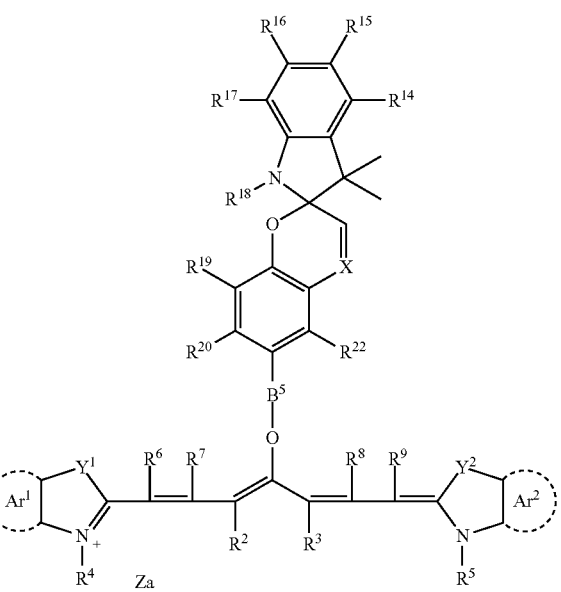

In formulae (6-1), (6-2) and (6-3), $R^2$ and $R^3$ each represents an alkyl group, or $R^2$ and $R^3$ may be combined with each other to form a ring. $Ar^1$ and $Ar^2$ each represents an atomic group necessary for forming a benzene ring or a naphthalene ring. $Y^1$ and $Y^2$ each represents a sulfur atom or a dialkylmethylene group. $R^4$ and $R^5$ each represents an alkyl group. $R^6$, $R^7$, $R^8$ and $R^9$ each represents a hydrogen atom or an alkyl group. Za represents a counter ion for neutralizing an electric charge. $B^3$, $B^4$ and $B^5$ each represents a single bond or a connecting group. $R^{14}$ to $R^{22}$ each represents a hydrogen atom, a halogen atom, an alkyl group, an aryl group, $-OR^{23}$, $-NR^{24}R^{25}$, $-SR^{26}$ or a nitro group, or any adjacent two of $R^{14}$ to $R^{22}$ may be combined with each other to form a ring. $R^{23}$, $R^{24}$, $R^{25}$ and $R^{26}$ each represents a hydrogen atom or an alkyl group, or $R^{24}$ and $R^{25}$ may be combined with each other to form a ring. X represents a carbon atom or a nitrogen atom.

(9) The infrared sensitive color-forming composition as described in (8) above, wherein the compound is a compound represented by formula (6-4) shown below:

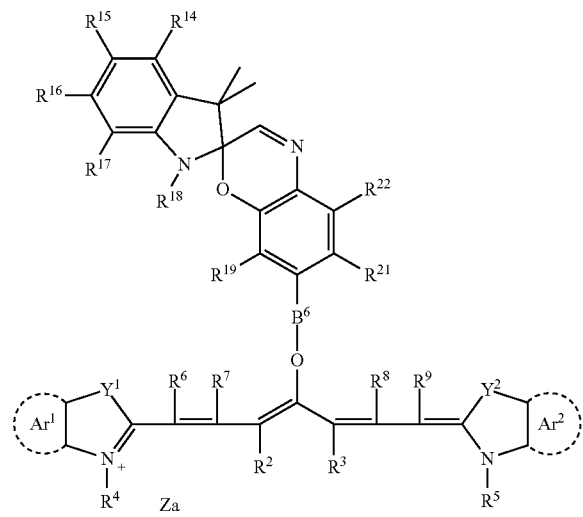

(6-4)

In formula (6-4), $R^2$ and $R^3$ each represents an alkyl group, or $R^2$ and $R^3$ may be combined with each other to form a ring. $Ar^1$ and $Ar^2$ each represents an atomic group necessary for forming a benzene ring or a naphthalene ring. $Y^1$ and $Y^2$ each represents a sulfur atom or a dialkylmethylene group. $R^4$ and $R^5$ each represents an alkyl group. $R^6$, $R^7$, $R^8$ and $R^9$ each represents a hydrogen atom or an alkyl group. Za represents a counter ion for neutralizing an electric charge. $B^6$ represents an alkylene group having 10 or less carbon atoms, which may contain a nitrogen atom. $R^{14}$ to $R^{19}$ and $R^{21}$ to $R^{22}$ each represents a hydrogen atom, a halogen atom, an alkyl group, an aryl group, $-OR^{23}$, $-NR^{24}R^{25}$, $-SR^{26}$ or a nitro group, or any adjacent two of $R^{14}$ to $R^{19}$ and $R^{21}$ to $R^{22}$ may be combined with each other to form a ring. $R^{23}$, $R^{24}$, $R^{25}$ and $R^{26}$ each represents a hydrogen atom or an alkyl group, or $R^{24}$ and $R^{25}$ may be combined with each other to form a ring.

(10) The infrared sensitive color-forming composition as described in (1) above, wherein the compound is represented by formula (1-2) shown below:

A-B2-D1••D2-C2    (1-2)

In formula (1-2), A represents a thermochromic skeleton, B2 represents a single bond or a connecting group, D1 represents an ionic group, D2 represents an ionic group having a polarity opposite to that of D1, C2 represents an infrared absorbing skeleton, and •• represents an ionic bond.

(11) The infrared sensitive color-forming composition as described in (10) above, wherein the infrared absorbing skeleton is a cyanine dye skeleton.

(12) The inf
rared sensitive color-forming composition as described in any one of (1), (10) and (11) above, wherein the compound is a compound represented by formula (6-5), (6-6) or (6-7) shown below:

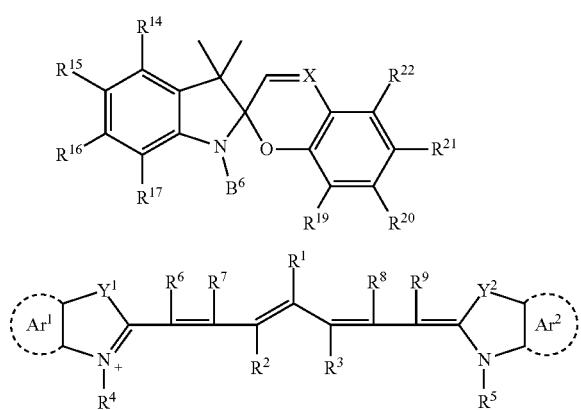

(6-5)

-continued (6-6)

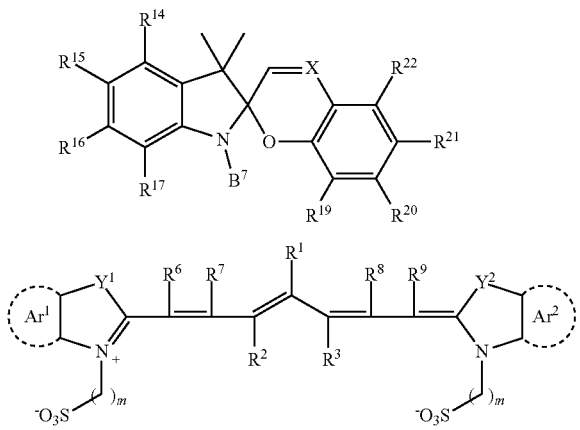

(6-7)

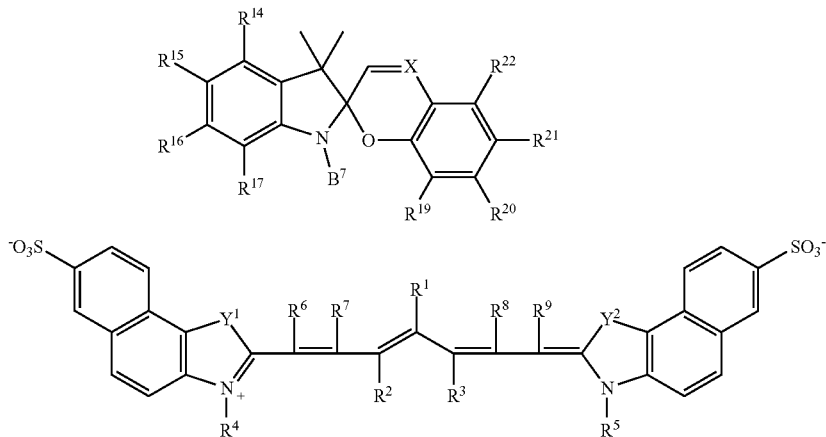

In formula (6-5), $R^1$ represents a hydrogen atom, a halogen atom, $-OR^{10}$, $-N(R^{11})(R^{12})$ or $-SR^{13}$. $R^{10}$ and $R^{13}$ each represents an alkyl group or an aryl group, and $R^{11}$ and $R^{12}$ each represents a hydrogen atom, an alkyl group or an aryl group, or $R^{11}$ and $R^{12}$ may be combined with each other to form a ring. $R^2$ and $R^3$ each represents an alkyl group, or $R^2$ and $R^3$ may be combined with each other to form a ring. $Ar^1$ and $Ar^2$ each represents an atomic group necessary for forming a benzene ring or a naphthalene ring. $Y^1$ and $Y^2$ each represents a sulfur atom or a dialkylmethylene group. $R^4$ and $R^5$ each represents an alkyl group. $R^6$, $R^7$, $R^8$ and $R^9$ each represents a hydrogen atom or an alkyl group. $R^{14}$ to $R^{17}$ and $R^{19}$ to $R^{22}$ each represents a hydrogen atom, a halogen atom, an alkyl group, an aryl group, $-OR^{23}$, $-NR^{24}R^{25}$, $-SR^{26}$ or a nitro group, or any adjacent two of $R^{14}$ to $R^{17}$ and $R^{19}$ to $R^{22}$ may be combined with each other to form a ring. $R^{23}$, $R^{24}$, $R^{25}$ and $R^{26}$ each represents a hydrogen atom or an alkyl group, or $R^{24}$ and $R^{25}$ may be combined with each other to form a ring. X represents a carbon atom or a nitrogen atom. $B^6$ represents a connecting group having an anionic group, and the anionic group and a cationic site of the infrared absorbing skeleton are connected with an ionic bond.

In formula (6-6), $R^1$ represents a hydrogen atom, a halogen atom, $-OR^{10}$, $-N(R^{11})(R^{12})$ or $-SR^{13}$. $R^{10}$ and $R^{13}$ each represents an alkyl group or an aryl group, and $R^{11}$ and $R^{12}$ each represents a hydrogen atom, an alkyl group or an aryl group, or $R^{11}$ and $R^{12}$ may be combined with each other to form a ring. $R^2$ and $R^3$ each represents an alkyl group, or $R^2$ and $R^3$ may be combined with each other to form a ring. $Ar^1$ and $Ar^2$ each represents an atomic group necessary for forming a benzene ring or a naphthalene ring. $Y^1$ and $Y^2$ each represents a sulfur atom or a dialkylmethylene group. $R^6$, $R^7$, $R^8$ and $R^9$ each represents a hydrogen atom or an alkyl group. m represents an integer of 3 or 4. $R^{14}$ to $R^{17}$ and $R^{19}$ to $R^{22}$ each represents a hydrogen atom, a halogen atom, an alkyl group, an aryl group, $-OR^{23}$, $-NR^{24}R^{25}$, $-SR^{26}$ or a nitro group, or any adjacent two of $R^{14}$ to $R^{17}$ and $R^{19}$ to $R^{22}$ may be combined with each other to form a ring. $R^{23}$, $R^{24}$, $R^{25}$ and $R^{26}$ each represents a hydrogen atom or an alkyl group, or $R^{24}$ and $R^{25}$ may be combined with each other to form a ring. X represents a carbon atom or a nitrogen atom. $B^7$ represents a connecting group having a cationic group, and the cationic group and an anionic site of the infrared absorbing skeleton are connected with an ionic bond.

In formula (6-7), $R^1$ represents a hydrogen atom, a halogen atom, $-OR^{10}$, $-N(R^{11})(R^{12})$ or $-SR^{13}$. $R^{10}$ and $R^{13}$ each represents an alkyl group or an aryl group, and $R^{11}$ and $R^{12}$ each represents a hydrogen atom, an alkyl group or an aryl group, or $R^{11}$ and $R^{12}$ may be combined with each other to form a ring. $R^2$ and $R^3$ each represents an alkyl group, or $R^2$ and $R^3$ may be combined with each other to form a ring. $Y^1$ and $Y^2$ each represents a sulfur atom or a dialkylmethylene group. $R^4$ and $R^5$ each represents an alkyl group. $R^6$, $R^7$, $R^8$ and $R^9$ each represents a hydrogen atom or an alkyl group. $R^{14}$ to $R^{17}$ and $R^{19}$ to $R^{22}$ each represents a hydrogen atom, a halogen atom, an alkyl group, an aryl group, $-OR^{23}$, $-NR^{24}R^{25}$, $-SR^{26}$ or a nitro group, or any adjacent two of $R^{14}$ to $R^{17}$ and $R^{19}$ to $R^{22}$ may be combined with each other to form a ring. $R^{23}$, $R^{24}$, $R^{25}$ and $R^{26}$ each represents a hydrogen atom or an alkyl group, or $R^{24}$ and $R^{25}$ may be combined with each other to form a ring. X represents a carbon atom or a nitrogen atom. $B^7$ represents a connecting group having a cationic group, and the cationic group and an anionic site of the infrared absorbing skeleton are connected with an ionic bond.

(13) An infrared curable color-forming composition, wherein the infrared sensitive color-forming composition as described in any one of (1) to (12) above further contains (C) a radical initiator and (D) a polymerizable compound.

(14) A lithographic printing plate precursor having an image-recording layer comprising the infrared curable color-forming composition as described in (13) above on a support.

(15) The lithographic printing plate precursor as described in (14) above, wherein the binder contains an alkylene oxide chain.

(16) The lithographic printing plate precursor as described in (14) or (15) above, wherein the image-recording layer contains a hydrophobizing precursor.

(17) The lithographic printing plate precursor as described in any one of (14) to (16) above, which has a protective layer on the image-recording layer.

(18) A plate making method comprising imagewise exposing the lithographic printing plate precursor as described in any one of (14) to (17) above and then conducting on-press development processing by supplying printing ink and dampening water on a printing machine to remove a non-image area.

(19) A compound represented by formula (7) shown below:

(7)

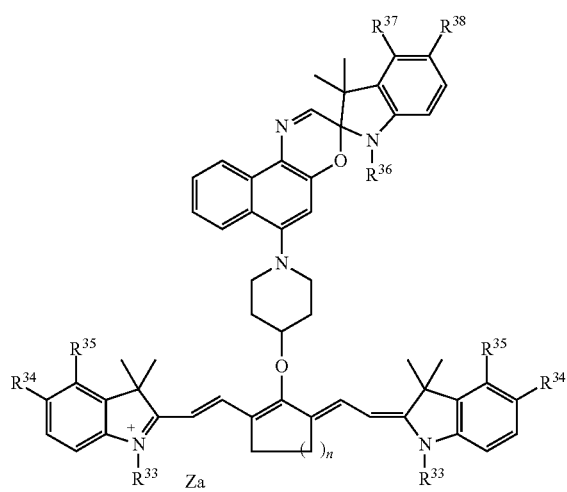

In formula (7), $R^{33}$ and $R^{36}$ each represents an alkyl group. $R^{34}$, $R^{35}$, $R^{37}$ and $R^{38}$ each represents a hydrogen atom or an alkyl group, or $R^{34}$ and $R^{35}$ and $R^{37}$ and $R^{38}$ each may be combined with each other to form a benzene ring. n represents an integer of 1 or 2. Za represents a hexafluorophosphate ion, a paratoluenesulfonate ion or a perchlorate ion.

(20) A compound represented by formula (8) shown below:

(8)

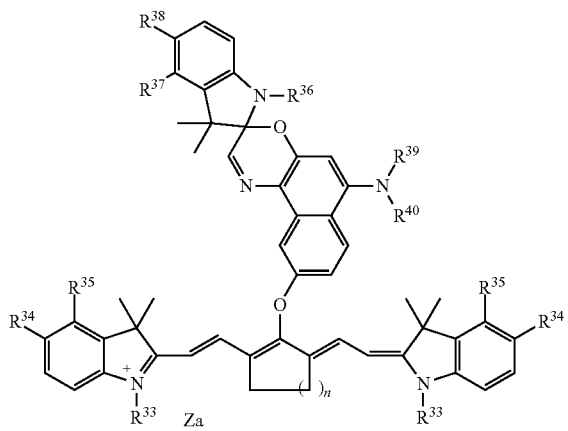

In formula (8), $R^{33}$ and $R^{36}$ each represents an alkyl group. $R^{34}$, $R^{35}$, $R^{37}$ and $R^{38}$ each represents a hydrogen atom or an alkyl group, or $R^{34}$ and $R^{35}$ and $R^{37}$ and $R^{38}$ each may be combined with each other to form a benzene ring. $R^{39}$ and $R^{40}$ each represents an alkyl group, or $R^{39}$ and $R^{40}$ may be combined with each other to form a ring. n represents an integer of 1 or 2. Za represents a hexafluorophosphate ion, a paratoluenesulfonate ion or a perchlorate ion.

The invention is characterized by using a compound having an infrared absorbing skeleton and a thermochromic skeleton in its molecule wherein the infrared absorbing skeleton and the thermochromic skeleton are connected with a covalent bond or an ionic bond. The compound has the structural feature in which the infrared absorbing skeleton and the thermochromic skeleton are present in the same molecule, and it is believed that the heat which is generated at the time of radiationless deactivation of the infrared absorbing skeleton from the excited state caused by infrared exposure is extremely efficiently transferred to the thermochromic skeleton to accelerate the color formation of the thermochromic skeleton, whereby the color formation of high density can be obtained. Therefore, a lithographic printing plate precursor having an image-recording layer containing the compound having the specific structure described above produces the colored image of high density, thereby exhibiting the extremely excellent plate inspection property.

Advantage of the Invention

According to the invention, an infrared-sensitive color-forming composition and an infrared curable color-forming composition each of which forms color at a high density by exposure with an infrared laser and has a small fading due to aging can be provided. Also, a lithographic printing plate precursor which contains the infrared curable color-forming composition in the image-recording layer, is extremely excellent in the plate inspection property, has a good preservation stability and maintains a high color-forming property, is excellent in the on-press development property, and provides a lithographic printing plate having a good printing durability can be obtained. Further, a plate making method of producing a lithographic printing plate precursor by image exposing the lithographic printing plate precursor with infrared ray and then performing on-press development can be provided.

MODE FOR CARRYING OUT THE INVENTION

In the specification, with respect to the description of a group in a compound represented by a formula, when the group is not indicated whether substituted or unsubstituted, unless otherwise indicated specifically, the group includes not only the unsubstituted group but also the substituted group, if the group is able to have a substituent. For example, the description "R represents an alkyl group, an aryl group or a heterocyclic group" in a formula means that "R represents an unsubstituted alkyl group, a substituted alkyl group, an unsubstituted aryl group, a substituted aryl group, an unsubstituted heterocyclic group or a substituted heterocyclic group".

[Infrared Sensitive Color-forming Composition]

The infrared sensitive color-forming composition according to the invention contains (A) a compound having an infrared absorbing skeleton and a thermochromic skeleton in its molecule wherein the infrared absorbing skeleton and the thermochromic skeleton are connected with a covalent bond or an ionic bond, and (B) a binder.

[(A) Compound Having Infrared Absorbing Skeleton and Thermochromic Skeleton in its Molecule Wherein Infrared Absorbing Skeleton and Thermochromic Skeleton are Connected with Covalent Bond or Ionic Bond]

In the compound (A) having an infrared absorbing skeleton and a thermochromic skeleton in its molecule wherein the infrared absorbing skeleton and the thermochromic skeleton are connected with a covalent bond or an ionic bond (hereinafter, also referred to as a specific color-forming compound), the thermochromic skeleton is colored with heat generated from the infrared absorbing skeleton at the time of infrared exposure. The term "color formation" as used herein refers to that there is little absorption in the visible light region (wavelength range from 400 to 750 nm) before infrared exposure, but an absorption arises in the visible light region by the infrared exposure, and also includes that an absorption in a wavelength region shorter than the visible light region is shifted longer to the visible light region. As to the wavelength range of the absorption after the color formation, from the standpoint of visibility, the maximum absorption wavelength (λmax) is preferably in the range from 450 to 650 nm, and more preferably in the range from 500 to 600 nm.

As to the specific color-forming compound according to the invention, the structure thereof is not particularly limited as long as it is a compound having an infrared absorbing skeleton and a thermochromic skeleton in its molecule wherein the infrared absorbing skeleton and the thermochromic skeleton are connected with a covalent bond or an ionic bond. In the specific color-forming compound according to the invention, a form of the connection between the infrared absorbing skeleton and the thermochromic skeleton includes a covalent bond and an ionic bond. From the standpoint of heat color-forming property, the connection between the both skeletons is more preferably a covalent bond.

As one preferred embodiment of the specific color-forming compound according to the invention, a compound represented by formula (1-1) shown below is exemplified.

A-B1-C1     (1-1)

In formula (1-1), A represents a thermochromic skeleton, B1 represents a single bond or a connecting group, and C1 represents an infrared absorbing skeleton.

(Infrared Absorbing Skeleton)

The infrared absorbing skeleton represented by C1 in formula (1-1) is a skeleton having an infrared absorbing performance, and preferably includes a skeleton of an infrared absorbing dye, that is, a structure of a bond formed by removing one atom from the infrared absorbing dye (infrared absorbing dye residue).

The infrared absorbing skeleton includes an infrared absorbing dye skeleton, for example, an azo dye skeleton, a pyrazolone azo dye skeleton, a naphthoquinone dye skeleton, an anthraquinone dye skeleton, a phthalocyanine dye skeleton, a carbonium dye skeleton, a quinoneimine dye skeleton, a methine dye skeleton, a cyanine dye skeleton, a squarylium dye skeleton or a pyrylium salt dye skeleton.

Of the infrared absorbing skeletons, a cyanine dye skeleton is preferably exemplified. Of the cyanine dye skeletons, a cyanine dye residue represented by formula (1) shown below is exemplified as a preferred example.

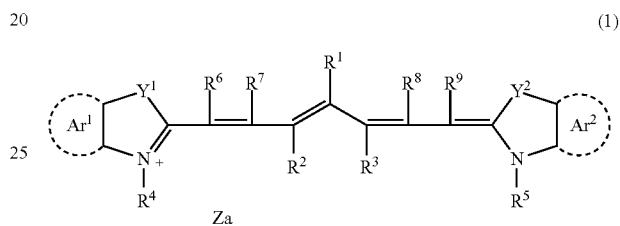

(1)

In formula (1), $R^1$ represents a hydrogen atom, a halogen atom, $-OR^{10}$, $-N(R^{11})(R^{12})$ or $-SR^{13}$. $R^{10}$ and $R^{13}$ each represents an alkyl group or an aryl group, and $R^{11}$ and $R^{12}$ each represents a hydrogen atom, an alkyl group or an aryl group, or $R^{11}$ and $R^{12}$ may be combined with each other to form a ring. $R^2$ and $R^3$ each represents a hydrogen atom or an alkyl group, or $R^2$ and $R^3$ may be combined with each other to form a ring. $Ar^1$ and $Ar^2$ each represents an atomic group necessary for forming an aryl group or a heteroaryl group. $Y^1$ and $Y^2$ each represents an oxygen atom, a sulfur atom or a dialkylmethylene group. $R^4$ and $R^5$ each represents an alkyl group. $R^6$, $R^7$, $R^8$ and $R^9$ each represents a hydrogen atom or an alkyl group. Za represents a counter ion for neutralizing an electric charge. The cyanine dye residue is connected to the thermochromic skeleton in any of $R^1$, $R^4$ and $R^5$.

Of the cyanine dye skeletons, a cyanine dye residue represented by formula (2) shown below is exemplified as a particularly preferred example.

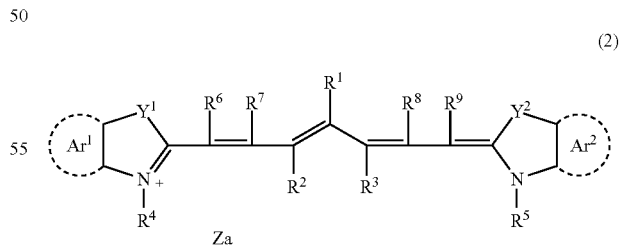

(2)

In formula (2), $R^1$ represents a hydrogen atom, a halogen atom, $-OR^{10}$, $-N(R^{11})(R^{12})$ or $-SR^{13}$. $R^{10}$ and $R^{13}$ each represents an alkyl group or an aryl group, and $R^{11}$ and $R^{12}$ each represents a hydrogen atom, an alkyl group or an aryl group, or $R^{11}$ and $R^{12}$ may be combined with each other to form a ring. $R^2$ and $R^3$ each represents a hydrogen atom or an alkyl group, or $R^2$ and $R^3$ may be combined with each other to form a ring. $Ar^1$ and $Ar^2$ each represents an atomic group necessary for forming a benzene ring or a naphthalene ring. $Y^1$ and $Y^2$ each represents a sulfur atom or a dialkylmethylene group. $R^4$ and $R^5$ each represents an alkyl group. $R^6$, $R^7$, $R^8$ and $R^9$ each represents a hydrogen atom or an alkyl group. Za represents a counter ion for neutralizing an electric charge. The cyanine dye residue is connected to the thermochromic skeleton in any of $R^1$, $R^4$ and $R^5$.

The alkyl group represented by any of $R^2$ to $R^{13}$ is preferably an alkyl group having from 1 to 20 carbon atoms, more preferably an alkyl group having from 1 to 10 carbon atoms, and particularly preferably an alkyl group having from 1 to 4 carbon atoms.

Specifically, for example, a methyl group, an ethyl group, a propyl group, a butyl group, a pentyl group, a hexyl group, a heptyl group, an octyl group, a nonyl group, a decyl group, an undecyl group, a dodecyl group, a tridecyl group, a hexadecyl group, an octadecyl group, an eicosyl group, an isopropyl group, an isobutyl group, a sec-butyl group, a tert-butyl group, an isopentyl group, a neopentyl group, a 1-methylbutyl group, an isohexyl group, a 2-ethylhexyl group, 2-methylhexyl group, a cyclohexyl group, a cyclopentyl group and a 2-norbornyl group are exemplified. Of the alkyl groups, a methyl group, an ethyl group, a propyl group and a butyl group are particularly preferred.

The alkyl group may have a substituent, and examples of the substituent include an alkoxy group, an amino group, an alkylsulfide group and a halogen atom.

The aryl group represented by any of $R^{10}$ to $R^{13}$ is preferably an aryl group having from 6 to 30 carbon atoms, more preferably an aryl group having from 6 to 20 carbon atoms, and particularly preferably an aryl group having from 6 to 12 carbon atoms.

Specifically, for example, a phenyl group, a 1-naphthyl group, a 2-naphthyl group, an o-, m- or p-tolyl group, a p-chlorophenyl group, a p-bromophenyl group, a p-fluorophenyl group, an o-chlorophenyl group, an o-bromophenyl group, an o-fluorophenyl group, a m-chlorophenyl group, a m-bromophenyl group, a m-fluorophenyl group, a p-methoxyphenyl group, a m-methoxyphenyl group, p-dimethylaminophenyl group, a p-methylthiophenyl group, a m-methylthiophenyl group and a p-phenylthiophenyl group are exemplified. Of the aryl groups, a phenyl group is particularly preferred.

The aryl group may have a substituent, and examples of the substituent include an alkoxy group, an amino group, an alkylsulfide group and a halogen atom.

In the case where $R^2$ and $R^3$ are combined with each other to form a ring, it is preferred to form a 5-membered ring or a 6-membered ring.

$Ar^1$ and $Ar^2$ each represents an atomic group necessary for forming a benzene ring or a naphthalene ring, and preferably an atomic group necessary for forming a naphthalene ring. The benzene ring or naphthalene ring may have a substituent. Examples of the substituent include an alkoxy group, an amino group, an alkylsulfide group, a halogen atom and a sulfonate group.

$Y^1$ and $Y^2$ each represents a sulfur atom or a dialkylmethylene group, preferably a dialkylmethylene group, and particularly preferably a dimethylmethylene group.

The counter ion for neutralizing an electric charge represented by Za includes an anion, for example, a tetrafluoroborate ion, a hexafluorophosphate ion, a paratoluenesulfonate ion or a perchlorate ion, and a hexafluorophosphate ion is particularly preferred.

In the cyanine dye residue represented by formula (2), it is particularly preferred to connect to the thermochromic skeleton in $R^1$.

Of the cyanine dye residues represented by formula (2), a cyanine dye residue represented by formula (3) shown below is more preferred.

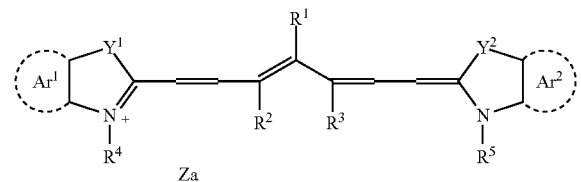

(3)

In formula (3), $R^1$ represents a hydrogen atom, a halogen atom, $-OR^{10}$, $-N(R^{11})(R^{12})$ or $-SR^{13}$. $R^{10}$ and $R^{13}$ each represents an alkyl group or an aryl group, and $R^{11}$ and $R^{12}$ each represents a hydrogen atom, an alkyl group or an aryl group, or $R^{11}$ and $R^{12}$ may be combined with each other to form a ring. $R^2$ and $R^3$ each represents a hydrogen atom or an alkyl group, or $R^2$ and $R^3$ may be combined with each other to form a ring. $Ar^1$ and $Ar^2$ each represents an atomic group necessary for forming a benzene ring or a naphthalene ring. $Y^1$ and $Y^2$ each represents a sulfur atom or a dialkylmethylene group. $R^4$ and $R^5$ each represents an alkyl group. Za represents a counter ion for neutralizing an electric charge. The cyanine dye residue is connected to the thermochromic skeleton in $R^1$.

In formula (3), with respect to $R^1$ to $R^5$, $R^{10}$ to $R^{13}$, $Ar^1$, $Ar^2$, $Y^1$ and $Y^2$, their specific examples, preferred embodiments and the like are same as those described in formula (2), respectively.

Preferred specific examples of the infrared absorbing skeleton are set forth below, but the invention should not be construed as being limited thereto. In the infrared absorbing skeleton shown below, the position connecting to the thermochromic skeleton is preferably a position indicated by arrow in the structural formula.

| Infrared Absorbing Skeleton | No |
|---|---|
| 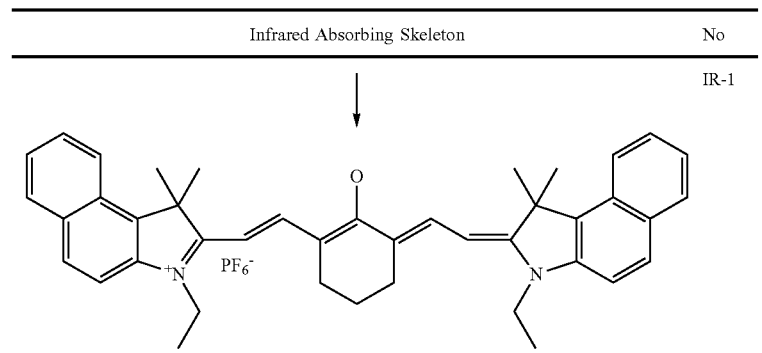 | IR-1 |

-continued
| Infrared Absorbing Skeleton | No |
|---|---|
| 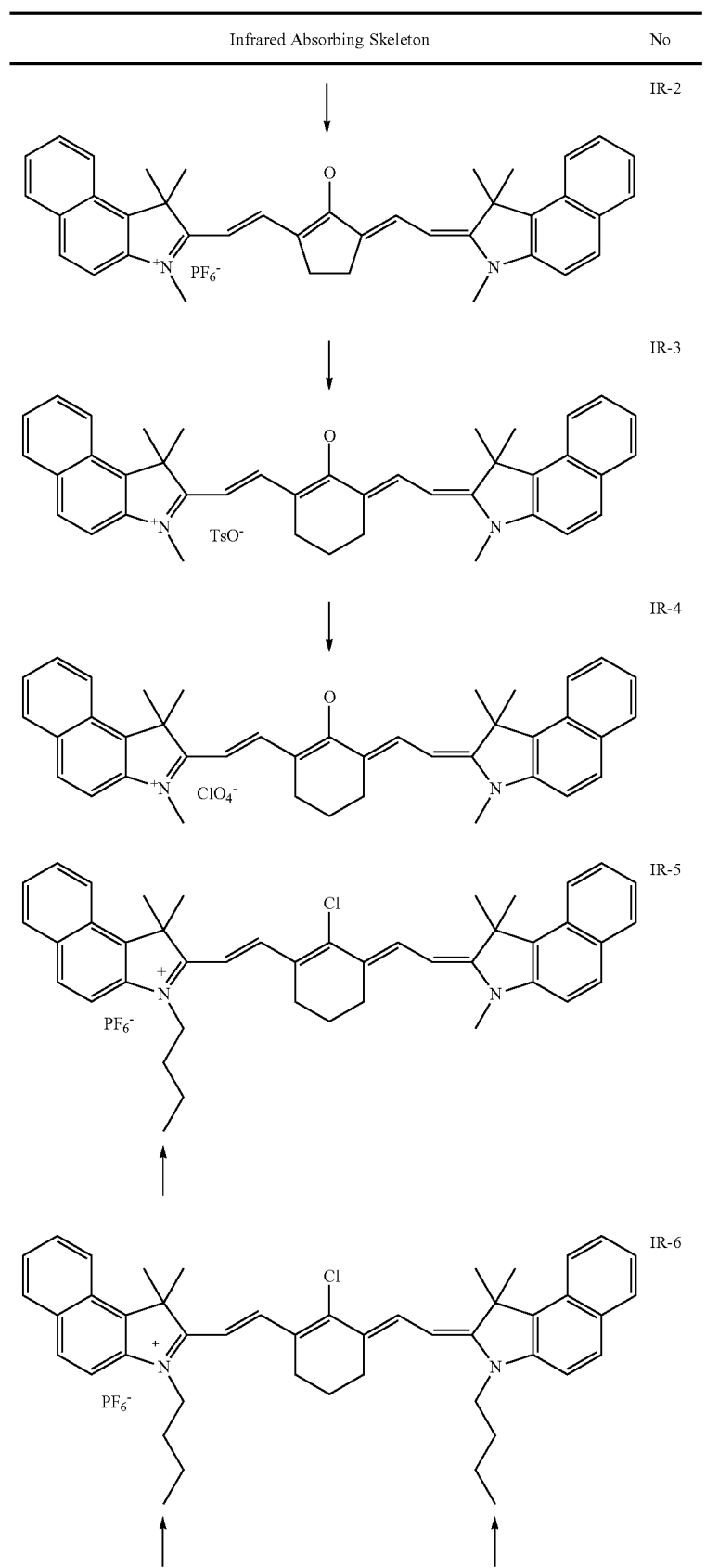 | IR-2 |
| | IR-3 |
| | IR-4 |
| | IR-5 |
| | IR-6 |

| Infrared Absorbing Skeleton | No |
|---|---|
| 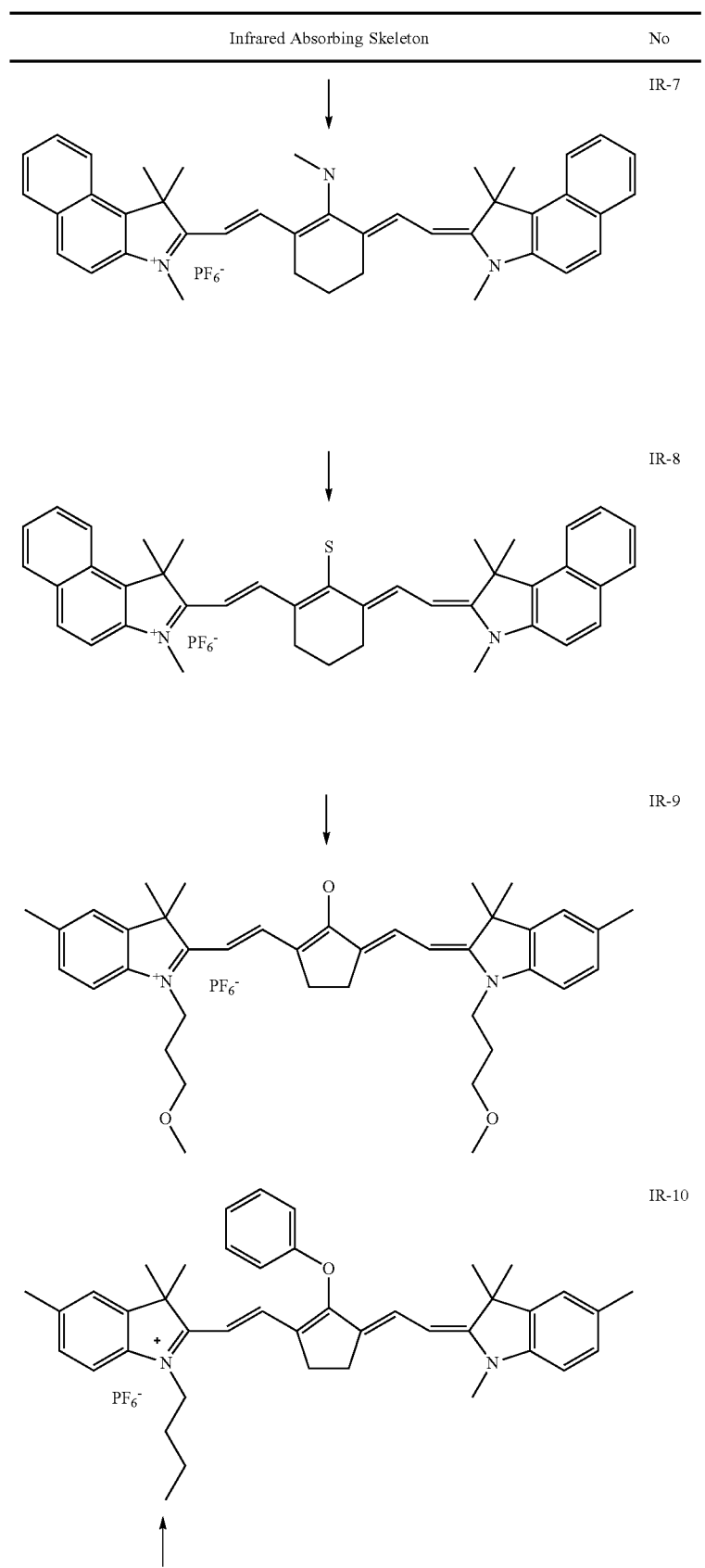 | IR-7 |
| | IR-8 |
| | IR-9 |
| | IR-10 |

-continued
| Infrared Absorbing Skeleton | No |
|---|---|
| 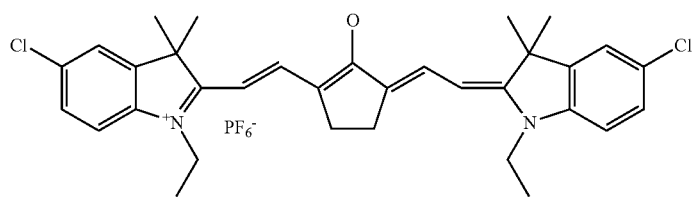 | IR-11 |
| 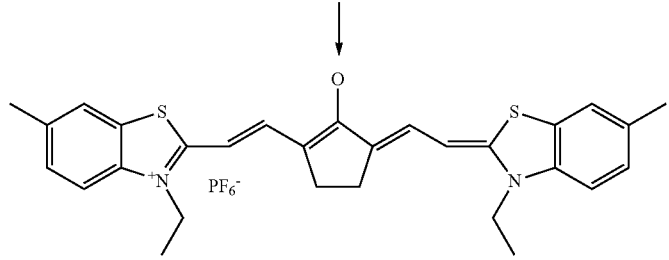 | IR-12 |
| 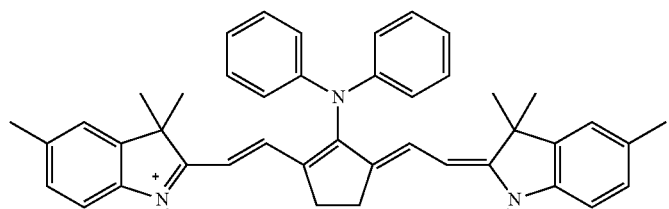 | IR-13 |
| 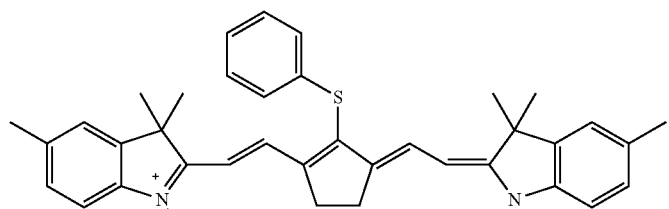 | IR-14 |

| Infrared Absorbing Skeleton | No |
|---|---|
| 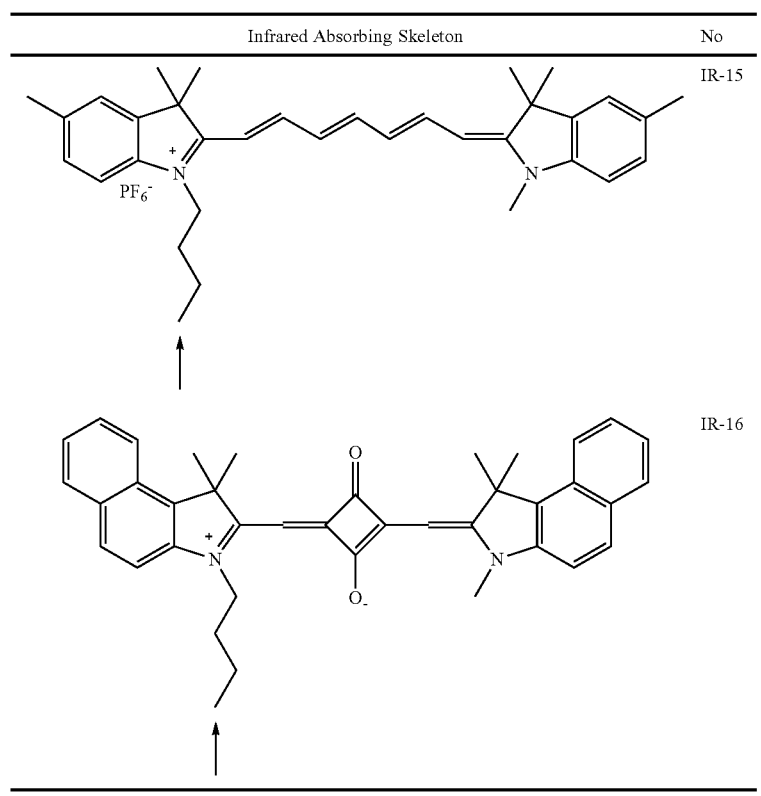 | IR-15 |
| | IR-16 |

[Thermochromic Skeleton]

The thermochromic skeleton represented by A in formula (1-1) is a skeleton having a thermochromic performance, and preferably includes a skeleton of a thermochromic dye, that is, a structure of a bond formed by removing one atom from the thermochromic dye (thermochromic dye residue).

The thermochromic skeleton includes thermochromic skeletons of known thermochromic dyes described, for example, in *Application of Functional Dyes*, (2002, CMC Publishing Co., Ltd.), JP-A-2000-281920, JP-A-11-34507 and JP-A-11-209339. From the standpoint of aging stability before exposure and thermal color-forming property, a spiropyran skeleton or a spirooxazine skeleton is preferred, and from the standpoint of visibility, a spiropyran skeleton or a spirooxazine skeleton represented by formula (4) shown below is particularly preferred.

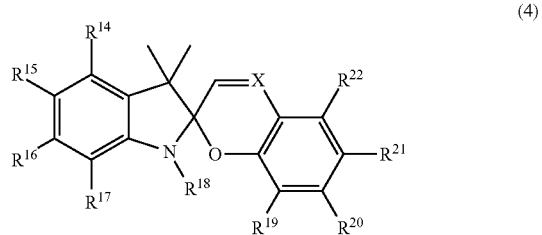

(4)

In formula (4), $R^{14}$ to $R^{22}$ each represents a hydrogen atom, a halogen atom, an alkyl group, an aryl group, —$OR^{23}$, —$NR^{24}R^{25}$, —$SR^{26}$ or a nitro group, or any adjacent two of $R^{14}$ to $R^{22}$ may be combined with each other to form a ring. $R^{23}$, $R^{24}$, $R^{25}$ and $R^{26}$ each represents a hydrogen atom or an alkyl group, or $R^{24}$ and $R^{25}$ may be combined with each other to form a ring. X represents a carbon atom or a nitrogen atom. The thermochromic skeleton is connected to the infrared absorbing skeleton in any of $R^{18}$, $R^{20}$ and $R^{22}$.

The alkyl group represented by any of $R^{14}$ to $R^{26}$ is preferably an alkyl group having from 1 to 20 carbon atoms, more preferably an alkyl group having from 1 to 10 carbon atoms, and particularly preferably an alkyl group having from 1 to 4 carbon atoms.

Specifically, for example, a methyl group, an ethyl group, a propyl group, a butyl group, a pentyl group, a hexyl group, a heptyl group, an octyl group, a nonyl group, a decyl group, an undecyl group, a dodecyl group, a tridecyl group, a hexadecyl group, an octadecyl group, an eicosyl group, an isopropyl group, an isobutyl group, a sec-butyl group, a tert-butyl group, an isopentyl group, a neopentyl group, a 1-methylbutyl group, an isohexyl group, a 2-ethylhexyl group, 2-methylhexyl group, a cyclohexyl group, a cyclopentyl group and a 2-norbornyl group are exemplified. Of the alkyl groups, a methyl group, an ethyl group, a propyl group and a butyl group are particularly preferred.

The alkyl group may have a substituent, and examples of the substituent include an alkoxy group, an amino group, an alkylsulfide group and a halogen atom.

The aryl group represented by any of $R^{14}$ to $R^{22}$ is preferably an aryl group having from 6 to 30 carbon atoms, more preferably an aryl group having from 6 to 20 carbon atoms, and particularly preferably an aryl group having from 6 to 12 carbon atoms.

Specifically, for example, a phenyl group, a 1-naphthyl group, a 2-naphthyl group, an o-, m- or p-tolyl group, a p-chlorophenyl group, a p-bromophenyl group, a p-fluorophenyl group, an o-chlorophenyl group, an o-bromophenyl group, an o-fluorophenyl group, a m-chlorophenyl group, a m-bromophenyl group, a m-fluorophenyl group, a p-methoxyphenyl group, a m-methoxyphenyl group, p-dimethylaminophenyl group, a p-methylthiophenyl group, a m-methylthiophenyl group and a p-phenylthiophenyl group are exemplified. Of the aryl groups, a phenyl group is particularly preferred.

The aryl group may have a substituent, and examples of the substituent include an alkoxy group, an amino group, an alkylsulfide group and a halogen atom.

The ring which is formed by combining any adjacent two of $R^{14}$ to $R^{22}$ with each other is preferably a 6-membered ring, and more preferably a benzene ring.

The ring which is formed by combining $R^{24}$ and $R^{25}$ with each other is preferably a 5-membered ring or a 6-membered ring, and more preferably a 6-membered alicyclic ring.

In the spiropyran skeleton or the spirooxazine skeleton represented by formula (4), it is particularly preferred to connect to the infrared absorbing skeleton in $R^{20}$.

Of the spiropyran skeletons and the spirooxazine skeletons represented by formula (4), a skeleton represented by formula (5) shown below is more preferred.

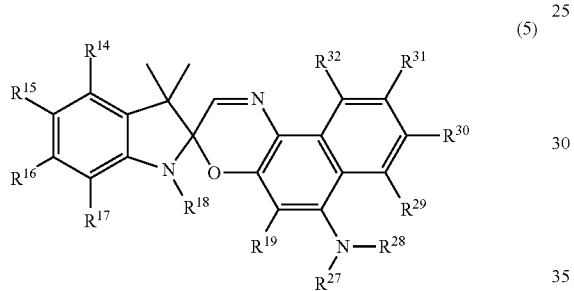

(5)

In formula (5), $R^{14}$ to $R^{19}$ each represents a hydrogen atom, a halogen atom, an alkyl group, an aryl group, $-OR^{23}$, $-NR^{24}R^{25}$, $-SR^{26}$ or a nitro group, or any adjacent two of $R^{14}$ to $R^{19}$ may be combined with each other to form a ring. $R^{23}$, $R^{24}$, $R^{25}$ and $R^{26}$ each represents a hydrogen atom or an alkyl group, or $R^{24}$ and $R^{25}$ may be combined with each other to form a ring. X represents a carbon atom or a nitrogen atom. $R^{27}$ and $R^{28}$ each represents an alkyl group or an aryl group, or $R^{27}$ and $R^{28}$ may be combined with each other to form a ring. $R^{29}$ and $R^{32}$ each represents a hydrogen atom, a halogen atom, an alkyl group, an aryl group, $-OR^{23}$, $-NR^{24}R^{25}$ or $-SR^{26}$. The thermochromic skeleton is connected to the infrared absorbing skeleton in any of $R^{27}$, $R^{28}$ and $R^{31}$.

In the skeleton represented by formula (5), it is particularly preferred to connect to the infrared absorbing skeleton in any of $R^{27}$ and $R^{28}$.

In formula (5), with respect to $R^{14}$ to $R^{19}$ and $R^{29}$ to $R^{32}$, their specific examples, preferred embodiments and the like are same as those described with respect to $R^{14}$ to $R^{19}$ in formula (4), respectively. Also, with respect to the alkyl group or the aryl group represented by any of $R^{27}$ and $R^{28}$ and the ring which is formed by combining $R^{27}$ and $R^{28}$ with each other, their specific examples, preferred embodiments and the like are same as those described with respect to $R^{24}$ and $R^{25}$ in formula (4), respectively.

Preferred specific examples of the thermochromic skeleton are set forth below, but the invention should not be construed as being limited thereto. In the thermochromic skeleton shown below, the position connecting to the infrared absorbing skeleton is preferably a position indicated by arrow in the structural formula.

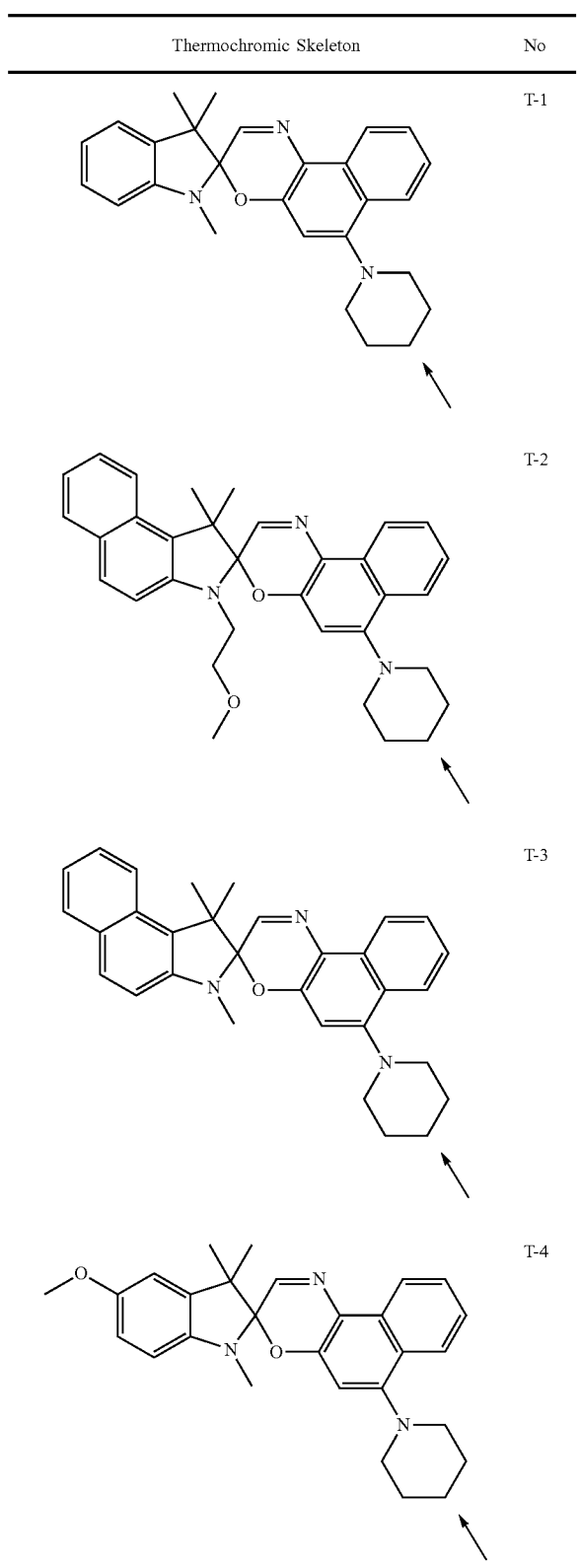

| Thermochromic Skeleton | No |
| --- | --- |
| | T-1 |
| | T-2 |
| | T-3 |
| | T-4 |

| Thermochromic Skeleton | No |
|---|---|
| 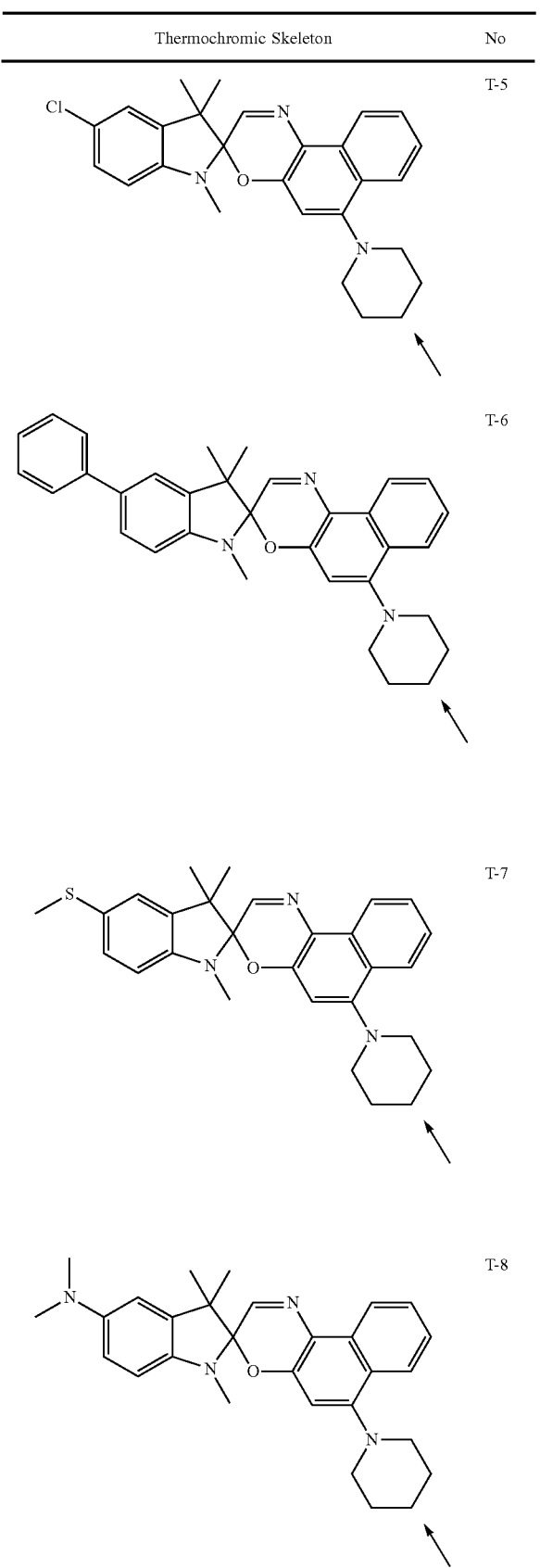 | T-5 |
| | T-6 |
| | T-7 |
| | T-8 |
| Thermochromic Skeleton | No |
|---|---|
| 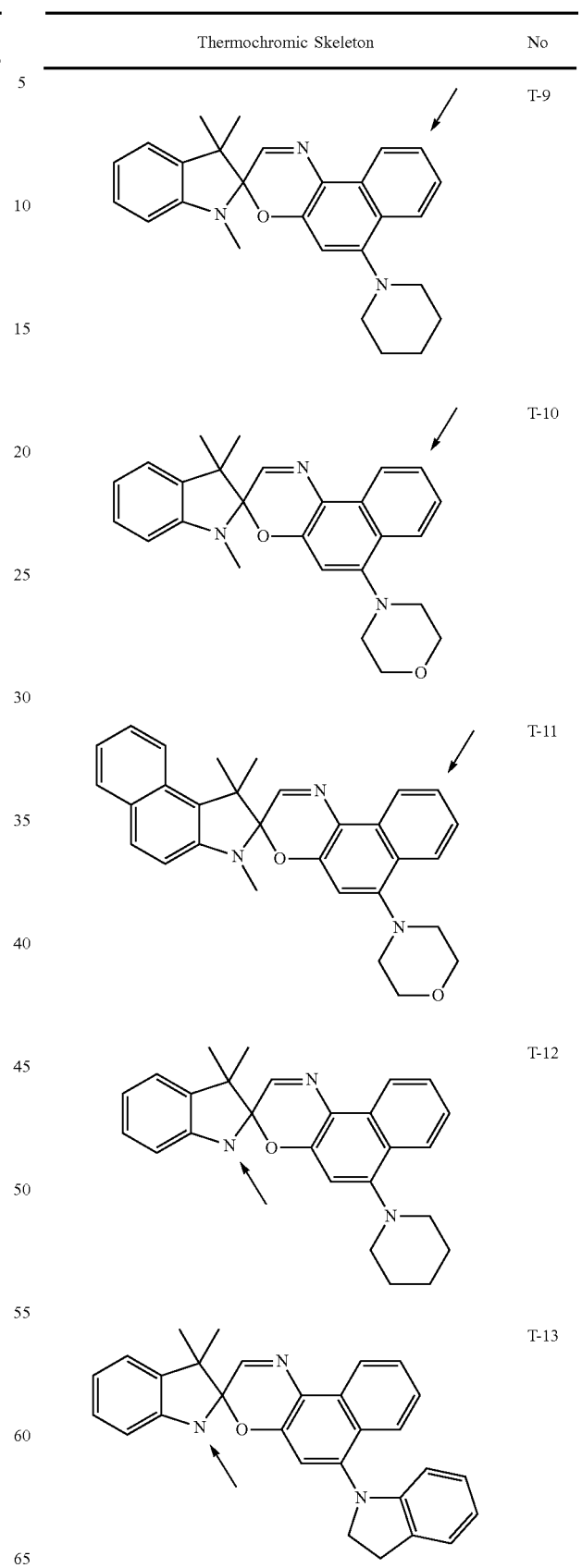 | T-9 |
| | T-10 |
| | T-11 |
| | T-12 |
| | T-13 |

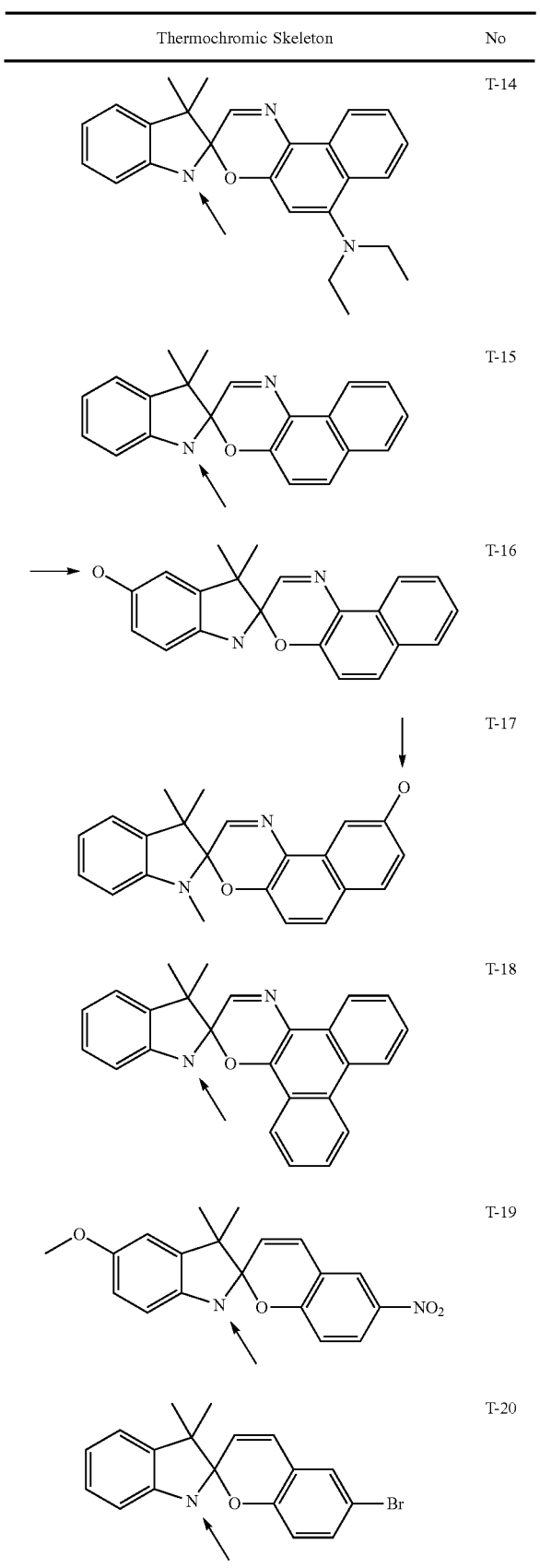

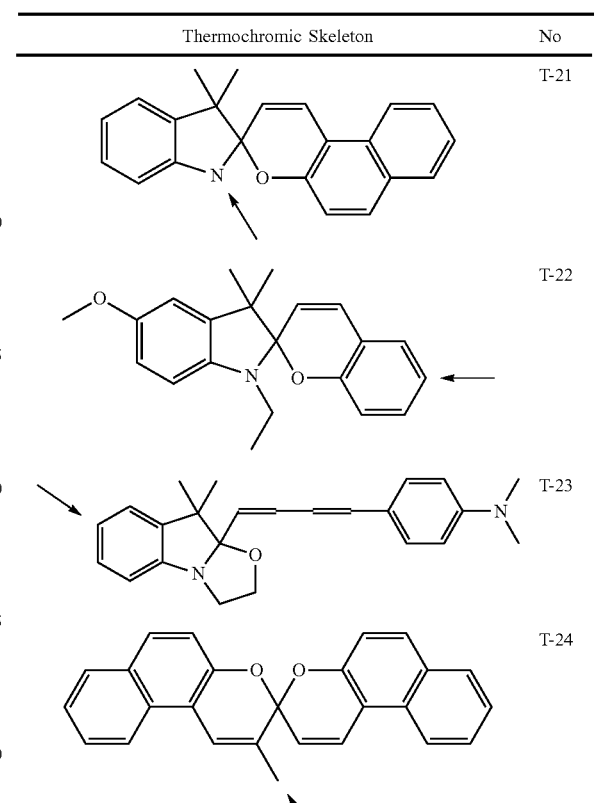

[Connecting Group]

In formula (1-1), B1 represents a single bond or a connecting group, and the connecting group is preferably a divalent connecting group constituted from one or more groups selected from the structure group shown below.

Structure Group:

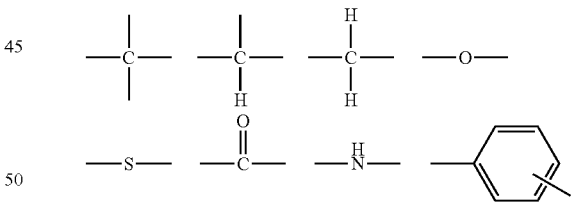

The connecting group represented by B1 is preferably an alkylene group having from 1 to 10 carbon atoms, which may contain an oxygen atom or a nitrogen atom, and more preferably an alkylene group having from 2 to 10 carbon atoms, which may contain a nitrogen atom. The alkylene group may include an alicyclic structure, and a number of ring members for forming the ring is preferably 5-membered or 6-membered, and more preferably 6-membered.

As the connecting group, specifically, the structures shown below are exemplified.

$*-(CH_2)_f-**$   $*-(CH_2CH_2O)_g-**$

-continued

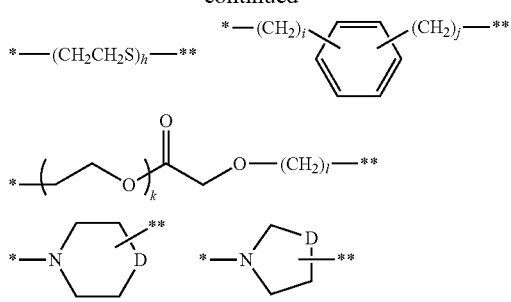

In the formulae above, * represents a site which connects to the thermochromic skeleton, and ** represents a site which connects to the infrared absorbing skeleton. f, g and h each represents an integer from 1 to 6, and i, j, k and l each represents an integer from 0 to 6. D represents —N(Ra)—, —O—, —S— or —C(Rb)(Rc)-, and Ra, Rb and Rc each represents a hydrogen atom or an alkyl group.

Preferred specific examples of the connecting group are set forth below, but the invention should not be construed as being limited thereto. In the specific examples shown below, * represents a site which connects to the thermochromic skeleton, and ** represents a site which connects to the infrared absorbing skeleton.

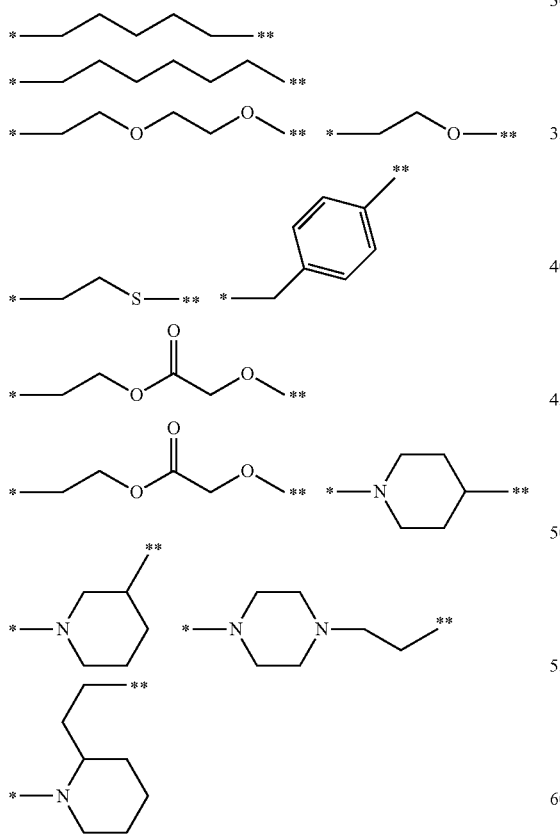

As the specific color-forming compound represented by formula (1-1) according to the invention, a compound represented by formula (6-1), (6-2) or (6-3) shown below is preferred.

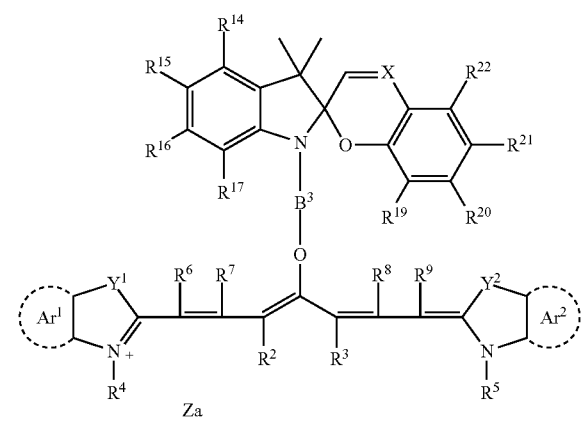

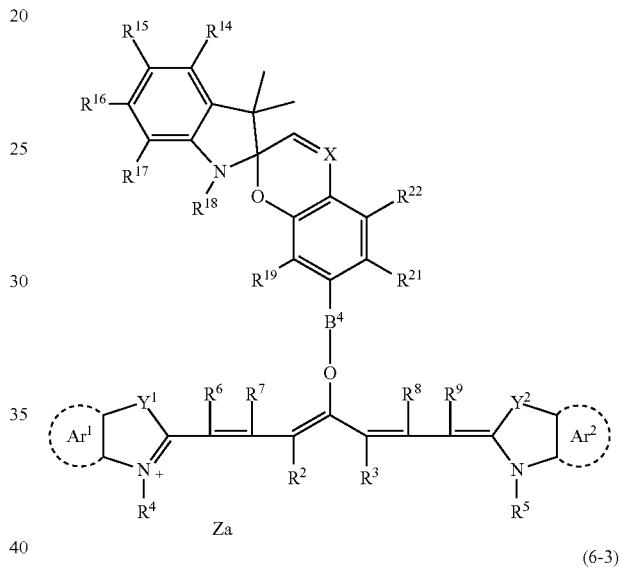

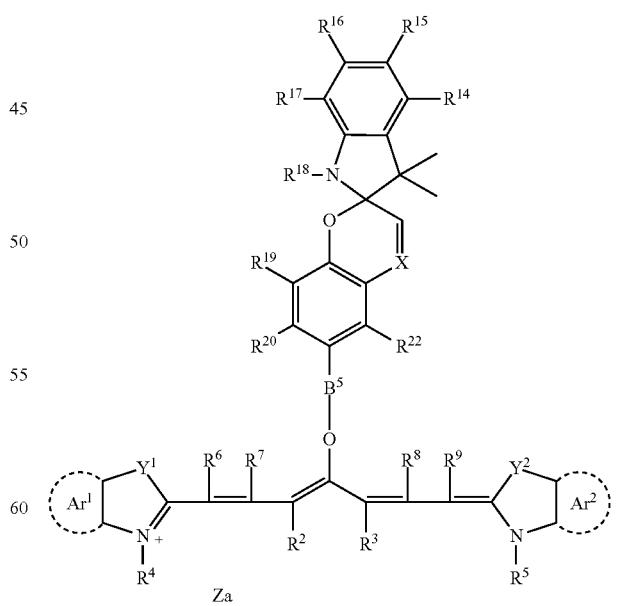

In formulae (6-1), (6-2) and (6-3), $R^2$ and $R^3$ each represents an alkyl group, or $R^2$ and $R^3$ may be combined with each other to form a ring. $Ar^1$ and $Ar^2$ each represents an atomic group necessary for forming a benzene ring or a naphthalene ring. $Y^1$ and $Y^2$ each represents a sulfur atom or a dialkylmethylene group. $R^4$ and $R^5$ each represents an alkyl group. $R^6$, $R^7$, $R^8$ and $R^9$ each represents a hydrogen atom or an alkyl group. Za represents a counter ion for neutralizing an electric charge. $B^3$, $B^4$ and $B^5$ each represents a single bond or a connecting group. $R^{14}$ to $R^{22}$ each represents a hydrogen atom, a halogen atom, an alkyl group, an aryl group, $-OR^{23}$, $-NR^{24}R^{25}$, $-SR^{26}$ or a nitro group, or any adjacent two of $R^{14}$ to $R^{22}$ may be combined with each other to form a ring. $R^{23}$, $R^{24}$, $R^{25}$ and $R^{26}$ each represents a hydrogen atom or an alkyl group, or $R^{24}$ and $R^{25}$ may be combined with each other to form a ring. X represents a carbon atom or a nitrogen atom.

In formulae (6-1), (6-2) and (6-3), with respect to $R^2$ to $R^9$, $Ar^1$, $Ar^2$, $Y^1$, $Y^2$ and Za, their specific examples, preferred embodiments and the like are same as those described with respect to $R^2$ to $R^9$, $Ar^1$, $Ar^2$, $Y^1$, $Y^2$ and Za in formula (2), respectively. With respect to $R^{14}$ to $R^{22}$, their specific examples, preferred embodiments and the like are same as those described with respect to $R^{14}$ to $R^{22}$ in formula (4), respectively.

$B^3$, $B^4$ and $B^5$ each preferably represents a connecting group. With respect to the connecting group represented by any of $B^3$, $B^4$ and $B^5$, its specific examples, preferred embodiments and the like are same as those described with respect to the connecting group represented by B1.

Of the specific color-forming compound represented by formula (1-1) according to the invention, a compound represented by formula (6-4) shown below is more preferred.

(6-4)

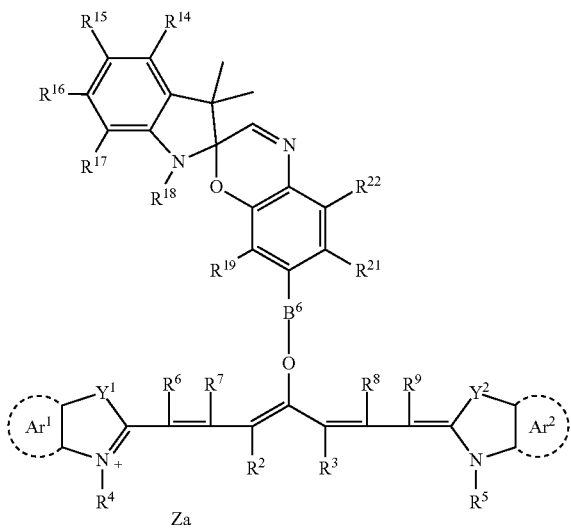

In formula (6-4), $R^2$ and $R^3$ each represents an alkyl group, or $R^2$ and $R^3$ may be combined with each other to form a ring. $Ar^1$ and $Ar^2$ each represents an atomic group necessary for forming a benzene ring or a naphthalene ring. $Y^1$ and $Y^2$ each represents a sulfur atom or a dialkylmethylene group. $R^4$ and $R^5$ each represents an alkyl group. $R^6$, $R^7$, $R^8$ and $R^9$ each represents a hydrogen atom or an alkyl group. Za represents a counter ion for neutralizing an electric charge. $B^6$ represents an alkylene group having 10 or less carbon atoms, which may contain a nitrogen atom. $R^{14}$ to $R^{19}$ and $R^{21}$ to $R^{22}$ each represents a hydrogen atom, a halogen atom, an alkyl group, an aryl group, $-OR^{23}$, $-NR^{24}R^{25}$, $-SR^{26}$ or a nitro group, or any adjacent two of $R^{14}$ to $R^{19}$ and $R^{21}$ to $R^{22}$ may be combined with each other to form a ring. $R^{23}$, $R^{24}$, $R^{25}$ and $R^{26}$ each represents a hydrogen atom or an alkyl group, or $R^{24}$ and $R^{25}$ may be combined with each other to form a ring.

In formulae (6-4), with respect to $R^2$ to $R^9$, $Ar^1$, $Ar^2$, $Y^1$, $Y^2$ and Za, their specific examples, preferred embodiments and the like are same as those described with respect to $R^2$ to $R^9$, $Ar^1$, $Ar^2$, $Y^1$, $Y^2$ and Za in formula (2), respectively. With respect to $R^{14}$ to $R^{19}$ and $R^{21}$ to $R^{22}$, their specific examples, preferred embodiments and the like are same as those described with respect to $R^{14}$ to $R^{19}$ and $R^{21}$ to $R^{22}$ in formula (4), respectively.

The connecting group represented by $B^6$ is preferably an alkylene group having from 2 to 10 carbon atoms, which may contain a nitrogen atom.

As another preferred embodiment of the specific color-forming compound according to the invention, a compound represented by formula (1-2) shown below is exemplified.

$$A-B2-D11\bullet\bullet D2-C2 \tag{1-2}$$

In formula (1-2), A represents a thermochromic skeleton, $B^2$ represents a single bond or a connecting group, D1 represents an ionic group, D2 represents an ionic group having a polarity opposite to that of D1, C2 represents an infrared absorbing skeleton, and •• represents an ionic bond.

In formula (1-2), the ionic group represented by any of D1 and D2 is an anionic group or a cationic group, and when D1 is an anionic group, D2 is a cationic group, whereas when D1 is a cationic group, D2 is an anionic group. The anionic group is preferably a sulfonate group or a carboxylate group, and more preferably a sulfonate group. The cationic group is preferably an ammonium group, a pyridinium group or a sulfonium group, and more preferably an ammonium group.

As the infrared absorbing skeleton represented by C2, a cyanine dye skeleton is preferably exemplified.

As the specific color-forming compound represented by formula (1-2) according to the invention, a compound represented by formula (6-5), (6-6) or (6-7) shown below is preferred.

(6-5)

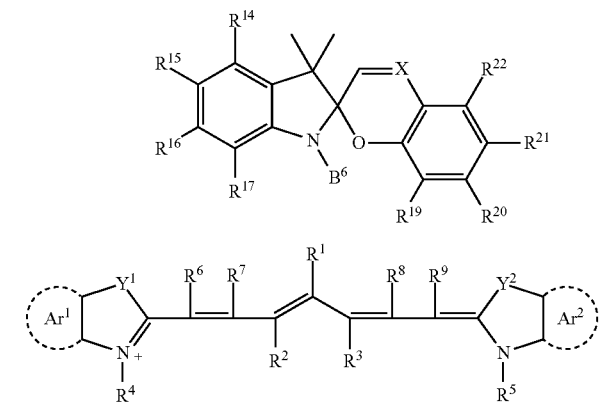

(6-6)

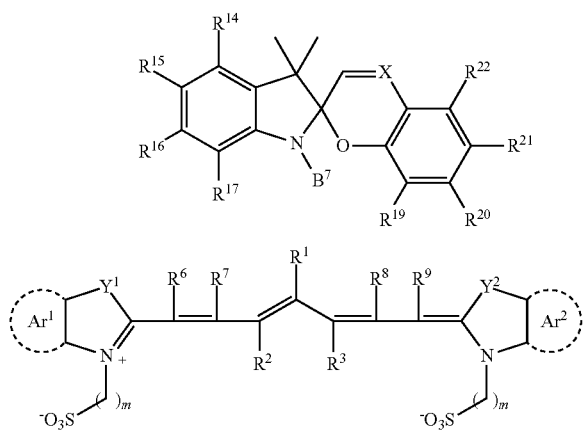

(6-7)

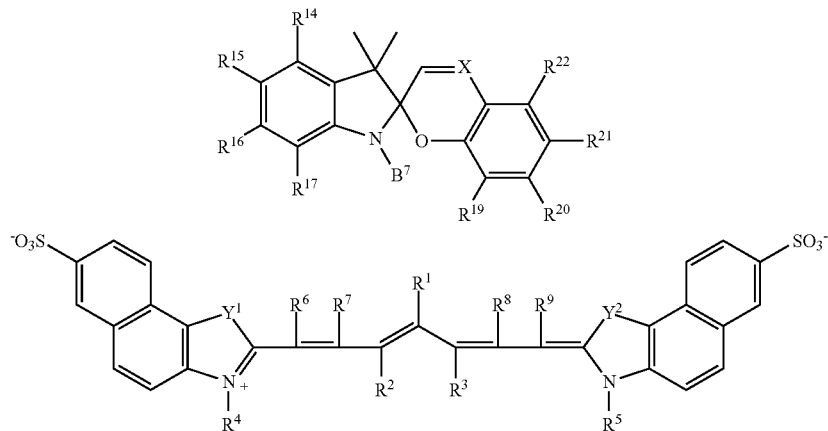

In formula (6-5), $R^1$ represents a hydrogen atom, a halogen atom, —$OR^{10}$, —$N(R^{11})(R^{12})$ or —$SR^{13}$. $R^{10}$ and $R^{13}$ each represents an alkyl group or an aryl group, and $R^{11}$ and $R^{12}$ each represents a hydrogen atom, an alkyl group or an aryl group, or $R^{11}$ and $R^{12}$ may be combined with each other to form a ring. $R^2$ and $R^3$ each represents an alkyl group, or $R^2$ and $R^3$ may be combined with each other to form a ring. $Ar^1$ and $Ar^2$ each represents an atomic group necessary for forming a benzene ring or a naphthalene ring. $Y^1$ and $Y^2$ each represents a sulfur atom or a dialkylmethylene group. $R^4$ and $R^5$ each represents an alkyl group. $R^6$, $R^7$, $R^8$ and $R^9$ each represents a hydrogen atom or an alkyl group. $R^{14}$ to $R^{17}$ and $R^{19}$ to $R^{22}$ each represents a hydrogen atom, a halogen atom, an alkyl group, an aryl group, —$OR^{23}$, —$NR^{24}R^{25}$, —$SR^{26}$ or a nitro group, or any adjacent two of $R^{14}$ to $R^{17}$ and $R^{19}$ to $R^{22}$ may be combined with each other to form a ring. $R^{23}$, $R^{24}$, $R^{25}$ and $R^{26}$ each represents a hydrogen atom or an alkyl group, or $R^{24}$ and $R^{25}$ may be combined with each other to form a ring. X represents a carbon atom or a nitrogen atom. $B^6$ represents a connecting group having an anionic group, and the anionic group and a cationic site of the infrared absorbing skeleton are connected with an ionic bond.

In formula (6-5), the cationic site of the infrared absorbing skeleton is the iminium cation site in the dye skeleton.

In formula (6-6), $R^1$ represents a hydrogen atom, a halogen atom, —$OR^{10}$, —$N(R^{11})(R^{12})$ or —$SR^{13}$. $R^{10}$ and $R^{13}$ each represents an alkyl group or an aryl group, and $R^{11}$ and $R^{12}$ each represents a hydrogen atom, an alkyl group or an aryl group, or $R^{11}$ and $R^{12}$ may be combined with each other to form a ring. $R^2$ and $R^3$ each represents an alkyl group, or $R^2$ and $R^3$ may be combined with each other to form a ring. $Ar^1$ and $Ar^2$ each represents an atomic group necessary for forming a benzene ring or a naphthalene ring. $Y^1$ and $Y^2$ each represents a sulfur atom or a dialkylmethylene group. $R^6$, $R^7$, $R^8$ and $R^9$ each represents a hydrogen atom or an alkyl group. m represents an integer of 3 or 4. $R^{14}$ to $R^{17}$ and $R^{19}$ to $R^{22}$ each represents a hydrogen atom, a halogen atom, an alkyl group, an aryl group, —$OR^{23}$, —$NR^{24}R^{25}$, —$SR^{26}$ or a nitro group, or any adjacent two of $R^{14}$ to $R^{17}$ and $R^{19}$ to $R^{22}$ may be combined with each other to form a ring. $R^{23}$, $R^{24}$, $R^{25}$ and $R^{26}$ each represents a hydrogen atom or an alkyl group, or $R^{24}$ and $R^{25}$ may be combined with each other to form a ring. X represents a carbon atom or a nitrogen atom. $B^7$ represents a connecting group having a cationic group, and the cationic group and an anionic site of the infrared absorbing skeleton are connected with an ionic bond.

In formula (6-6), the anionic site of the infrared absorbing skeleton is the sulfonate anion site in the dye skeleton.

In formula (6-7), $R^1$ represents a hydrogen atom, a halogen atom, —$OR^{10}$, —$N(R^{11})(R^{12})$ or —$SR^{13}$. $R^{10}$ and $R^{13}$ each represents an alkyl group or an aryl group, and $R^{11}$ and $R^{12}$ each represents a hydrogen atom, an alkyl group or an aryl group, or $R^{11}$ and $R^{12}$ may be combined with each other to form a ring. $R^2$ and $R^3$ each represents an alkyl group, or $R^2$ and $R^3$ may be combined with each other to form a ring. $Y^1$ and $Y^2$ each represents a sulfur atom or a dialkylmethylene group. $R^4$ and $R^5$ each represents an alkyl group. $R^6$, $R^7$, $R^8$ and $R^9$ each represents a hydrogen atom or an alkyl group. $R^{14}$ to $R^{17}$ and $R^{19}$ to $R^{22}$ each represents a hydrogen atom, a halogen atom, an alkyl group, an aryl group, $-OR^{23}$, $-NR^{24}R^{25}$, $-SR^{26}$ or a nitro group, or any adjacent two of $R^{14}$ to $R^{17}$ and $R^{19}$ to $R^{22}$ may be combined with each other to form a ring. $R^{23}$, $R^{24}$, $R^{25}$ and $R^{26}$ each represents a hydrogen atom or an alkyl group, or $R^{24}$ and $R^{25}$ may be combined with each other to form a ring. X represents a carbon atom or a nitrogen atom. $B^7$ represents a connecting group having a cationic group, and the cationic group and an anionic site of the infrared absorbing skeleton are connected with an ionic bond.

In formula (6-7), the anionic site of the infrared absorbing skeleton is the sulfonate anion site in the dye skeleton.

In formula (6-5), with respect to $R^1$ to $R^9$, $Ar^1$, $Ar^2$, $Y^1$ and $Y^2$, their specific examples, preferred embodiments and the like are same as those described with respect to $R^1$ to $R^9$, $Ar^1$, $Ar^2$, $Y^1$ and $Y^2$ in formula (2), respectively. With respect to $R^{14}$ to $R^{17}$ and $R^{19}$ to $R^{22}$, their specific examples, preferred embodiments and the like are same as those described with respect to $R^{14}$ to $R^{17}$ and $R^{19}$ to $R^{22}$ in formula (4), respectively.

X is preferably a nitrogen atom. The connecting group having an anionic group represented by $B^6$ is preferably an alkyl group having 10 or less carbon atoms containing a sulfonate group or a carboxylate group, and more preferably an alkyl group having 5 or less carbon atoms containing a sulfonate group.

In formula (6-6), with respect to $R^1$ to $R^3$, $R^6$ to $R^9$, $Ar^1$, $Ar^2$, $Y^1$ and $Y^2$, their specific examples, preferred embodiments and the like are same as those described with respect to $R^1$ to $R^3$, $R^6$ to $R^9$, $Ar^1$, $Ar^2$, $Y^1$ and $Y^2$ in formula (2), respectively. With respect to $R^{14}$ to $R^{17}$ and $R^{19}$ to $R^{22}$, their specific examples, preferred embodiments and the like are same as those described with respect to $R^{14}$ to $R^{17}$ and $R^{19}$ to $R^{22}$ in formula (4), respectively. X is preferably a nitrogen atom. The connecting group having a cationic group represented by $B^7$ is preferably an alkyl group having 10 or less carbon atoms containing an ammonium group, a pyridinium group or a sulfonium group, and more preferably an alkyl group having 5 or less carbon atoms containing an ammonium group.

In formula (6-7), with respect to $R^1$ to $R^9$, $Y^1$ and $Y^2$, their specific examples, preferred embodiments and the like are same as those described with respect to $R^1$ to $R^9$, $Y^1$ and $Y^2$ in formula (2), respectively. With respect to $R^{14}$ to $R^{17}$ and $R^{19}$ to $R^{22}$, their specific examples, preferred embodiments and the like are same as those described with respect to $R^{14}$ to $R^{17}$ and $R^{19}$ to $R^{22}$ in formula (4), respectively. X is preferably a nitrogen atom. The connecting group having a cationic group represented by $B^7$ is preferably an alkyl group having 10 or less carbon atoms containing an ammonium group, a pyridinium group or a sulfonium group, and more preferably an alkyl group having 5 or less carbon atoms containing an ammonium group.

Specific examples of the specific color-forming compound according to the invention are set forth below, but the invention should not be construed as being limited thereto.

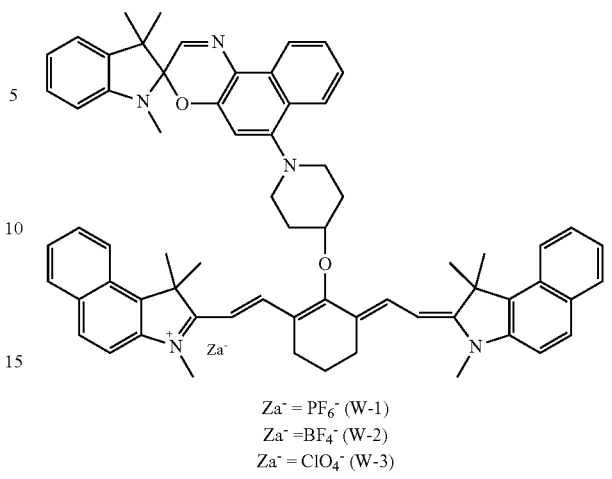

$Za^- = PF_6^-$ (W-1)
$Za^- = BF_4^-$ (W-2)
$Za^- = ClO_4^-$ (W-3)

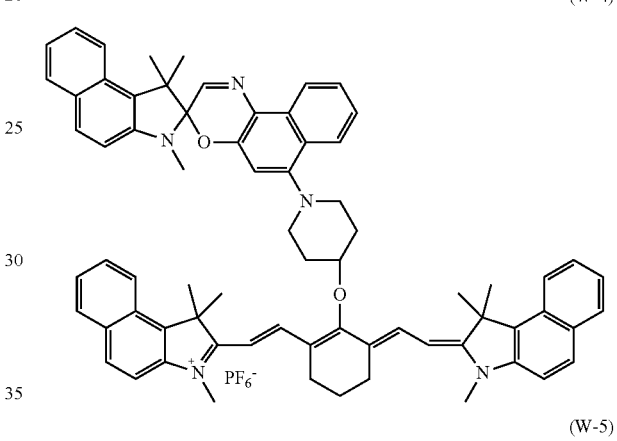

(W-4)

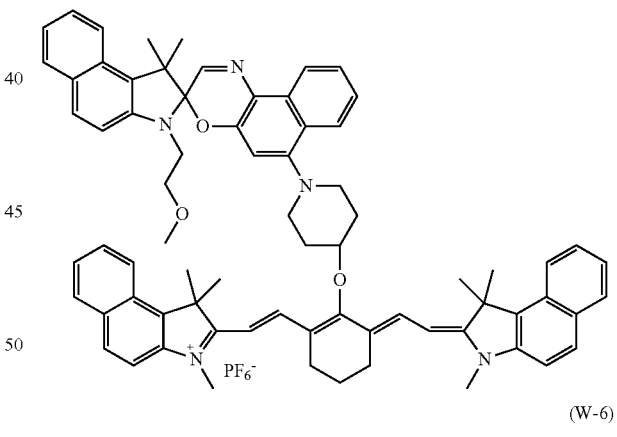

(W-5)

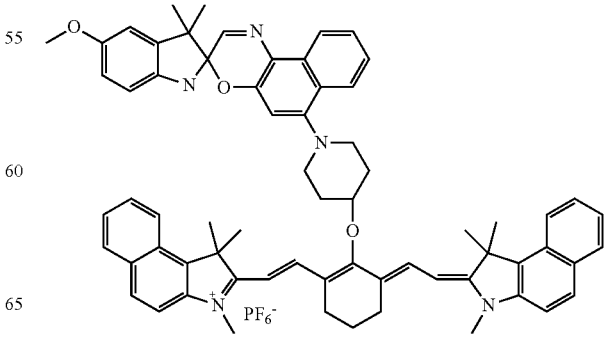

(W-6)

(W-7)
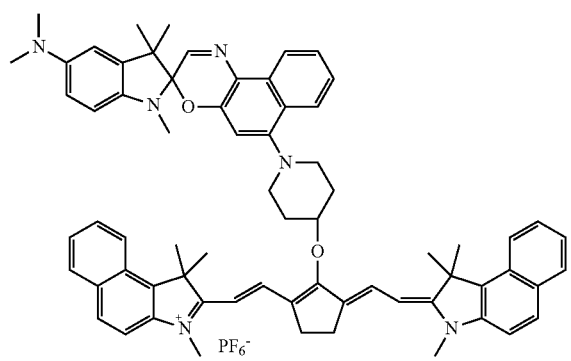
(W-8)
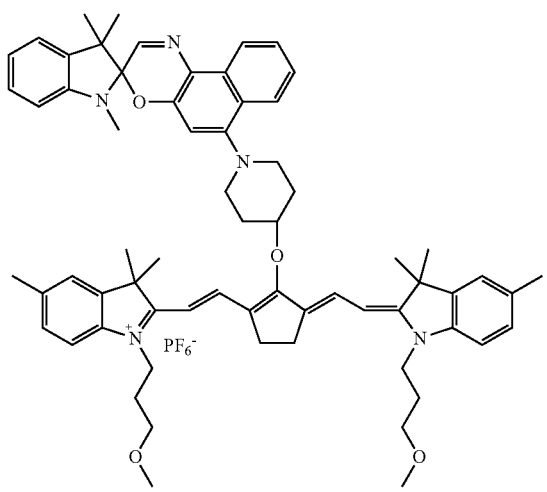
(W-9)
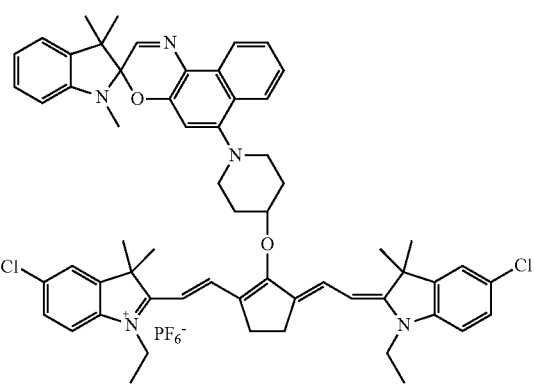
(W-10)
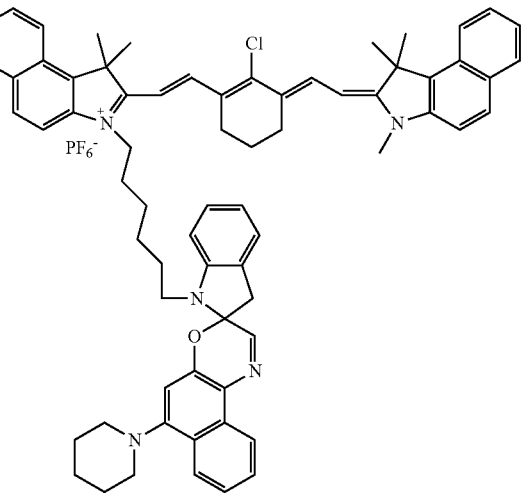
(W-11)
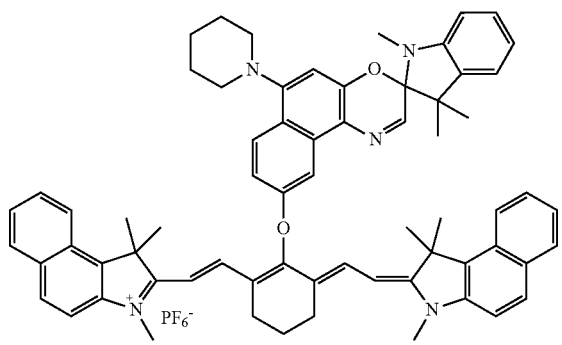
(W-12)
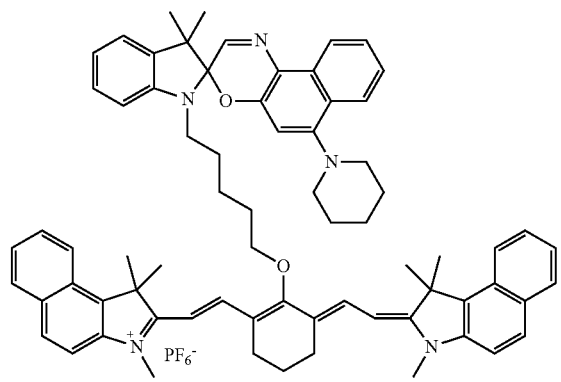
(W-13)
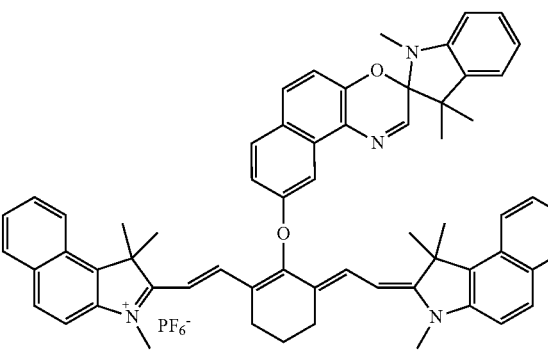

-continued (W-14)
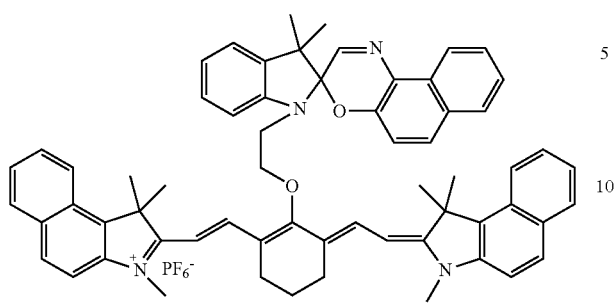

(W-15)
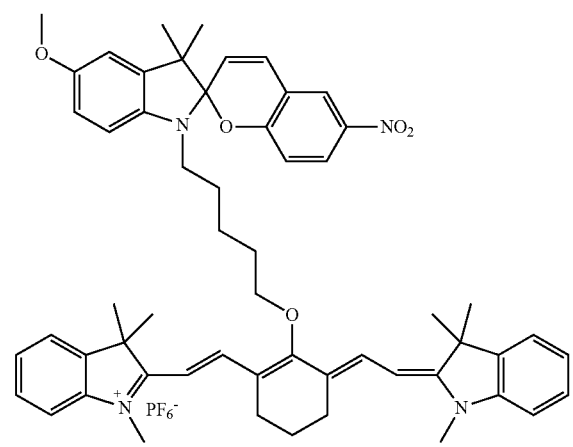

(W-16)
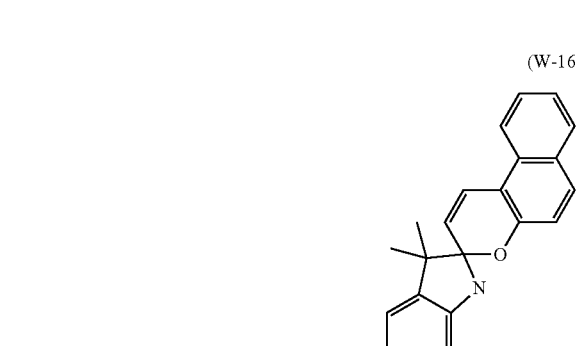

-continued (W-17)
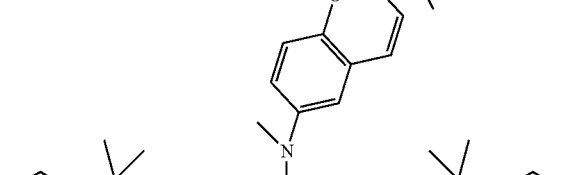

(W-18)
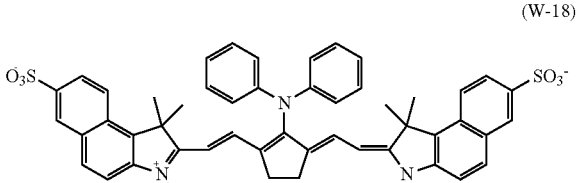

(W-19)
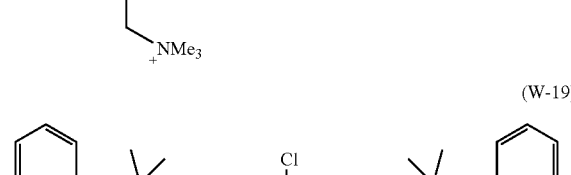

The specific color-forming compound according to the invention may be used only one kind or two or more kinds in combination. Although the specific color-forming compound according to the invention can be contained in an optional amount in the color-forming composition (infrared sensitive color-forming composition and infrared curable color-forming composition), it is contained preferably from 0.1 to 50% by weight, more preferably form 0.5 to 30% by weight, still more preferably from 1 to 20% by weight, based on the total solid content of the color-forming composition.

A production method of the specific color-forming compound according to the invention will be described.

The specific color-forming compound according to the invention can be produced, for example, in accordance with a common synthesis method as illustrated by a synthesis scheme shown below.

For example, a compound in which the thermochromic skeleton is connected in R¹ of the infrared absorbing skeleton represented by formula (3) described above can be synthesized by reacting Photochromic skeleton H-2 containing a hetero atom with Infrared absorbing skeleton H-1 wherein R¹ is substituted with a chlorine atom in the presence of a base, as shown in formula (9) described below.

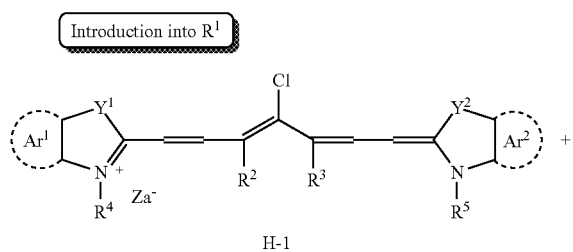

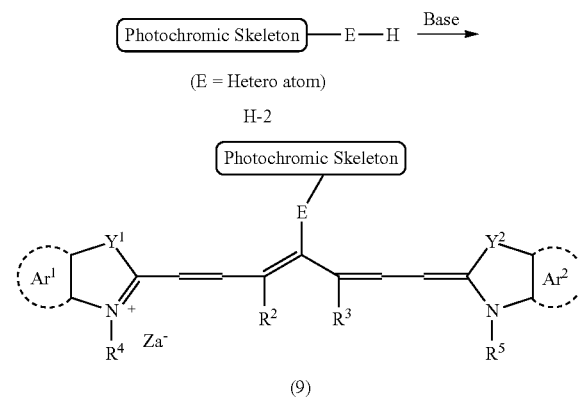

Also, a compound in which the thermochromic skeleton is connected in R⁴ or R⁵ of the infrared absorbing skeleton represented by formula (3) described above can be synthesized by reacting Heterocyclic compound H-3 with Compound H-4 in which a releasing group is connected to the thermochromic skeleton to synthesis Heterocyclic compound H-5 containing a thermochromic skeleton, and reacting H-6 with Heterocyclic compound H-5, as shown in formula (10) described below.

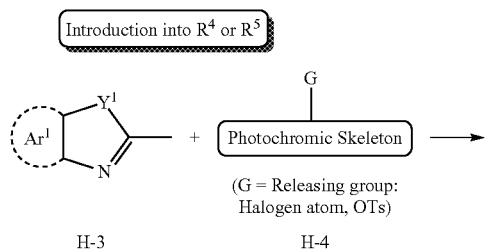

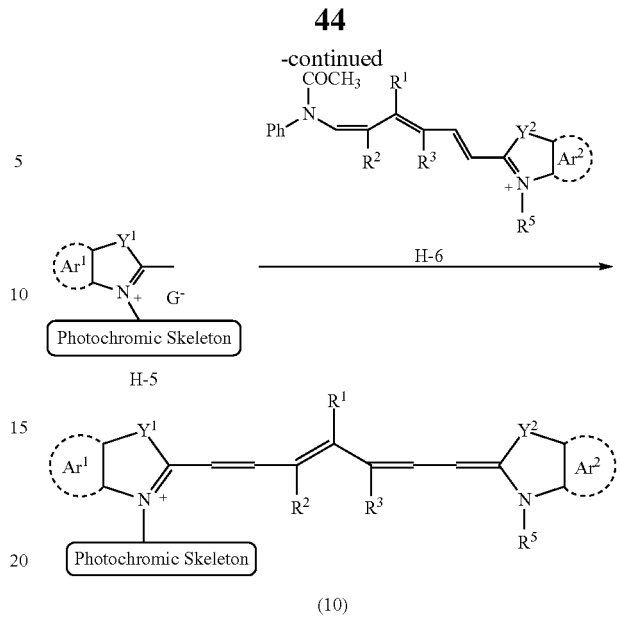

(10)

[(B) Binder]

The binder contained in the infrared sensitive color-forming composition according to the invention is not particularly limited as long as it is a polymer having a film-forming property, and known binder polymers used in light-sensitive color-forming compositions can be employed. Among them, an acrylic resin, a polyvinyl acetal resin and a polyurethane resin are preferred.

As the binder contained in the infrared curable color-forming composition according to the invention, a polymer having a crosslinkable functional group for improving film strength of the image area in its main chain or side chain, preferably in its side chain, as described in JP-A-2008-195018 is preferably exemplified. Due to the crosslinkable functional group, crosslinkage is formed between the polymer molecules to facilitate curing.

As the crosslinkable functional group, an ethylenically unsaturated group, for example, a (meth)acryl group, a vinyl group or an allyl group, or an epoxy group is preferred. The crosslinkable functional group can be introduced into the polymer by a polymer reaction or copolymerization. For instance, a reaction between an acrylic polymer or polyurethane having a carboxyl group in its side chain and glycidyl methacrylate or a reaction between a polymer having an epoxy group and a carboxylic acid containing an ethylenically unsaturated group, for example, methacrylic acid can be utilized.

The content of the crosslinkable functional group in the binder is preferably from 0.1 to 10.0 mmol, more preferably from 1.0 to 7.0 mmol, particularly preferably from 2.0 to 5.5 mmol, based on 1 g of the binder.

As the binder used in the infrared sensitive color-forming composition and the infrared curable color-forming composition, a polymer having an acid group can also be employed. As the polymer having an acid group, a polymer containing a carboxylic acid group (including a salt thereof) is exemplified. As such a polymer, an addition polymer having a carboxylic acid group in its side chain, for example, polymers described in JP-B-59-44615, JP-B-54-34327, JP-B-58-12577, JP-B-54-25957, JP-A-54-92723, JP-A-59-53836 and JP-A-59-71048, specifically, a methacrylic acid copolymer, an acrylic acid copolymer, an itaconic acid copolymer, a crotonic acid copolymer, a maleic acid copolymer and a partially esterified maleic acid copolymer are useful. As the binder, a copolymer containing a monomer unit derived from a (meth)acrylate and having a carboxylic acid group is preferred.

Also, an acidic cellulose derivative having a carboxylic acid group in its side chain and a polymer obtained by adding a cyclic acid anhydride to an addition polymer having a hydroxy group are useful. Further, polyurethane resins described in JP-B-7-120040, JP-B-7-120041, JP-B-7-120042, JP-B-8-12424, JP-A-63-287944, JP-A-63-287947, JP-A-1-271741 and JP-A-11-352691 can also be employed. As the binder, an acrylic resin, a methacrylic resin or a urethane resin is preferably employed.

One preferred example of the polymer having a carboxylic acid group is a copolymer containing (a) a monomer unit having a carboxylic acid group and (b) a monomer unit for imparting a radical crosslinking property.

The monomer unit (a) having a carboxylic acid group is not particularly limited and structures described in JP-A-2002-40652 and Paragraph Nos. [0059] to [0075] of JP-A-2005-300650 are preferably used.

The monomer unit (b) for imparting a radical crosslinking property is not particularly limited and structures described in Paragraph Nos. [0041] to [0053] of JP-A-2007-248863 are preferably used.

The polymer having a carboxylic acid group may contain a monomer unit derived from an ethylenically unsaturated compound which has neither a carboxylic acid group nor a radical crosslinking property as a copolymerization component. As such a monomer unit, a monomer unit derived from a (meth)acrylate or (meth)acrylamide is preferred. Particularly, a monomer unit derived from a (meth)acrylamide described in Paragraph Nos. [0061] to [0084] of JP-A-2007-272134 is preferably used. The content of such a monomer unit is preferably from 5 to 50 units, more preferably from 5 to 35 units, still more preferably from 5 to 25 units, when the total number of monomer units is taken as 100.

As the binder of the color-forming composition according to the invention, in addition to the addition polymer containing a combination of the monomer units described above, a urethane resin having a crosslinkable group in its side chain can also be used. The term "crosslinkable group" as used herein means a group capable of crosslinking the binder upon a chemical reaction which is caused in the color-forming composition, when exposed to light. A chemical structure of the crosslinkable group is not particularly limited as long as the crosslinkable group has such a function and, for example, an ethylenically unsaturated group is preferred as a functional group capable of undergoing addition polymerization. Also, functional groups described in Paragraph Nos. [0130] to [0139] of JP-A-2007-17948 are exemplified.

The polyurethane resin having a crosslinkable group in its side chain preferably used in the invention can be obtained by a polyaddition reaction of (i) a diisocyanate compound, (ii) a diol compound having a carboxyl group, (iii) a diisocyanate compound having a crosslinkable group and, if desired, (iv) a diol compound containing no carboxyl group and (v) a compound having an amino group.

As the compounds of (i), (ii) and (iii) described above, compounds represented by formulae (4) to (10) and specific compounds described in Paragraph Nos. [0142] to [0167] of JP-A-2007-17948 are exemplified. As the compound of (iv), compounds represented by formula (A'), formulae (a) to (e) and formulae (11) to (22) and specific compounds described in Paragraph Nos. [0180] to [0225] of JP-A-2007-17948 are exemplified. As the compound of (v), compounds represented by formulae (31) and (32) and specific compounds described in Paragraph Nos. [0227] to [0230] of JP-A-2007-17948 are exemplified. Also, a polyurethane resin obtained by introducing a crosslinkable group into polyurethane having a carboxyl group by a polymer reaction as described in JP-A-2003-270775 is also used.

Although the binder can be incorporated into the color-forming composition in an optional amount, the content of the binder is preferably from 10 to 95% by weight, more preferably from 20 to 90% by weight, based on the total content of the color-forming composition.

The binder for use in the image-recording layer of lithographic printing plate precursor according to the invention is preferably a binder used in a lithographic printing plate precursor of on-press development type (hereinafter, also referred to as a binder for on-press development).

As the binder for on-press development, a binder having an alkylene oxide chain is preferred. The binder having an alkylene oxide chain may have a poly(alkylene oxide) moiety in the main chain thereof or in the side chain thereof, or may be a graft polymer having a poly(alkylene oxide) in its side chain or a block copolymer composed of a block constituted by a repeating unit containing a poly(alkylene oxide) and a block constituted by a repeating unit not containing an (alkylene oxide).

In the case where the poly(alkylene oxide) moiety is present in the main chain, a polyurethane resin is preferred. In the case where the poly(alkylene oxide) moiety is present in the side chain, a polymer constituting its main chain includes a (meth)acrylic resin, a polyvinyl acetal resin, a polyurethane resin, a polyurea resin, a polyimide resin, a polyamide resin, an epoxy resin, a polystyrene resin, a novolac type phenolic resin, a polyester resin, a synthesis rubber and a natural rubber. In particular, a (meth)acrylic resin is preferred.

The alkylene oxide is preferably an alkylene oxide having from 2 to 6 carbon atoms, and particularly preferably an ethylene oxide or a propylene oxide.

A repeating number of alkylene oxide in the poly(alkylene oxide) moiety is suitably from 2 to 120, preferably from 2 to 70, and more preferably from 2 to 50.

It is preferred that the repeating number of alkylene oxide is 120 or less because both the printing durability as to abrasion and the printing durability as to ink receptivity are not degraded.

The poly(alkylene oxide) moiety is preferably introduced into a side chain of the binder as a structure represented by formula (AO) shown below. More preferably, it is introduced into a side chain of a (meth)acrylic resin as a structure represented by formula (AO) shown below.

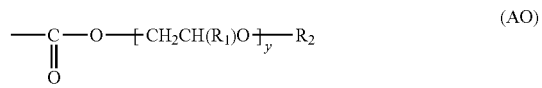

(AO)

In formula (AO), y represents a number from 2 to 120, $R_1$ represents a hydrogen atom or an alkyl group, and $R_2$ represents a hydrogen atom or an organic group.

The organic group is preferably an alkyl group having from 1 to 6 carbon atoms and includes a methyl group, an ethyl group, an n-propyl group, an isopropyl group, an n-butyl group, a sec-butyl group, an isobutyl group, a tert-butyl group, an n-pentyl group, an isopentyl group, a neopentyl group, an n-hexyl group, an isohexyl group, a 1,1-dimethylbutyl group, a 2,2-dimethylbutyl group, a cyclopentyl group and a cyclohexyl group.

In formula (AO), y is preferably from 2 to 70, and more preferably from 2 to 50. $R_1$ is preferably a hydrogen atom or a methyl group, and particularly preferably a hydrogen atom. $R_2$ is particularly preferably a hydrogen atom or a methyl group.

The binder may have a crosslinking property in order to improve the film strength of the image area. In order to impart the crosslinking property to the polymer, a crosslinkable functional group, for example, an ethylenically unsaturated bond is introduced into a main chain or a side chain of the polymer. The crosslinkable functional group may be introduced by copolymerization.

Examples of the polymer having an ethylenically unsaturated bond in the main chain of molecule thereof include poly-1,4-butadiene and poly-1,4-isoprene.

Examples of the polymer having an ethylenically unsaturated bond in the side chain of molecule thereof include a polymer of an ester or amide of acrylic acid or methacrylic acid, which is a polymer wherein the ester or amido residue (R in —COOR or —CONHR) has an ethylenically unsaturated bond.

Examples of the residue (R described above) having an ethylenically unsaturated bond include —$(CH_2)_n$ $CR^1$=$CR^2R^3$, —$(CH_2O)_nCH_2CR^1$=$CR^2R^3$, —$(CH_2CH_2O)_nCH_2CR^1$=$CR^2R^3$, —$(CH_2)_n$NH—CO—O—$CH_2CR^1$=$CR^2R^3$, —$(CH_2)_n$—O—CO—$CR^1$=$CR^2R^3$ and —$(CH_2CH_2O)_2$—X (wherein $R^1$ to $R^3$ each represents a hydrogen atom, a halogen atom or an alkyl group having from 1 to 20 carbon atoms, an aryl group, an alkoxy group or an aryloxy group, or $R^1$ and $R^2$ or $R^1$ and $R^3$ may be combined with each other to form a ring. n represents an integer from 1 to 10. X represents a dicyclopentadienyl residue).

Specific examples of the ester residue include —$CH_2CH$=$CH_2$ (described in JP-B-7-21633), —$CH_2CH_2O$—$CH_2CH$=$CH_2$, —$CH_2C(CH_3)$=$CH_2$, —$CH_2CH$=$CH$—$C_6H_5$, —$CH_2CH_2OCOCH$=$CH$—$C_6H_5$, —$CH_2CH_2$—NHCOO—$CH_2CH$=$CH_2$ and —$CH_2CH_2O$—X (wherein X represents a dicyclopentadienyl residue).

Specific examples of the amido residue include —$CH_2CH$=$CH_2$, —$CH_2CH_2$—Y (wherein Y represents a cyclohexene residue) and —$CH_2CH_2$—OCO—CH=$CH_2$.

The binder having a crosslinking property is cured, for example, by addition of a free radical (a polymerization initiating radical or a growing radical of a polymerizable compound in the process of polymerization) to the crosslinkable functional group of the polymer and undergoing addition polymerization between the polymers directly or through a polymerization chain of the polymerizable compound to form crosslinkage between the polymer molecules. Alternately, it is cured by generation of a polymer radical upon extraction of an atom (for example, a hydrogen atom on a carbon atom adjacent to the functional crosslinkable group) in the polymer by a free radical and connecting the polymer radicals with each other to form cross-linkage between the polymer molecules.

The content of the crosslinkable group (content of the radical polymerizable unsaturated double bond determined by iodine titration) in the binder is preferably from 0.1 to 10.0 mmol, more preferably from 1.0 to 7.0 mmol, particularly preferably from 2.0 to 5.5 mmol, based on 1 g of the binder from the standpoint of good sensitivity and good preservation stability.

Specific examples (1) to (11) of the binder for on-press development are set forth below, but the invention should not be construed as being limited thereto. In the exemplified compounds described below, a numerical value appended to each repeating unit (numerical value appended to a repeating unit of a main chain) indicates a mole percent of the repeating unit. A numerical value appended to a repeating unit of a side chain indicates a repeating number of the repeating unit.

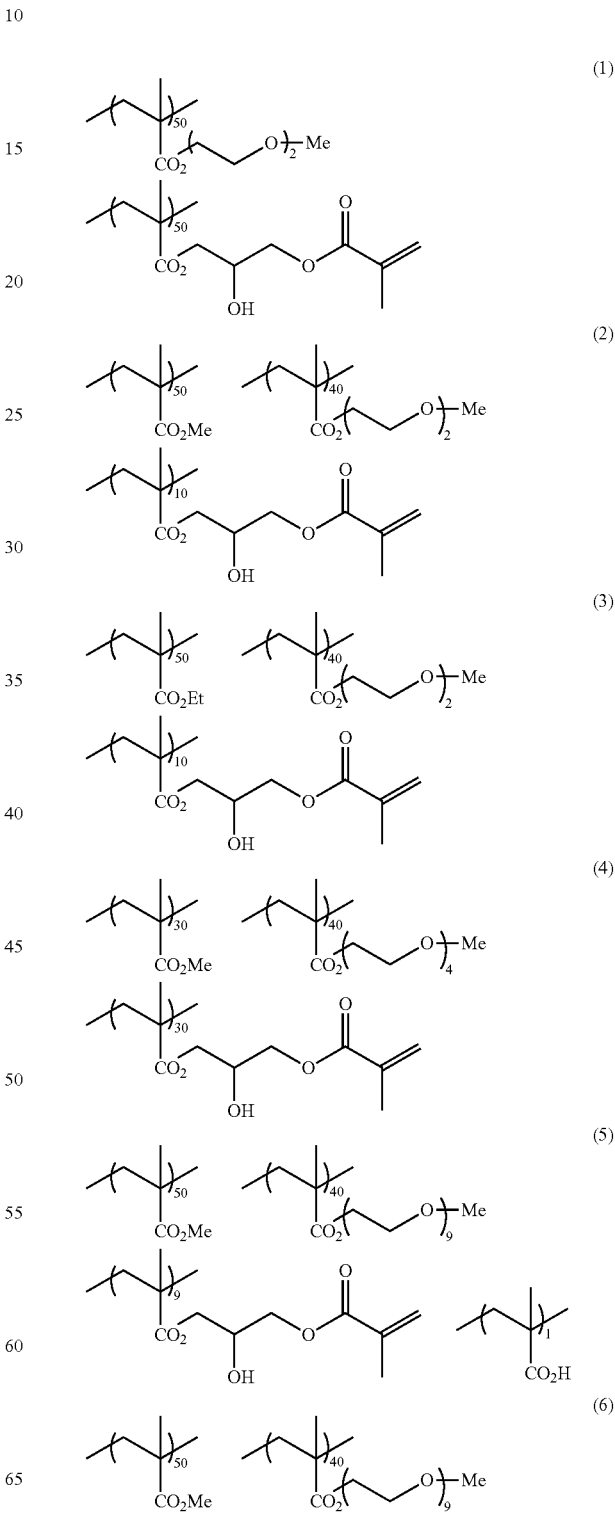

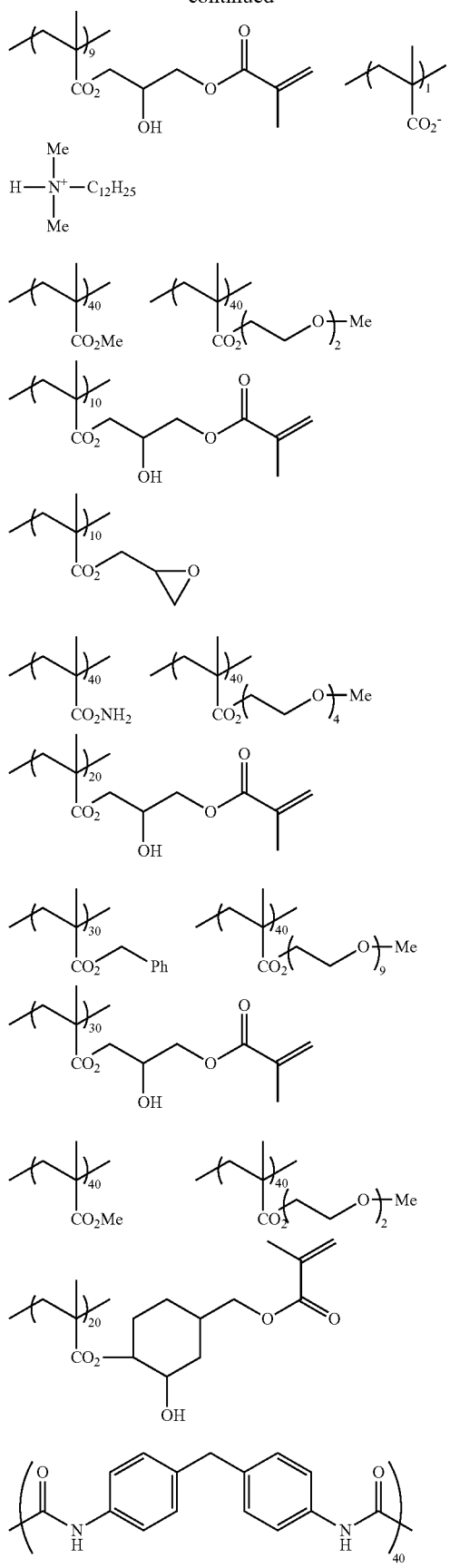

(7)

(8)

(9)

(10)

(11)

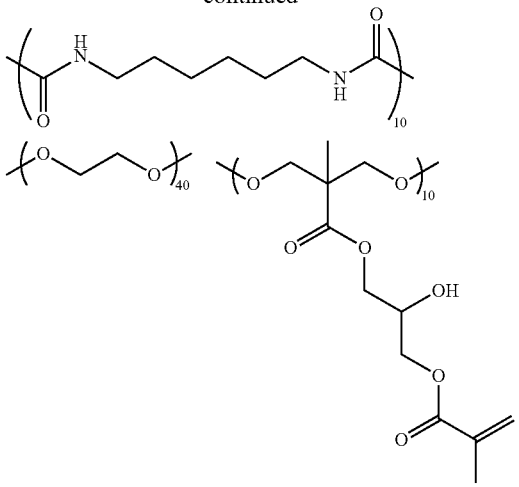

As to molecular weight of the binder, the weight average molecular weight (Mw) determined by a GPC method and calculated in terms of polystyrene is preferably 2,000 or more, more preferably 5,000 or more, and still more preferably from 10,000 to 300,000.

According to the invention, a hydrophilic polymer, for example, polyacrylic acid or polyvinyl alcohol described in JP-A-2008-195018 may be used in combination, if desired. Further, an oleophilic polymer may be used in combination with a hydrophilic polymer.

In the case of applying the color-forming composition according to the invention to an image-recording layer of lithographic printing plate precursor, as to the configuration of the binder, it may be present as a binder acting as a bond of each ingredient or in the form of fine particle in the color-forming composition. In the case of existing in the form of fine particle, the average particle size thereof is ordinarily from 10 to 1,000 nm, preferably from 20 to 300 nm, and particularly preferably from 30 to 120 nm.

[Infrared Curable Color-forming Composition]

The infrared curable color-forming composition according to the invention contains (C) a radical initiator and (D) a polymerizable compound in addition to the specific color-forming compound (A) and the binder (B) described above. The infrared curable color-forming composition has a function of forming a colored and cured image by infrared imagewise exposure.

[(C) Radical Initiator]

The radical initiator (C) which can be used in the infrared curable color-forming composition according to the invention is a compound which generates a radical by energy of light, heat or both of them, and can be used by selecting, for example, from known thermal polymerization initiators, compounds containing a bond having small bond dissociation energy and photopolymerization initiators. The radical initiator may be used individually or in combination of two or more thereof.

The radical generator includes, for example, (a) an organic halide, (b) a carbonyl compound, (c) an azo compound, (d) an organic peroxide, (e) a metallocene compound, (f) an azide compound, (g) a hexaarylbiimidazole compound, (h) an organic borate compound, (i) a disulfone compound, (j) an oxime ester compound and (k) an onium salt compound.

As the organic halide (a), for example, compounds described in Paragraph Nos. [0022] to [0023] of JP-A-2008-195018 are preferred.

As the carbonyl compound (b), for example, compounds described in Paragraph No. [0024] of JP-A-2008-195018 are preferred.

As the azo compound (c), for example, azo compounds described in JP-A-8-108621 can be used.

As the organic peroxide (d), for example, compounds described in Paragraph No. [0025] of JP-A-2008-195018 are preferred.

As the metallocene compound (e), for example, compounds described in Paragraph No. [0026] of JP-A-2008-195018 are preferred.

As the azide compound (f), a compound, for example, 2,6-bis(4-azidobenzylidene)-4-methylcyclohexanone is exemplified.

As the hexaarylbiimidazole compound (g), for example, compounds described in Paragraph No. [0027] of JP-A-2008-195018 are preferred.

As the organic borate compound (h), for example, compounds described in Paragraph No. [0028] of JP-A-2008-195018 are preferred.

As the disulfone compound (i), for example, compounds described in JP-A-61-166544 and JP-A-2002-328465 are exemplified.

As the oxime ester compound (j), for example, compounds described in Paragraph Nos. [0028] to [0030] of JP-A-2008-195018 are preferred.

As the onium salt compound (k), onium salts, for example, diazonium salts described in S. I. Schlesinger, *Photogr. Sci. Eng.*, 18, 387 (1974), T. S. Bal et al., *Polymer*, 21, 423 (1980) and JP-A-5-158230, ammonium salts described in U.S. Pat. No. 4,069,055 and JP-A-4-365049, phosphonium salts described in U.S. Pat. Nos. 4,069,055 and 4,069,056, iodonium salts described in European Patent 104,143, U. S. Patent Publication No. 2008/0311520, JP-A-2-150848, JP-A-2008-195018 and J. V. Crivello et al., *Macromolecules*, 10 (6), 1307 (1977), sulfonium salts described in European Patents 370,693, 233,567, 297,443 and 297,442, U.S. Pat. Nos. 4,933,377, 4,760,013, 4,734,444 and 2,833,827 and German Patents 2,904,626, 3,604,580 and 3,604,581, selenonium salts described in J. V. Crivello et al., *J. Polymer Sci., Polymer Chem. Ed.*, 17, 1047 (1979), arsonium salts described in C. S. Wen et al., *Teh, Proc. Conf. Rad. Curing ASIA*, p. 478, Tokyo, October (1988), and azinium salts described in JP-A-2008-195018 are exemplified.

Of the radical initiators described above, the oxime ester compound or the onium salt compound, in particular, the iodonium salt, the sulfonium salt or the azinium salt is more preferred from the standpoint of curing property. In particular, in the case of using in a lithographic printing plate precursor, the iodonium salt or the sulfonium salt is more preferred. Specific examples of these compounds are set forth below, but the invention should not be construed as being limited thereto.

Examples of the oxime ester compound include 2-acetoxyimino-1-(4-phenylthiophenyl)-1-octanone, 2-benzoyloxyimino-1-(4-phenylthiophenyl)-1-octanone, 2-benzoyloxyimino-1-(4-methylthiophenyl)-1-octanone, 2-phenyloxalyloxyimino-1-(4-phenylthiophenyl)-1-octanone, 2-benzoyloxyimino-1-(4-phenylthiophenyl)-1-propanone, 2-benzoyloxyimino-1-(4-phenylthiophenyl)-1,3-butanedione, α-benzoyloxyiminobenzyl 4-morpholinophenyl ketone, α-benzoyloxyiminobenzyl 4-methylthiophenyl ketone, benzyl bis(O-benzoyloxime), acetophenone O-(1-naphthalenesulfinyl)oxime, acetone O-(p-tolyl)sulfonyloxime, acetone O-benzoyloxime, 1-benzoyloxyimino-1-phenylacetonitrile and 1-indanone O-benzoyloxime.

As the iodonium salt, a diphenyliodoniun salt is preferably exemplified, and in particular, a diphenyliodonium salt substituted with an electron donating group, for example, an alkyl group or an alkoxy group is preferred, and an asymmetric diphenyliodonium salt is more preferred. Specific examples of the iodonium salt include diphenyliodonium hexafluorophosphate, 4-methoxyphenyl-4-(2-methylpropyl) phenyliodonium hexafluorophosphate, 4-(2-methylpropyl) phenyl-p-tolyliodonium hexafluorophosphate, 4-hexyloxyphenyl-2,4,6-trimethoxyphenyliodonium hexafluorophosphate, 4-hexyloxyphenyl-2,4-diethoxyphenyliodonium tetrafluoroborate, 4-octyloxyphenyl-2,4,6-trimethoxyphenyliodonium 1-perfluorobutanesulfonate, 4-octyloxyphenyl-2,4,6-trimethoxyphenyliodonium hexafluorophosphate and bis(4-tert-butylphenyl)iodonium hexafluorophosphate.

As the sulfonium salt, a triarylsulfonium salt is preferably exemplified, and in particular, a triarylsulfonium salt substituted with an electron withdrawing group, for example, a halogen atom is preferred, and triarylsulfonium salt substituted with 4 or more halogen atoms is more preferred. Specific examples of the sulfonium salt include triphenylsulfonium hexafluorophosphate, triphenylsulfonium benzoylformate, bis(4-chlorophenyl)phenylsulfonium benzoylformate, bis(4-chlorophenyl)-4-methylphenylsulfonium tetrafluoroborate, tris(4-chlorophenyl)sulfonium 3,5-bis(methoxycarbonyl)benzenesulfonate, tris(4-chlorophenyl) sulfonium hexafluorophosphate and tris(2,4-dichlorophenyl)sulfonium hexafluorophosphate.

Examples of the azinium salt include 1-cyclohexylmethyloxypyridinium hexafluorophosphate, 1-cyclohexyloxy-4-phenylpyridinium hexafluorophosphate, 1-ethoxy-4-phenylpyridinium hexafluorophosphate, 1-(2-ethylhexyloxy)-4-phenylpyridinium hexafluorophosphate, 4-chloro-1-cyclohexylmethyloxypyridinium hexafluorophosphate, 1-ethoxy-4-cyanopyridinium hexafluorophosphate, 3,4-dichloro-1-(2-ethylhexyloxyl)pyridinium hexafluorophosphate, 1-benzyloxy-4-phenylpyridinium hexafluorophosphate, 1-phenethyloxy-4-phenylpyridinium hexafluorophosphate, 1-(2-ethylhexyloxy)-4-phenylpyridinium p-toluenesulfonate, 1-(2-ethylhexyloxy)-4-phenylpyridinium perfluorobutanesulfonate, 1-(2-ethylhexyloxy)-4-phenylpyridinium bromide and 1-(2-ethylhexyloxy)-4-phenylpyridinium tetrafluoroborate.

The content of the radical initiator is preferably from 0.1 to 50% by weight, more preferably from 0.5 to 30% by weight, particularly preferably from 0.8 to 20% by weight, based on the total solid content of the infrared curable color-forming composition or the image-recording layer of lithographic printing plate precursor.

[(D) Polymerizable Compound]

The polymerizable compound (D) which can be used in the infrared curable color-forming composition according to the invention is an addition-polymerizable compound having at least one ethylenically unsaturated double bond, and it is selected from compounds having at least one, preferably two or more, terminal ethylenically unsaturated double bonds. The polymerizable compound has a chemical form, for example, a monomer, a prepolymer, specifically, a dimer, a trimer or an oligomer, or a mixture thereof. The composition containing the polymerizable compound according to the invention is a color-forming curable composition having a function of polymerization curing in addition to the color-forming property.

Examples of the monomer include an unsaturated carboxylic acid (for example, acrylic acid, methacrylic acid, itaconic acid, crotonic acid, isocrotonic acid or maleic acid) and an ester or an amide thereof. Preferably, an ester of an unsaturated carboxylic acid with a polyhydric alcohol compound and an amide of an unsaturated carboxylic acid with a polyvalent amine compound are used. An addition reaction product of an unsaturated carboxylic acid ester or amide having a nucleophilic substituent, for example, a hydroxy group, an amino group or a mercapto group, with a monofunctional or polyfunctional isocyanate or an epoxy compound, or a dehydration condensation reaction product of the unsaturated carboxylic acid ester or amide with a monofunctional or polyfunctional carboxylic acid is also preferably used. Moreover, an addition reaction product of an unsaturated carboxylic acid ester or amide having an electrophilic substituent, for example, an isocyanate group or an epoxy group with a monofunctional or polyfunctional alcohol, amine or thiol, or a substitution reaction product of an unsaturated carboxylic acid ester or amide having a releasing substituent, for example, a halogeno group or a tosyloxy group with a monofunctional or polyfunctional alcohol, amine or thiol is also preferably used. In addition, compounds in which the unsaturated carboxylic acid described above is replaced by an unsaturated phosphonic acid, styrene, vinyl ether or the like can also be used. These compounds are described, for example, in JP-T-2006-508380, JP-A-2002-287344, JP-A-2008-256850, JP-A-2001-342222, JP-A-9-179296, JP-A-9-179297, JP-A-9-179298, JP-A-2004-294935, JP-A-2006-243493, JP-A-2002-275129, JP-A-2003-64130, JP-A-2003-280187 and JP-A-10-333321.

Specific examples of the monomer, which is an ester of a polyhydric alcohol compound with an unsaturated carboxylic acid, include, as an acrylic acid ester, for example, ethylene glycol diacrylate, 1,3-butanediol diacrylate, tetramethylene glycol diacrylate, propylene glycol diacrylate, trimethylolpropane triacrylate, hexanediol diacrylate, tetraethylene glycol diacrylate, pentaerythritol tetraacrylate, sorbitol triacrylate, isocyanuric acid ethylene oxide (EO) modified triacrylate and polyester acrylate oligomer. As a methacrylic acid ester, for example, tetramethylene glycol dimethacrylate, neopentyl glycol dimethacrylate, trimethylolpropane trimethacrylate, ethylene glycol dimethacrylate, pentaerythritol trimethacrylate, bis[p-(3-methacryloxy-2-hydroxypropoxy)phenyl]dimethylmethane and bis[p-(methacryloxyethoxy)phenyl]dimethylmethane are exemplified. Specific examples of the monomer, which is an amide of a polyvalent amine compound with an unsaturated carboxylic acid, include methylene bisacrylamide, methylene bismethacrylamide, 1,6-hexamethylene bisacrylamide, 1,6-hexamethylene bismethacrylamide, diethylenetriamine trisacrylamide, xylylene bisacrylamide and xylylene bismethacrylamide.

A urethane type addition-polymerizable compound produced using an addition reaction between an isocyanate and a hydroxy group is also preferably used and specific examples thereof include a vinylurethane compound having two or more polymerizable vinyl groups per molecule obtained by adding a vinyl monomer containing a hydroxy group represented by formula (M) shown below to a polyisocyanate compound having two or more isocyanate groups per molecule, described in JP-B-48-41708.

 (M)

(in formula (M), $R^4$ and $R^5$ each independently represents H or $CH_3$.)

Also, urethane acrylates described in JP-A-51-37193, JP-B-2-32293, JP-B-2-16765, JP-A-2003-344997 and JP-A-2006-65210, urethane compounds having an ethylene oxide skeleton described in JP-B-58-49860, JP-B-56-17654, JP-B-62-39417, JP-B-62-39418, JP-A-2000-250211 and JP-A-2007-94138, and urethane compounds having a hydrophilic group described in U.S. Pat. No. 7,153,632, JP-T-8-505958, JP-A-2007-293221 and JP-A-2007-293223 are preferably used.

Details of the method of using the polymerizable compound, for example, selection of the structure, individual or combination use or addition amount, can be optionally determined in consideration of the use of the final infrared curable color-forming composition or lithographic printing plate precursor.

The content of the polymerizable compound is, in general, preferably from 5 to 75% by weight, more preferably from 10 to 70% by weight, particularly preferably from 15 to 60% by weight, based on the total solid content of the infrared curable color-forming composition or lithographic printing plate precursor.

[Application of Infrared Sensitive Color-forming Composition and Infrared Curable Color-forming Composition]

The infrared sensitive color-forming composition and infrared curable color-forming composition may further contain known additives which are ordinarily used in the infrared sensitive color-forming composition and infrared curable color-forming composition depending on the purpose.

The color-forming composition is dissolved or dispersed in an appropriate solvent to prepare a coating solution, and the coating solution is coated on an appropriate support or the like and dried to form a color-forming composition film, thereby producing an image-forming material. As the image-forming material, an image-forming material which utilizes color formation and an image-forming material which utilizes color formation and polymerization curing by image exposure, for example, a lithographic printing plate precursor, a printed circuit board, a color filter or a photomask are exemplified.

The image-forming material is exposed by a light source emitting an infrared ray. As the light source, for example, a solid laser or semiconductor laser emitting an infrared ray is preferably exemplified.

[Lithographic Printing Plate Precursor]

The lithographic printing plate precursor according to the invention comprises on a support, an image-recording layer containing the infrared curable color-forming composition described above. The lithographic printing plate precursor according to the invention may be provided with, if desired, an undercoat layer between the support and the image-recording layer, or a protective layer on the image-recording layer.

Hereinafter, the constituting elements of the lithographic printing plate precursor are described.

[Image-recording Layer]

The image-recording layer of lithographic printing plate precursor is required to have development aptitude and printing aptitude. Therefore, the curable color-forming composition for use in the image-recording layer can further contain a hydrophobizing precursor and other components described below, in addition to the constituting components of the compound having an infrared absorbing skeleton and a thermochromic skeleton in its molecule wherein the infrared absorbing skeleton and the thermochromic skeleton are connected with a covalent bond or an ionic bond (A), the binder (B), the radical initiator (C) and the polymerizable compound (D) described above.

(Hydrophobizing Precursor)

A hydrophobizing precursor can be used in order to improve the on-press development property of the lithographic printing plate precursor. The hydrophobizing precursor according to the invention means a fine particle capable of converting the image-recording layer to be hydrophobic when heat is applied. The fine particle is preferably at least one fine particle selected from hydrophobic thermoplastic polymer fine particle, thermo-reactive polymer fine particle, polymer fine particle having a polymerizable group, microcapsule having a hydrophobic compound encapsulated and microgel (crosslinked polymer fine particle). Among them, polymer fine particle having a polymerizable group and microgel are preferred.

As the hydrophobic thermoplastic polymer fine particle for use in the invention, hydrophobic thermoplastic polymer fine particles described, for example, in Research Disclosure, No. 33303, January (1992), JP-A-9-123387, JP-A-9-131850, JP-A-9-171249, JP-A-9-171250 and European Patent 931,647 are preferably exemplified.

Specific examples of the polymer constituting the hydrophobic thermoplastic polymer fine particle include a homopolymer or copolymer of a monomer, for example, ethylene, styrene, vinyl chloride, methyl acrylate, ethyl acrylate, methyl methacrylate, ethyl methacrylate, vinylidene chloride, acrylonitrile, vinyl carbazole or an acrylate or methacrylate having a polyalkylene structure, and a mixture thereof. Preferably, polystyrene, a copolymer containing styrene and acrylonitrile and polymethyl methacrylate are exemplified. The average particle size of the hydrophobic thermoplastic polymer fine particle is preferably from 0.01 to 2.0 µm.

As the thermo-reactive polymer fine particle for use in the invention, polymer fine particle having a thermo-reactive group is exemplified. The polymer fine particle having a thermo-reactive group forms a hydrophobized region by crosslinkage due to thermal reaction and change in the functional group involved therein.

As the thermo-reactive group of the polymer fine particle having a thermo-reactive group, although a functional group performing any reaction can be used as long as a chemical bond is formed, a polymerizable group is preferred. For instance, an ethylenically unsaturated group (for example, an acryloyl group, a methacryloyl group, a vinyl group or an allyl group) performing a radical polymerization reaction, a cationic polymerizable group (for example, a vinyl group, a vinyloxy group, an epoxy group or an oxetanyl group), an isocyanate group or a blocked form thereof, an epoxy group or a vinyloxy group performing an addition reaction and a functional group having an active hydrogen atom (for example, an amino group, a hydroxy group or a carboxyl group) as the reaction partner thereof, a carboxyl group performing a condensation reaction and a hydroxy group or an amino group as the reaction partner thereof, and an acid anhydride performing a ring opening addition reaction and an amino group or a hydroxy group as the reaction partner thereof are preferably exemplified.

As the microcapsule for use in the invention, microcapsule having all or part of the constituting components of the image-recording layer encapsulated as described, for example, in JP-A-2001-277740 and JP-A-2001-277742 is exemplified. The constituting components of the image-recording layer may be present outside the microcapsule. It is a preferred embodiment of the image-recording layer containing microcapsule that the hydrophobic constituting components are encapsulated in the microcapsule and the hydrophilic components are present outside the microcapsule.

According to the invention, an embodiment containing a crosslinked resin particle, that is, a microgel, can be used. The microgel can contain a part of the constituting components of the image-recording layer at least one of in the inside and on the surface thereof. In particular, an embodiment of a reactive microgel containing a radical polymerizable group on the surface thereof is preferred in view of the image-forming sensitivity and printing durability.

In order to perform microencapsulation or microgelation of the constituting component of the image-recording layer, known methods can be used.

The average particle size of the microcapsule or the microgel is preferably from 0.01 to 3.0 µm, more preferably from 0.05 to 2.0 µm, and particularly preferably from 0.10 to 1.0 µm. In the range described above, good resolution and good aging stability are achieved.

The content of the hydrophobizing precursor is preferably from 5 to 90% by weight based on the total solid content of the image-recording layer.

(Other Components)

The image-recording layer according to the invention may further contain other components, if desired.

(1) Hydrophilic Low Molecular Weight Compound

The image-recording layer according to the invention may contain a hydrophilic low molecular weight compound in order to improve the on-press development property without accompanying the decrease in the printing durability.

The hydrophilic low molecular weight compound includes a water-soluble organic compound, for example, a glycol, e.g., ethylene glycol, diethylene glycol, triethylene glycol, propylene glycol, dipropylene glycol or tripropylene glycol, or an ether or ester derivative thereof, a polyol, e.g., glycerol, pentaerythritol or tris(2-hydroxyethyl) isocyanurate, an organic amine, e.g., triethanol amine, diethanol amine or monoethanol amine, or a salt thereof, an organic sulfonic acid, e.g., an alkyl sulfonic acid, toluene sulfonic acid or benzene sulfonic acid, or a salt thereof, an organic sulfamic acid, e.g., an alkyl sulfamic acid, or a salt thereof, an organic sulfuric acid, e.g., an alkyl sulfuric acid or an alkyl ether sulfuric acid, or a salt thereof, an organic phosphonic acid, e.g., phenyl phosphonic acid, or a salt thereof, an organic carboxylic acid, e.g., tartaric acid, oxalic acid, citric acid, malic acid, lactic acid, gluconic acid or an amino acid, or a salt thereof, and a betaine.

According to the invention, it is preferred to incorporate at least one compound selected from a polyol, an organic sulfate, an organic sulfonate and a betaine.

Specific examples of the organic sulfonate include an alkylsulfonate, for example, sodium n-butylsulfonate, sodium n-hexylsulfonate, sodium 2-ethylhexylsulfonate, sodium cyclohexylsulfonate or sodium n-octylsulfonate; an alkylsulfonate containing an ethylene oxide chain, for example, sodium 5,8,11-trioxapentadecane-1-sulfonate, sodium 5,8,11-trioxaheptadecane-1-sulfonate, sodium 13-ethyl-5,8,11-trioxaheptadecane-1-sulfonate or sodium 5,8,11,14-tetraoxatetracosane-1-sulfonate; an arylsulfonate, for example, sodium benzenesulfonate, sodium p-toluenesulfonate, sodium p-hydroxybenzenesulfonate, sodium p-styrenesulfonate, sodium isophthalic acid dimethyl-5-sulfonate, sodium 1-naphtylsulfonate, sodium 4-hydroxynaphtylsulfonate, disodium 1,5-naphtyldisulfonate or trisodium 1,3,6-naphtyltrisulfonate; and compounds described in Paragraph Nos. [0026] to [0031] of JP-A-2007-276454 and Paragraph Nos. [0020] to [0047] of JP-A-2009-154525. The salt may also be a potassium salt or a lithium salt.

The organic sulfate includes a sulfate of an alkyl, alkenyl, alkynyl, aryl or heterocyclic monoether of polyethylene oxide. The number of ethylene oxide unit is preferably from 1 to 4. The salt is preferably a sodium salt, a potassium salt or a lithium salt. Specific examples thereof include compounds described in Paragraph Nos. [0034] to [0038] of JP-A-2007-276454.

As the betaine, a compound wherein a number of carbon atoms included in a hydrocarbon substituent on the nitrogen atom is from 1 to 5 is preferred. Specific examples thereof include trimethylammonium acetate, dimethylpropylammonium acetate, 3-hydroxy-4-trimethylammoniobutyrate, 4-(1-pyridinio)butyrate, 1-hydroxyethyl-1-imidazolioacetate, trimethylammonium methanesulfonate, dimethylpropylanmmonium methanesulfonate, 3-trimethylammonio-1-porpanesulfonate and 3-(1-pyridinio)-1-porpanesulfonate.

Since the hydrophilic low molecular weight compound has a small structure of hydrophobic portion and almost no surface active function, degradations of the hydrophobicity and film strength in the image area due to penetration of dampening water into the exposed area (image area) of the image-recording layer are prevented and thus, the ink receptivity and printing durability of the image-recording layer can be preferably maintained.

The addition amount of the hydrophilic low molecular weight compound in the image-recording layer is preferably from 0.5 to 20% by weight, more preferably from 1 to 15% by weight, still more preferably from 2 to 10% by weight, based on the total solid content of the image-recording layer. In the range described above, good on-press development property and good printing durability are achieved.

The hydrophilic low molecular weight compounds may be used individually or as a mixture of two or more thereof.

(2) Oil-sensitizing Agent

In order to improve the ink receptivity, an oil-sensitizing agent, for example, a phosphonium compound, a nitrogen-containing low molecular weight compound or an ammonium group-containing polymer can be used in the image-recording layer according to the invention. In particular, in the case where an inorganic stratiform compound is incorporated into a protective layer, the oil-sensitizing agent functions as a surface covering agent of the inorganic stratiform compound and prevents deterioration of the ink receptivity during printing due to the inorganic stratiform compound.

As preferred examples of the phosphonium compound, phosphonium compounds described in JP-A-2006-297907 and JP-A-2007-50660 are exemplified. Specific examples of the phosphonium compound include tetrabutylphosphonium iodide, butyltriphenylphosphonium bromide, tetraphenylphosphonium bromide, 1,4-bis(triphenylphosphonio)butane di(hexafluorophosphate), 1,7-bis(triphenylphosphonio)heptane sulfate and 1,9-bis(triphenylphosphonio)nonane naphthalene-2,7-disulfonate.

As the nitrogen-containing low molecular weight compound, an amine salt and a quaternary ammonium salt are exemplified. Also, an imidazolinium salt, a benzimidazolinium salt, a pyridinium salt and a quinolinium salt are exemplified. Of the nitrogen-containing low molecular weight compounds, the quaternary ammonium salt and the pyridinium salt are preferably used. Specific examples the nitrogen-containing low molecular weight compound include tetramethylammonium hexafluorophosphate, tetrabutylammonium hexafluorophosphate, dodecyltrimethylammonium p-toluenesulfonate, benzyltriethylammonium hexafluorophosphate, benzyldimethyloctylammonium hexafluorophosphate, benzyldimethyldodecylammonium hexafluorophosphate and compounds described in Paragraph Nos. [0021] to [0037] of JP-A-2008-284858 and Paragraph Nos. [0030] to [0057] of JP-A-2009-90645.

The ammonium group-containing polymer may be any polymer containing an ammonium group in its structure and is preferably a polymer containing from 5 to 80% by mole of (meth)acrylate having an ammonium group in its side chain as a copolymerization component. Specific examples thereof include polymers described in Paragraph Nos. [0089] to [0105] of JP-A-2009-208458.

As to the ammonium group-containing polymer, its reduced specific viscosity value (unit: ml/g) determined according to the measuring method described in JP-A-2009-208458 is preferably in a range from 5 to 120, more preferably in a range from 10 to 110, and particularly preferably in a range from 15 to 100. When the reduced specific viscosity value described above is calculated in terms of weight average molecular weight (Mw), from 10,000 to 150,000 is preferred, from 17,000 to 140,000 is more preferred, and 20,000 to 130,000 is particularly preferred.

Specific examples of the ammonium group-containing polymer are set forth below.

(1) 2-(Trimethylammonio)ethyl methacrylate p-toluenesulfonate/3,6-dioxaheptyl methacrylate copolymer (molar ratio: 10/90, Mw: 45,000) (2) 2-(Trimethylammonio)ethyl methacrylate hexafluorophosphate/3,6-dioxaheptyl methacrylate copolymer (molar ratio: 20/80, Mw: 60,000)

(3) 2-(Ethyldimethylammonio)ethyl methacrylate p-toluenesulfonate/hexyl methacrylate copolymer (molar ratio: 30/70, Mw: 45,000) (4) 2-(Trimethylammonio)ethyl methacrylate hexafluorophosphate/2-ethylhexyl methacrylate copolymer (molar ratio: 20/80, Mw: 60,000)

(5) 2-(Trimethylammonio)ethyl methacrylate methylsulfate/hexyl methacrylate copolymer (molar ratio: 40/60, Mw: 70,000) (6) 2-(Butyldimethylammonio)ethyl methacrylate hexafluorophosphate/3,6-dioxaheptyl methacrylate copolymer (molar ratio: 25/75, Mw: 65,000)

(7) 2-(Butyldimethylammonio)ethyl acrylate hexafluorophosphate/3,6-dioxaheptyl methacrylate copolymer (molar ratio: 20/80, Mw: 65,000) (8) 2-(Butyldimethylammonio)ethyl methacrylate 13-ethyl-5,8,11-trioxa-1-heptadecanesulfonate/3,6-dioxaheptyl methacrylate copolymer (molar ratio: 20/80, Mw: 75,000) (9) 2-(Butyldimethylammonio)ethyl methacrylate hexafluorophosphate/3,6-dioxaheptyl methacrylate/2-hydroxy-3-methacryloyloxypropyl methacrylate copolymer (molar ratio: 15/80/5, Mw: 65,000)

The content of the oil-sensitizing agent is preferably from 0.01 to 30.0% by weight, more preferably from 0.1 to 15.0% by weight, still more preferably from 1 to 10% by weight, based on the total solid content of the image-recording layer.

(3) Other Components

As other components, for example, a surfactant, a coloring agent, a print-out agent, a polymerization inhibitor, a higher fatty acid derivative, a plasticizer, an inorganic fine particle, an inorganic stratiform compound, a co-sensitizer or a chain transfer agent may further be added to the image-recording layer. Specifically, compounds and addition amounts thereof described, for example, in Paragraph Nos. [0114] to [0159] of JP-A-2008-284817, Paragraph Nos. [0023] to [0027] of JP-A-2006-91479 and Paragraph No. [0060] of U.S. Patent Publication No. 2008/0311520 are preferably used.

(Formation of Image-recording Layer)

The image-recording layer of lithographic printing plate according to the invention is formed, for example, by dispersing or dissolving each of the necessary components described above in a known solvent to prepare a coating solution and coating the coating solution on a support by a known method, for example, bar coater coating, followed by drying as described, for example, in Paragraph Nos. [0142] to [0143] of JP-A-2008-195018. The coating amount (solid content) of the image-recording layer formed on the support after coating and drying may be varied according to the intended purpose but is in general preferably from 0.3 to 3.0 g/m$^2$. In the range described above, good sensitivity and good film property of the image-recording layer are achieved.

[Undercoat Layer]

In the lithographic printing plate precursor according to the invention, it is preferred to provide an undercoat layer (also referred to as an intermediate layer) between the image-recording layer and the support. The undercoat layer strengthens adhesion between the support and the image-recording layer in the exposed area and makes removal of the image-recording layer from the support easy in the unexposed area, thereby contributing improvement in the development property without accompanying degradation of the printing durability. Further, in the case of infrared laser exposure, since the undercoat layer acts as a heat insulating layer, the undercoat layer also has an effect of preventing decrease in sensitivity due to diffusion of heat generated by the exposure into the support.

As a compound for use in the undercoat layer, a polymer having an adsorbing group capable of adsorbing to a surface of support and a hydrophilic group is exemplified. A polymer having a crosslinkable group as well as the adsorbing group and hydrophilic group is preferred for the purpose of improving an adhesion property to the image-recording layer. The compound for use in the undercoat layer may be a low molecular weight compound or a polymer compound. The compounds for use in the undercoat layer may be used in mixture of two or more thereof, if desired.

In the case where the compound for use in the undercoat layer is a polymer compound, a copolymer of a monomer having an adsorbing group, a monomer having a hydrophilic group and a monomer having a crosslinkable group is preferred.

As the adsorbing group capable of adsorbing to a surface of support, a phenolic hydroxy group, a carboxyl group, —PO$_3$H$_2$, —OPO$_3$H$_2$, —CONHSO$_2$—, —SO$_2$NHSO$_2$— or —COCH$_2$COCH$_3$ is preferred. As the hydrophilic group, a sulfo group, a salt thereof or a salt of carboxyl group is preferred. As the crosslinkable group, for example, a methacryl group or an allyl group is preferred.

The polymer compound may contain a crosslinkable group introduced by a salt formation between a polar substituent of the polymer compound and a compound containing a substituent having a counter charge to the polar substituent of the polymer compound and an ethylenically unsaturated bond, and it may also be further copolymerized with a monomer other than those described above, preferably a hydrophilic monomer.

Specifically, a silane coupling agent having an addition-polymerizable ethylenic double bond reactive group described in JP-A-10-282679 and a phosphorus compound having an ethylenic double bond reactive group described in JP-A-2-304441 are preferably exemplified. Low molecular weight compounds or polymer compounds having a crosslinkable group (preferably an ethylenically unsaturated bond group), a functional group capable of interacting with a surface of support and a hydrophilic group described in JP-A-2005-238816, JP-A-2005-125749, JP-A-2006-239867 and JP-A-2006-215263 are also preferably used.

Polymer compounds having an adsorbing group capable of adsorbing to a surface of support, a hydrophilic group and a crosslinkable group described in JP-A-2005-125749 and JP-A-2006-188038 are more preferred.

The content of the unsaturated double bond in the polymer compound for undercoat layer is preferably from 0.1 to 10.0 mmol, more preferably from 0.2 to 5.5 mmol, based on 1 g of the polymer compound.

The weight average molecular weight of the polymer compound for undercoat layer is preferably 5,000 or more, and more preferably from 10,000 to 300,000.

The undercoat layer may contain a chelating agent, a secondary or tertiary amine, a polymerization inhibitor or a compound containing an amino group or a functional group having polymerization inhibition ability and a group capable of interacting with a surface of aluminum support (for example, 1,4-diazabicyclo[2,2,2]octane (DABCO), 2,3,5,6-tetrahydroxy-p-quinone, chloranil, sulfophthalic acid, hydroxyethylethylenediaminetriacetic acid, dihydroxyethylethylenediaminediacetic acid or hydroxyethyliminodiacetic acid) in addition to the compound for the undercoat layer described above in order to prevent the occurrence of stain due to the aging.

The undercoat layer is coated according to a known method. The coating amount (solid content) of the undercoat layer is preferably from 0.1 to 100 mg/m$^2$, and more preferably from 1 to 30 mg/m$^2$.

[Protective Layer]

In the lithographic printing plate precursor according to the invention, it is preferred to provide a protective layer (also referred to as an overcoat layer) on the image-recording layer. The protective layer has a function for preventing, for example, occurrence of scratch in the image-recording layer or ablation caused by exposure with high illuminance laser, in addition to the function for restraining an inhibition reaction against the image formation by means of oxygen blocking.

With respect to the protective layer having such properties, there are described, for example, in U.S. Pat. No. 3,458,311 and JP-B-55-49729. As a polymer having low oxygen permeability for use in the protective layer, any water-soluble polymer and water-insoluble polymer can be appropriately selected to use. The polymers may be used in mixture of two or more thereof, if desired. Specifically, for example, polyvinyl alcohol, a modified polyvinyl alcohol, polyvinyl pyrrolidone, a water-soluble cellulose derivative and poly(meth)acrylonitrile are exemplified.

As the modified polyvinyl alcohol, an acid-modified polyvinyl alcohol having a carboxyl group or a sulfo group is preferably used. Specifically, modified polyvinyl alcohols described in JP-A-2005-250216 and JP-A-2006-259137 are preferably exemplified.

The protective layer according to the invention preferably contains an inorganic stratiform compound in order to enhancing the oxygen blocking property. The inorganic stratiform compound is a particle having a thin tabular shape and includes, for instance, mica, for example, natural mica or synthetic mica, talc represented by the following formula: 3MgO.4SiO.H$_2$O, taeniolite, montmorillonite, saponite, hectorite and zirconium phosphate.

The inorganic stratiform compound preferably used in the invention is a mica compound. As the mica compound, mica, for example, natural mica represented by the following formula: A (B, C)$_{2-5}$ D4 O$_{10}$ (OH, F, O)$_2$, (wherein A represents any one of K, Na and Ca, B and C each represents any one of Fe(II), Fe(III), Mn, Al, Mg and V, and D represents Si or Al) or synthetic mica is exemplified.

Of the micas, examples of the natural mica include muscovite, paragonite, phlogopite, biotite and lepidolite. Examples of the synthetic mica include non-swellable mica, for example, fluorphlogopite KMg$_3$(AlSi$_3$O$_{10}$)F$_2$ or potassium tetrasilic mica KMg$_{2.5}$(Si$_4$O$_{10}$)F$_2$, and swellable mica, for example, Na tetrasilic mica NaMg$_{2.5}$(Si$_4$O$_{10}$)F$_2$, Na or Li taeniolite (Na, Li)Mg$_2$Li(Si$_4$O$_{10}$)F$_2$, or montmorillonite based Na or Li hectorite (Na, Li)$_{1/8}$Mg$_{2/5}$Li$_{1/8}$ (Si$_4$O$_{10}$)F$_2$. Synthetic smectite is also useful.

Of the mica compounds, fluorine based swellable mica is particularly useful in the invention. Specifically, the swellable synthetic mica has a stratiform structure comprising a unit crystal lattice layer having a thickness of approximately from 10 to 15 angstroms, and metallic atom substitution in the lattices thereof is remarkably large in comparison with other clay minerals. As a result, the lattice layer results in lack of positive charge and in order to compensate it, a cation, for example, Li$^+$, Na$^+$, Ca$^{2+}$ or Mg$^{2+}$, is adsorbed between the lattice layers. The cation existing between the lattice layers is referred to as an exchangeable cation and is exchangeable with various cations. In particular, in the case where the cation between the lattice layers is Li$^+$ or Na$^+$, because of a small ionic radius, a bond between the stratiform crystal lattices is week, and the inorganic stratiform compound greatly swells upon contact with water. When share is applied under such a condition, the stratiform crystal lattices are easily cleaved to form a stable sol in water. The swellable synthetic mica has strongly such tendency and is particularly preferably used in the invention.

With respect to the shape of the mica compound, the thinner the thickness or the larger the plane size, as long as smoothness of coated surface and transmission of actinic radiation are not damaged, the better from the standpoint of control of diffusion. Therefore, an aspect ratio of the mica compound is ordinarily 20 or more, preferably 100 or more, particularly preferably 200 or more. The aspect ratio is a ratio of major axis to thickness of particle and can be determined, for example, from a projection drawing of particle by a microphotography. The larger the aspect ratio, the greater the effect obtained.

As to the particle size of the mica compound, an average major axis is from 0.3 to 20 µm, preferably from 0.5 to 10 µm, and particularly preferably from 1 to 5 µm. An average thickness of the particle is 0.1 µm or less, preferably 0.05 µm or less, and particularly preferably 0.01 µm or less. Specifically, for example, in the swellable synthetic mica which is the representative compound, the thickness is approximately from 1 to 50 nm and the plane size (major axis) is approximately from 1 to 20 µm.

The content of the inorganic stratiform compound is preferably from 0 to 60% by weight, more preferably from 3 to 50% by weight, based on the total solid content of the protective layer. In the case where a plural kind of the inorganic stratiform compounds is used together, it is preferred that the total amount of the inorganic stratiform compounds is in the range described above. In the range described above, the oxygen blocking property is increased and good sensitivity is obtained. Also, deterioration of the ink receptivity can be prevented.

The protective layer may contain known additives, for example, a plasticizer for imparting flexibility, a surfactant for improving coating property or an inorganic fine particle for controlling a surface slipping property. Also, the oil-sensitizing agent described with respect to the image-recording layer may also be incorporated into the protective layer.

The protective layer can be coated by a known method. The coating amount of the protective layer is preferably from 0.01 to 10 g/m$^2$, more preferably from 0.02 to 3 g/m$^2$, particularly preferably from 0.02 to 1 g/m$^2$, in terms of the coating amount after drying.

[Support]

As the support of the lithographic printing plate precursor according to the invention, a known support for lithographic printing plate precursor is employed. As the support, an aluminum plate subjected to roughening treatment and anodizing treatment according to a known method is preferred.

Also, an enlarging treatment or a sealing treatment of micropores of the anodized film described in JP-A-2001-253181 and JP-A-2001-322365, a surface hydrophilizing treatment with an alkali metal silicate as described in U.S. Pat. Nos. 2,714,066, 3,181,461, 3,280,734 and 3,902,734, or a surface hydrophilizing treatment with polyvinyl phosphonic acid or the like as described in U.S. Pat. Nos. 3,276,868, 4,153,461 and 4,689,272 may be appropriately selected and applied to the aluminum plate, if desired.

The support preferably has a center line average roughness of 0.10 to 1.2 µm.

The support may have a backcoat layer containing an organic polymer compound described in JP-A-5-45885 or an alkoxy compound of silicon described in JP-A-6-35174, provided on the back surface thereof, if desired.

[Plate Making Method]

The plate making method according to the invention includes a process of image exposure of the lithographic printing plate precursor described above and an on-press development process of developing the exposed lithographic printing plate precursor using oily ink and an aqueous component on a printing machine.

<Exposure Process>

The lithographic printing plate precursor according to the invention can be subjected to image exposure according to a method of scanning exposure of digital data by an infrared laser or the like.

The wavelength of the light source used is preferably from 750 to 1,400 nm. As the light source of 750 to 1,400 nm, a solid laser or semiconductor laser emitting an infrared ray is preferred. The exposure mechanism may be any of an internal drum system, an external drum system and a flatbed system.

The exposure process can be performed by a known method, for example, a platesetter. Also, the exposure process may be performed using a printing machine equipped with an exposure device on the printing machine after mounting the lithographic printing plate precursor on the printing machine.

<On-press Development Process>

In the on-press development process, when the lithographic printing plate precursor after image exposure is subjected to printing as it is by supplying oily ink and an aqueous component without undergoing any development processing, at an early stage of the printing the unexposed area of the lithographic printing precursor is removed and the hydrophilic surface of support is revealed therewith to form the non-image area. As the oily ink and aqueous component, printing ink and dampening water for conventional lithographic printing can be employed, respectively. While either the printing ink or dampening water may be supplied at first on the surface of lithographic printing plate precursor, it is preferred to supply the printing ink at first in view of preventing the dampening water from contamination with the component of the image-recording layer removed.

Thus, the lithographic printing plate precursor is subjected to the on-press development on an offset printing machine and used as it is for printing a large number of sheets.

Moreover, the present invention also relates to a compound represented by formula (7) shown below and a compound represented by formula (8) shown below. These compounds are novel compounds.

(7)

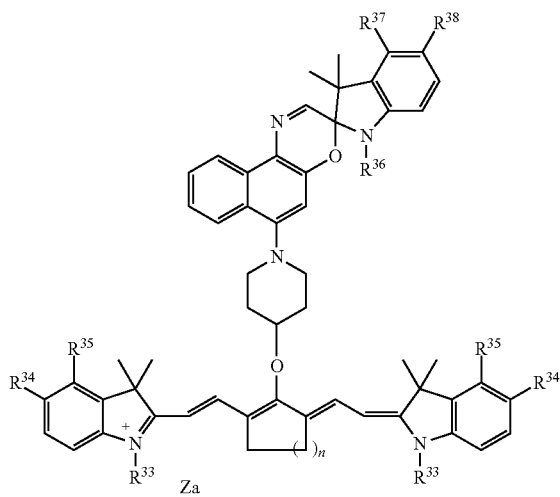

In formula (7), $R^{33}$ and $R^{36}$ each represents an alkyl group. $R^{34}$, $R^{35}$, $R^{37}$ and $R^{38}$ each represents a hydrogen atom or an alkyl group, or $R^{34}$ and $R^{35}$ and $R^{37}$ and $R^{38}$ each may be combined with each other to form a benzene ring. n represents an integer of 1 or 2. Za represents a hexafluorophosphate ion, a paratoluenesulfonate ion or a perchlorate ion.

(8)

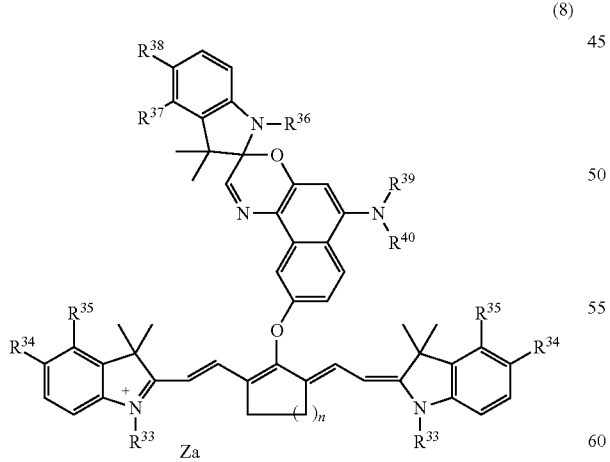

In formula (8), $R^{33}$ and $R^{36}$ each represents an alkyl group. $R^{34}$, $R^{35}$, $R^{37}$ and $R^{38}$ each represents a hydrogen atom or an alkyl group, or $R^{34}$ and $R^{35}$ and $R^{37}$ and $R^{38}$ each may be combined with each other to form a benzene ring. $R^{39}$ and $R^{40}$ each represents an alkyl group, or $R^{39}$ and $R^{40}$ may be combined with each other to form a ring. n represents an integer of 1 or 2. Za represents a hexafluorophosphate ion, a paratoluenesulfonate ion or a perchlorate ion.

In formula (7) and formula (8), the alkyl group represented by any of $R^{33}$ to $R^{40}$ is preferably an alkyl group having from 1 to 10 carbon atoms, and more preferably an alkyl group having from 1 to 5 carbon atoms. The ring formed by combining $R^{39}$ and $R^{40}$ with each other is preferably a 5-membered ring or a 6-membered ring, and more preferably a 6-membered ring.

EXAMPLES

The invention will be described in more detail with reference to the following examples, but the invention should not be construed as being limited thereto. With respect to the polymer compounds used in the examples, unless otherwise particularly defined, a molecular weight means a weight average molecular weight (Mw) and a ratio of repeating units is indicated in mole percent.

Synthesis examples of the specific color-forming compound according to the invention are described below.

I. Synthesis of Spirooxazine Constituting Thermochromic Skeleton

Synthesis of Spirooxazine (1)

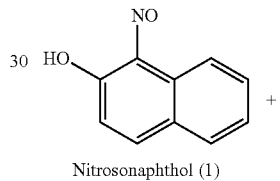

Nitrosonaphthol (1)

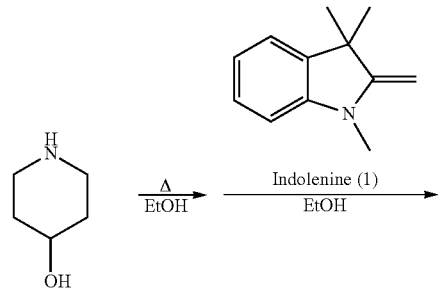

Hydroxypiperidine    Indolenine (1)

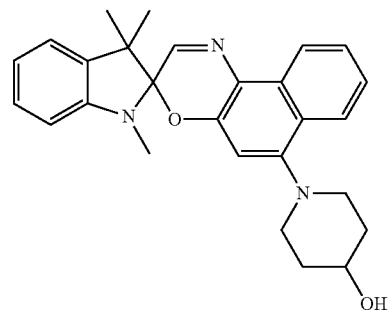

Spirooxazine (1)

According to the synthesis scheme described above, to an ethanol solution (500 g) of 40.0 g (0.231 mol) of Nitrosonaphthol (1) heated at 80° C. was added an ethanol solution (100 g) of 140 g (1.38 mol) of hydroxypiperidine, followed by heating with stirring for 1.5 hours. An ethanol solution (100 g) of 31.0 g (0.179 mol) of Indolenine (1) was added thereto, and the mixture was heated with stirring for 2 hours, and cooled to room temperature. After distilling off the solvent, the residue was purified by silica gel column chromatography (developing solvent; hexane:ethyl acetate: triethylamine=3:1:0.05). The solid obtained was recrystallized from a mixed solution of ethyl acetate-ethanol (10:1 in volume ratio) to obtain 19.1 g (0.0447 mol) of Spirooxazine (1). Yield was 24.7%.

The structure of Spirooxazine (1) obtained was identified by NMR. The identification result is shown below.

($^1$H-NMR 300 MHz deuterated chloroform) 1.35 (s, 3H), 1.36 (s, 3H), 1.84 (br, 2H), 2.09 (br, 2H), 2.75 (s, 3H), 2.82 (br, 2H), 3.33 (br, 2H), 3.89 (br, 1H), 6.57 (d, 1H), 6.60 (s, 1H), 6.89 (dt, 1H), 7.09 (dd, 1H), 7.21 (dt, 1H), 7.39 (d, 1H), 7.55 (dd, 1H), 7.63 (s, 1H), 8.00 (d, 1H), 8.54 (d, 1H)

Synthesis of Spirooxazine (2)

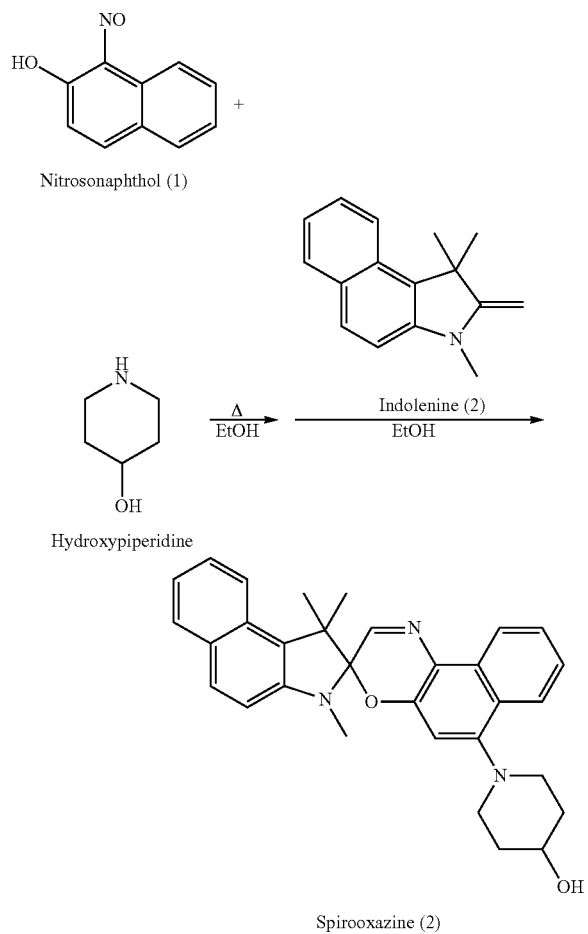

Spirooxazine (2)

According to the synthesis scheme described above, in the same manner as in the synthesis of Spirooxazine (1) described above using 33.6 g (0.0849 mol) of Indolenine (2) as a coupling partner, 6.70 g (0.0140 mmol) of Spirooxazine (2) was obtained. Yield was 16.5%.

The structure of Spirooxazine (2) obtained was identified by NMR. The identification result is shown below.

($^1$H-NMR 300 MHz deuterated chloroform) 1.55 (br, 6H), 1.83 (br, 2H), 2.07 (br, 2H), 2.82 (br, 2H), 2.84 (s, 3H), 3.32 (br, 2H), 3.88 (br, 1H), 6.56 (s, 1H), 6.99 (s, 1H), 7.25 (d, 1H), 7.43 (d, 2H), 7.57 (t, 1H), 7.71 (s, 1H), 7.78 (d, 1H), 7.82 (d, 1H), 7.92 (d, 1H), 8.01 (d, 1H), 8.57 (d, 1H)

Synthesis of Spirooxazine (3)

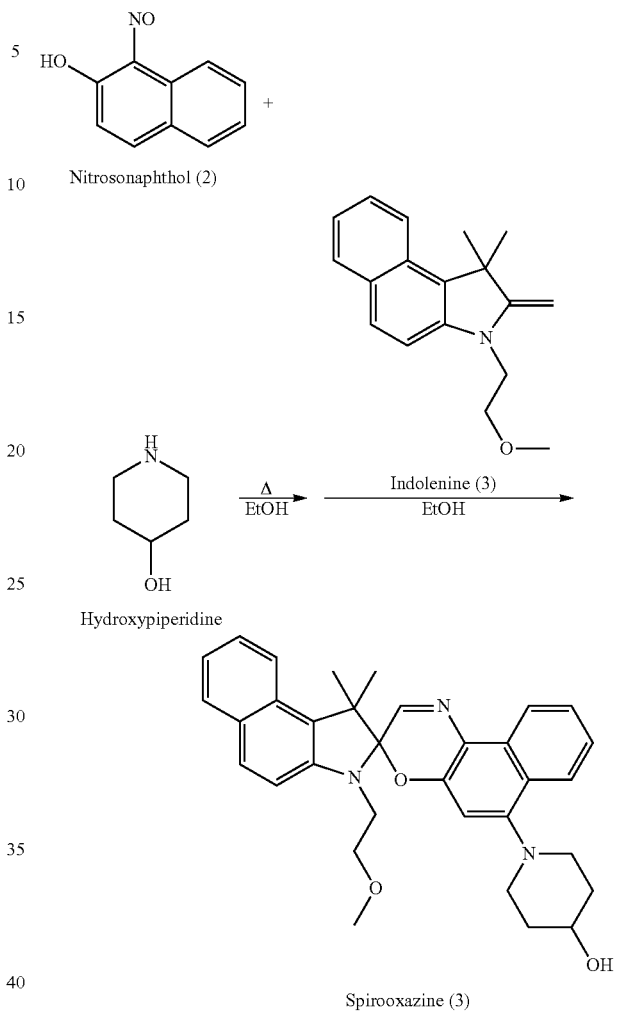

Spirooxazine (3)

According to the synthesis scheme described above, in the same manner as in the synthesis of Spirooxazine (1) described above using 43.9 g (0.100 mol) of Indolenine (3) as a coupling partner, 9.60 g (0.0184 mmol) of Spirooxazine (3) was obtained. Yield was 18.4%.

The structure of Spirooxazine (3) obtained was identified by NMR. The identification result is shown below.

($^1$H-NMR 300 MHz deuterated chloroform) 1.54 (s, 3H), 1.70 (s, 3H), 1.84 (br, 2H), 2.08 (br, 2H), 2.82 (s, 3H), 2.80 (br, 2H), 3.31 (s, 3H), 3.32 (br, 2H), 3.42-3.68 (m, 4H), 3.38 (br, 2H), 4.75 (br, 2H), 6.54 (s, 1H), 7.01 (s, 1H), 7.23 (d, 1H), 7.44 (dt, 2H), 7.74 (s, 1H), 7.76 (d, 1H), 7.81 (d, 1H), 7.90 (d, 1H), 8.01 (d, 1H), 8.56 (d, 1H)

Synthesis of Spirooxazine (4)

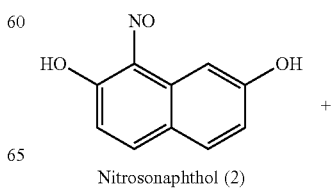

Nitrosonaphthol (2)

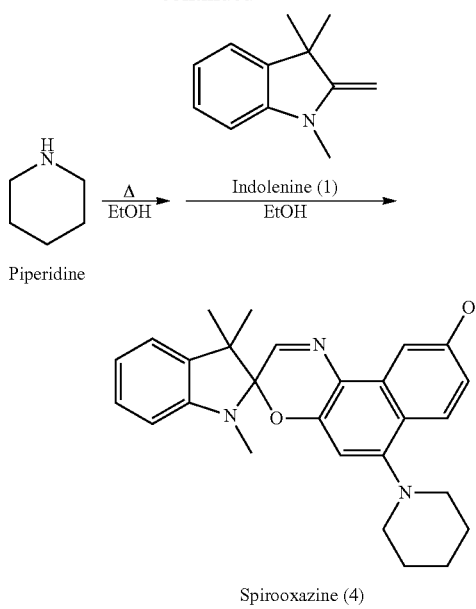

Spirooxazine (4)

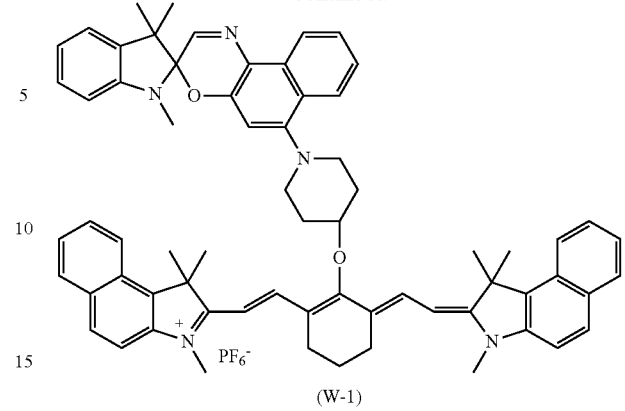

(W-1)

According to the synthesis scheme described above, in the same manner as in the synthesis of Spirooxazine (1) described above using 24.8 g (0.131 mol) of Nitrosonaphthol (2), 67.1 g (0.788 mol) of piperidine and 17.5 g (0.101 mol) of Indolenine (1), 2.8 g (0.00654 mmol) of Spirooxazine (4) was obtained. Yield was 5.0%.

The structure of Spirooxazine (4) obtained was identified by NMR. The identification result is shown below.

($^1$H-NMR 300 MHz deuterated chloroform) 1.40 (s, 3H), 1.41 (s, 3H), 1.53 (br, 4H), 1.59 (br, 2H), 2.75 (s, 3H), 3.07 (br, 4H), 5.35 (s, 1H), 6.57 (d, 1H), 6.60 (s, 1H), 6.86 (d, 1H), 6.89 (dt, 1H), 7.07 (s, 1H), 7.21 (dt, 1H), 7.39 (m, 1H), 7.55 (m, 1H), 7.63 (s, 1H), 8.00 (d, 1H)

II. Synthesis of Specific Color-forming Compound

Synthesis of Specific Color-forming Compound (W-1)

According to the synthesis scheme described above, to an acetone solution (10 g) of 1.4 g (3.30 mmol) of Spirooxazine (1) and 0.5 g (3.50 mmol) of potassium carbonate was dropwise added an acetone solution (5 g) of 2.26 g (3.00 mmol) of IR Dye (1) at room temperature over a period of 5 minutes, and after the completion of the dropwise addition the mixture was stirred at room temperature for 12 hours. After adding 100 g of water, the insoluble component was removed by filtration. The solution component obtained was dropwise added to an aqueous 5% by weight potassium hexafluorophosphate solution (300 g), the solid deposited was collected by filtration to obtain 2.4 g (2.06 mmol) of Specific color-forming compound (W-1). Yield was 68.6%.

The structure of Specific color-forming compound (W-1) obtained was identified by NMR. The identification result is shown below.

($^1$H-NMR 300 MHz deuterated dimethylsulfoxide) 1.35 (s, 3H), 1.36 (s, 3H), 1.80 (br, 2H), 1.84 (q, 6H), 1.96 (s, 12H), 1.89 (br, 2H), 2.09 (br, 2H), 2.71 (br, 4H), 2.75 (s, 3H), 2.82 (br, 2H), 3.33 (br, 2H), 3.89 (br, 1H), 4.43 (br, 4H), 6.45 (d, 2H), 6.59 (d, 1H), 6.60 (s, 1H), 6.89 (dt, 1H), 7.09 (dd, 1H), 7.21 (dt, 1H), 7.39 (m, 1H), 7.53 (t, 2H), 7.55 (m, 1H), 7.63 (s, 1H), 7.66 (t, 2H), 7.76 (d, 2H), 8.00 (d, 1H), 8.07 (t, 4H), 8.31 (d, 2H), 8.34 (d, 2H), 8.54 (d, 1H)

Synthesis of Specific Color-forming Compound (W-4)

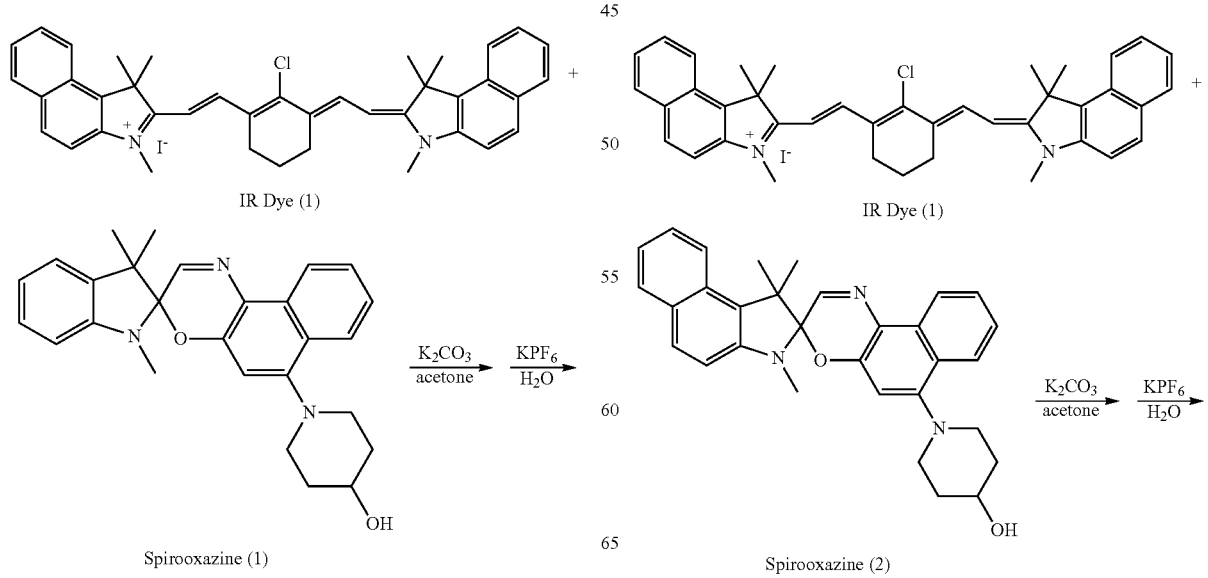

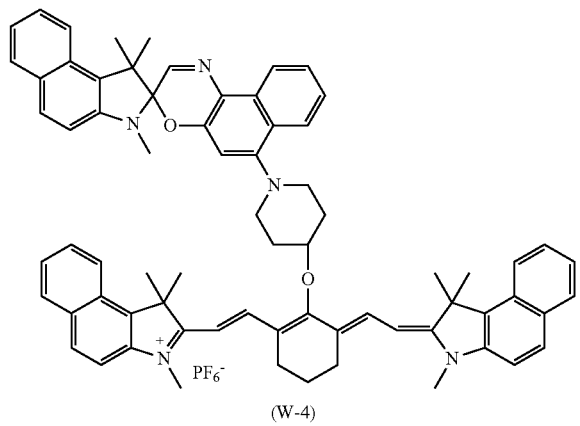

(W-4)

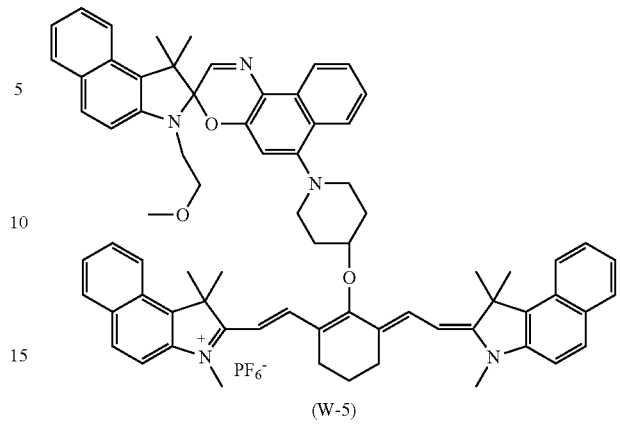

(W-5)

According to the synthesis scheme described above, in the same manner as in the synthesis of Specific color-forming compound (W-1) using 1.58 g (3.31 mol) of Spirooxazine (2), 2.92 g (2.41 mmol) of Specific color-forming compound (W-4) was obtained. Yield was 72.8%.

The structure of Specific color-forming compound (W-4) obtained was identified by NMR. The identification result is shown below.

($^1$H-NMR 300 MHz deuterated dimethylsulfoxide) 1.59 (br, 6H), 1.82 (br, 2H), 1.84 (br, 2H), 1.86 (q, 6H), 1.96 (s, 12H), 2.07 (br, 2H), 2.73 (br, 4H), 2.81 (br, 2H), 2.84 (s, 3H), 3.32 (br, 2H), 3.89 (br, 1H), 4.41 (br, 4H), 6.54 (d, 2H), 6.58 (s, 1H), 6.99 (s, 1H), 7.25 (d, 1H), 7.43 (d, 2H), 7.52 (t, 2H), 7.57 (t, 1H), 7.67 (t, 2H), 7.71 (s, 1H), 7.76-7.79 (m, 4H), 7.82 (d, 1H), 7.92 (d, 1H), 8.01 (d, 1H), 8.09 (t, 4H), 8.31 (d, 2H), 8.38 (d, 2H), 8.57 (d, 1H)

Synthesis of Specific Color-forming Compound (W-5)

According to the synthesis scheme described above, in the same manner as in the synthesis of Specific color-forming compound (W-1) using 1.72 g (3.30 mol) of Spirooxazine (3), 2.83 g (2.25 mmol) of Specific color-forming compound (W-5) was obtained. Yield was 68.1%.

The structure of Specific color-forming compound (W-5) obtained was identified by NMR. The identification result is shown below.

($^1$H-NMR 300 MHz deuterated dimethylsulfoxide) 1.44 (s, 3H), 1.66 (s, 3H), 1.81 (br, 2H), 1.84 (br, 2H), 1.85 (q, 6H), 1.94 (s, 12H), 2.07 (br, 2H), 2.72 (br, 4H), 2.82 (s, 3H), 2.80 (br, 2H), 3.30 (s, 3H), 3.32 (br, 2H), 3.42-3.68 (m, 4H), 3.38 (br, 2H), 4.41 (br, 4H), 4.75 (br, 2H), 6.54 (d, 2H), 6.58 (s, 1H), 7.01 (s, 1H), 7.23 (d, 1H), 7.44 (dt, 2H), 7.52 (t, 2H), 7.57 (t, 1H), 7.68 (t, 2H), 7.74 (s, 1H), 7.76 (d, 1H), 7.78 (d, 2H), 7.81 (d, 1H), 7.90 (d, 1H), 8.01 (d, 1H), 8.09 (t, 4H), 8.31 (d, 2H), 8.38 (d, 2H), 8.56 (d, 1H)

Synthesis of Specific Color-forming Compound (W-8)

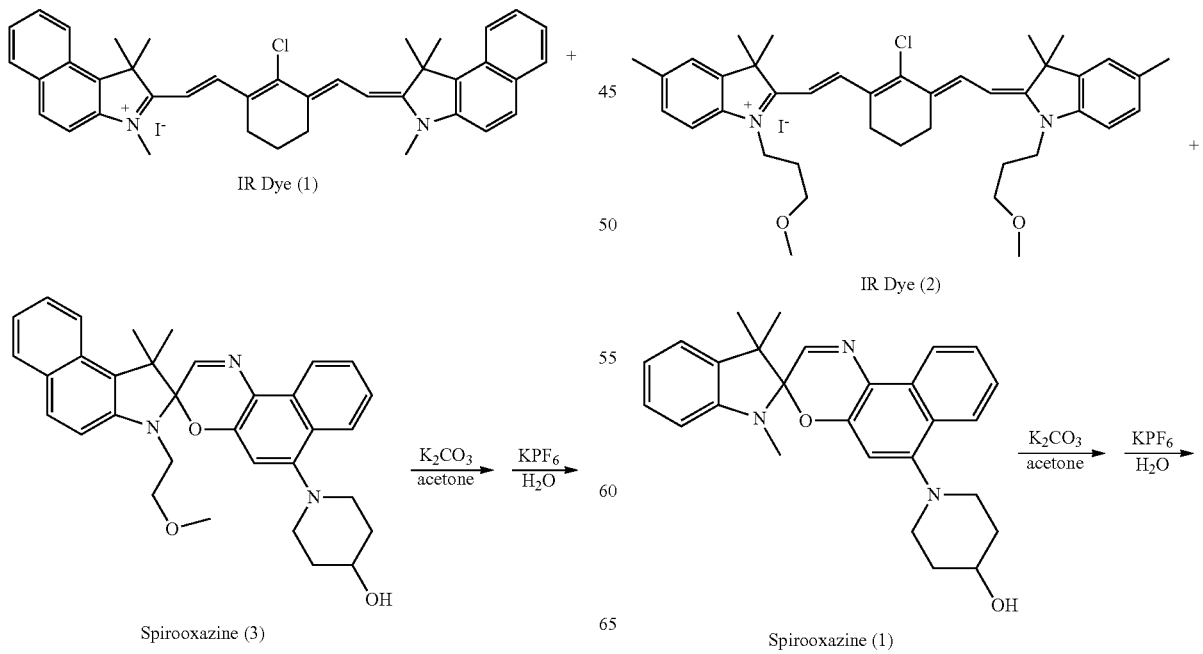

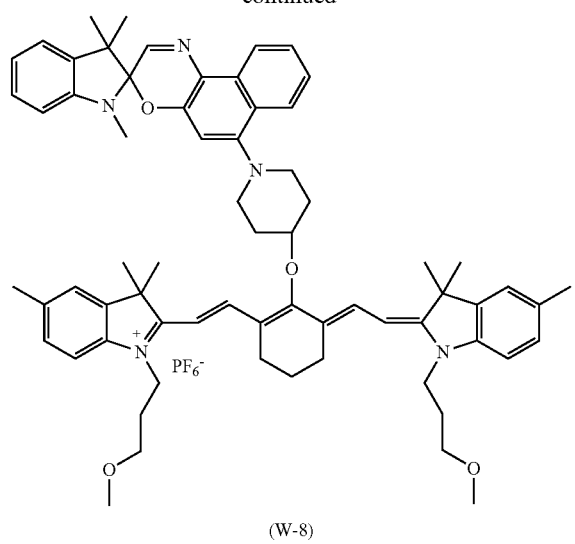

(W-8)

According to the synthesis scheme described above, in the same manner as in the synthesis of Specific color-forming compound (W-1) using 2.31 g (3.00 mmol) of IR Dye (2) and Spirooxazine (1), 2.12 g (1.80 mmol) of Specific color-forming compound (W-8) was obtained. Yield was 60.0%.

The structure of Specific color-forming compound (W-8) obtained was identified by NMR. The identification result is shown below.

($^1$H-NMR 300 MHz deuterated dimethylsulfoxide) 1.34 (s, 3H), 1.36 (s, 3H), 1.78 (br, 2H), 1.81 (br, 2H), 1.85 (br, 4H), 1.94 (s, 12H), 2.09 (br, 2H), 2.34 (s, 6H), 2.55 (t, 4H), 2.72 (br, 4H), 2.75 (s, 3H), 2.80 (br, 2H), 3.33 (br, 2H), 3.89 (br, 1H), 3.93 (br, 4H), 5.68 (d, 2H), 6.58 (d, 1H), 6.60 (s, 1H), 6.68 (d, 2H), 6.89 (dt, 1H), 6.98 (s, 2H), 7.05 (t, 2H), 7.09 (dd, 1H), 7.10 (d, 2H), 7.21 (dt, 1H), 7.39 (d, 1H), 7.46 (d, 2H), 7.56 (dd, 1H), 7.63 (s, 1H), 8.00 (d, 1H), 8.54 (d, 1H)

Synthesis of Specific Color-forming Compound (W-9)

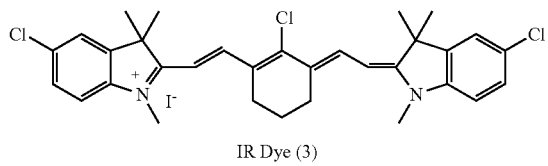

IR Dye (3)

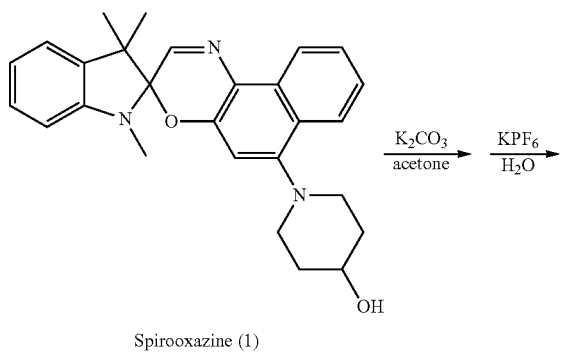

Spirooxazine (1)

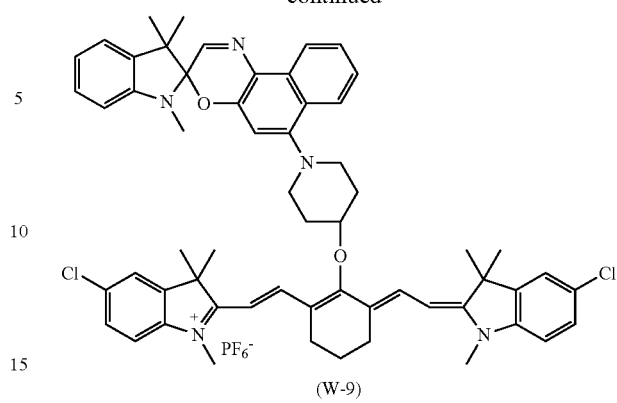

(W-9)

According to the synthesis scheme described above, in the same manner as in the synthesis of Specific color-forming compound (W-1) using 2.17 g (3.00 mmol) of IR Dye (3) and Spirooxazine (1), 2.31 g (2.04 mmol) of Specific color-forming compound (W-9) was obtained. Yield was 68.0%.

The structure of Specific color-forming compound (W-9) obtained was identified by NMR. The identification result is shown below.

($^1$H-NMR 300 MHz deuterated dimethylsulfoxide) 1.32 (s, 3H), 1.33 (s, 3H), 1.78 (br, 2H), 1.80 (br, 2H), 1.85 (t, 6H), 1.92 (s, 12H), 2.10 (br, 2H), 2.34 (s, 6H), 2.55 (t, 4H), 2.72 (br, 4H), 2.75 (s, 3H), 2.80 (br, 2H), 3.33 (br, 2H), 3.89 (br, 1H), 3.93 (br, 4H), 5.68 (d, 2H), 6.58 (d, 1H), 6.60 (s, 1H), 6.69 (d, 2H), 6.90 (dt, 1H), 7.05 (t, 2H), 7.09 (dd, 1H), 7.10 (d, 2H), 7.21 (dt, 1H), 7.25 (s, 2H), 7.39 (d, 1H), 7.56 (dd, 1H), 7.64 (s, 1H), 7.66 (d, 2H), 8.00 (d, 1H), 8.54 (d, 1H)

Synthesis of Specific Color-forming Compound (W-11)

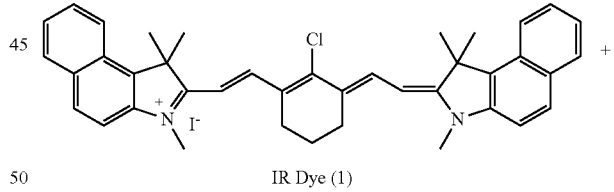

IR Dye (1)

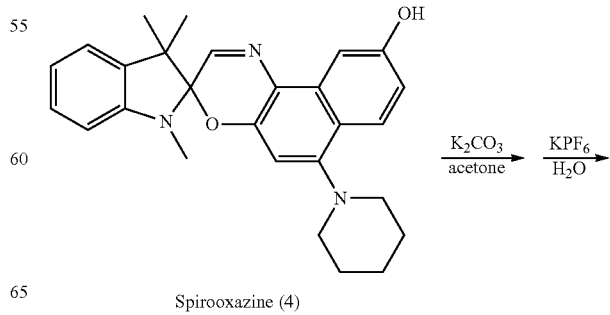

Spirooxazine (4)

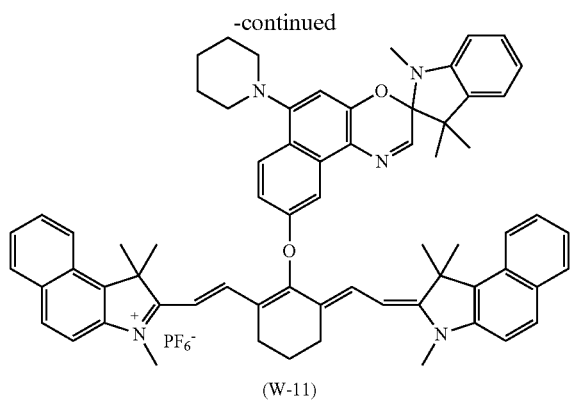

(W-11)

According to the synthesis scheme described above, in the same manner as in the synthesis of Specific color-forming compound (W-1) using IR Dye (1) and 1.41 g (3.30 mmol) of Spirooxazine (4), 2.231 g (1.92 mmol) of Specific color-forming compound (W-11) was obtained. Yield was 58.1%.

The structure of Specific color-forming compound (W-11) obtained was identified by NMR. The identification result is shown below.

($^1$H-NMR 300 MHz deuterated dimethylsulfoxide) 1.43 (s, 3H), 1.45 (s, 3H), 1.51 (br, 4H), 1.62 (br, 2H), 1.82 (br, 2H), 1.86 (q, 6H), 1.96 (s, 12H), 2.73 (br, 4H), 2.75 (s, 3H), 3.07 (br, 4H), 4.41 (br, 4H), 6.54 (d, 2H), 6.57 (d, 1H), 6.60 (s, 1H), 6.86 (d, 1H), 6.89 (dt, 1H), 7.07 (s, 1H), 7.21 (dt, 1H), 7.39 (m, 1H), 7.52 (t, 2H), 7.57 (br, 1H), 7.61 (s, 1H), 7.67 (t, 2H), 7.76-7.79 (m, 4H), 8.09 (t, 4H), 8.31 (d, 2H), 8.00 (d, 1H), 8.38 (d, 2H)

Example 1 to 13 and Comparative Examples 1 to 2

I. Infrared Sensitive Color-forming Composition
I-1. Production of Infrared Sensitive Color-forming Composition Films A-1 to A-13

Infrared sensitive color-forming composition solution (1) shown below was prepared, coated on a polyester film having a thickness of 0.18 mm using a bar so as to have a dry coating amount of 1.0 g/m² and dried in an oven at 100° C. for 60 seconds to produce Infrared sensitive color-forming composition films A-1 to A-13 (for Examples 1 to 13), respectively.

<Infrared Sensitive Color-forming Composition Solution (1)>

| | |
|---|---|
| Polymethyl methacrylate (Mw: 12,000) | 0.636 g |
| Specific color-forming compound (compound shown in Table A) | 0.080 g |
| Fluorine-based surfactant (1) having structure shown below | 0.008 g |
| 2-Butanone | 9.700 g |

The structure of Fluorine-based surfactant (1) is shown below.

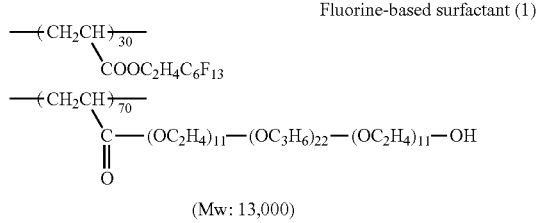

Fluorine-based surfactant (1)

(Mw: 13,000)

I-2. Production of Infrared Sensitive Color-forming Composition A'-1

Infrared sensitive color-forming composition solution (2) shown below was prepared, coated on a polyester film having a thickness of 0.18 mm using a bar so as to have a dry coating amount of 1.0 g/m² and dried in an oven at 100° C. for 60 seconds to produce Infrared sensitive color-forming composition film A'-1 (for Comparative Example 1).

<Infrared Sensitive Color-forming Composition Solution (2)>

| | |
|---|---|
| Polymethyl methacrylate (Mw: 12,000) | 0.636 g |
| Infrared absorbing dye (1) having structure shown below | 0.080 g |
| Thermochromic compound (1) having structure shown below | 0.160 g |
| Fluorine-based surfactant (1) shown above | 0.008 g |
| 2-Butanone | 9.700 g |

The structures of Infrared absorbing dye (1) and Thermochromic compound (1) are shown below.

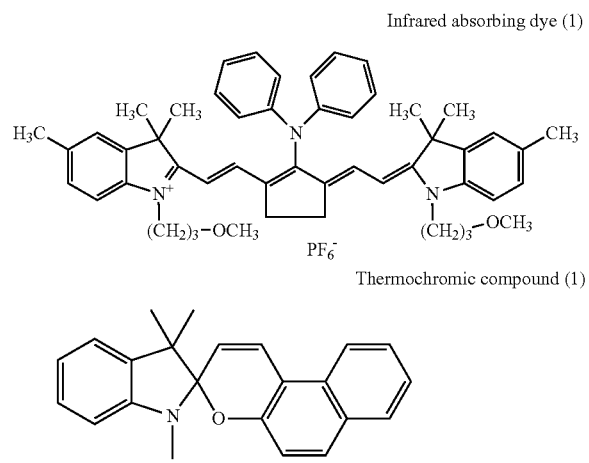

I-3. Production of Infrared sensitive color-forming composition film A'-2

Infrared sensitive color-forming composition solution (3) shown below was prepared, coated on a polyester film having a thickness of 0.18 mm using a bar so as to have a dry coating amount of 1.0 g/m² and dried in an oven at 100° C. for 60 seconds to produce Infrared sensitive color-forming composition film A'-2 (for Comparative Example 2).

<Infrared Sensitive Color-forming Composition Solution (3)>

| | |
|---|---|
| Polymethyl methacrylate (Mw: 12,000) | 0.636 g |
| Comparative color-forming agent aqueous dispersion (1) shown below | 1.900 g |
| Fluorine-based surfactant (1) shown above | 0.008 g |
| 2-Butanone | 9.700 g |

(Production of Comparative Color-forming Agent Aqueous Dispersion (1))

Microgel (MG-1) described in JP-A-2011-213114 was produced according to the synthesis method described therein.

I-4. Evaluation of Color-forming Property of Infrared Sensitive Color-Forming Composition Film The infrared sensitive color-forming composition film produced was exposed by Violet Semiconductor Laser Vx9600 (InGaN semiconductor laser, 405 nm±10 nm) produced by FUJIFILM Electronic Imaging Ltd. at resolution of 2,483 dpi using a 50% square dot as the exposure pattern while changing the output. The exposure was conducted under conditions of 25° C. and 50% RH.

The evaluation of color-forming property was performed by measuring the color formation just after the exposure. The color formation was measured using an L value (luminance) of L*a*b* color system and difference ΔL between an L value of the exposed area and an L value of the unexposed area was determined. As the value of ΔL is larger, it is meant that the color-forming property is more excellent. The measurement was conducted according to SCE (specular competent exclude) system using a spectral colorimeter CM2600d and an operation soft CM-S100W each produced by Konica Minolta, Inc. The results are shown in Table A.

TABLE A

| | Infrared Sensitive Color-forming Composition | Specific Color-forming Compound | Color-forming Property (ΔL) |
|---|---|---|---|
| Example 1 | A-1 | W-1 | 8.5 |
| Example 2 | A-2 | W-4 | 9.5 |
| Example 3 | A-3 | W-5 | 9.5 |
| Example 4 | A-4 | W-6 | 9.0 |
| Example 5 | A-5 | W-7 | 8.5 |
| Example 6 | A-6 | W-8 | 7.5 |
| Example 7 | A-7 | W-9 | 7.5 |
| Example 8 | A-8 | W-10 | 8.0 |
| Example 9 | A-9 | W-11 | 8.5 |
| Example 10 | A-10 | W-12 | 8.0 |
| Example 11 | A-11 | W-14 | 7.5 |
| Example 12 | A-12 | W-15 | 7.5 |
| Example 13 | A-13 | W-19 | 6.5 |
| Comparative Example 1 | A'-1 | — | 4.0 |
| Comparative Example 2 | A'-2 | — | 5.5 |

From the results shown in Table A, it can be seen that the infrared sensitive color-forming composition film according to the invention exhibits the good color-forming property. It is apparent that the effect on thermal color formation based on the combination of the infrared absorbing skeleton and the thermochromic skeleton is extremely large, because the color-forming property is high even in comparison with Comparative Example 1 wherein the thermochromic compound is added in a large amount. Also, it can be seen that as to the bond between both skeletons, the covalent bond exhibits the higher color-forming property in comparison with the ionic bond.

Example 14 to 27 and Comparative Examples 3 to 5

II. Infrared Curable Color-forming Composition
II-1. Production of Infrared Curable Color-Forming Composition Films B-1 to B-13

Infrared curable color-forming composition solution (4) shown below was prepared, coated on a polyester film having a thickness of 0.18 mm using a bar so as to have a dry coating amount of 1.0 g/m² and dried in an oven at 100° C. for 60 seconds to produce Infrared curable color-forming composition films B-1 to B-13 (for Examples 14 to 26), respectively.

<Infrared Curable Color-forming Composition Solution (4)>

| | |
|---|---|
| Binder polymer (1) having structure shown below | 0.636 g |
| Radical initiator (1) having structure shown below | 0.150 g |
| Specific color-forming compound (compound shown in Table B) | 0.080 g |
| Polymerizable compound Tris(acryloyloxyethyl) isocyanurate (NK ESTER A-9300, produced by Shin-Nakamura Chemical Co., Ltd.) | 0.192 g |
| Fluorine-based surfactant (1) shown above | 0.008 g |
| 2-Butanone | 1.091 g |
| 1-Methoxy-2-propanol | 8.609 g |

The structures of Binder polymer (1) and Radical initiator (1) are shown below.

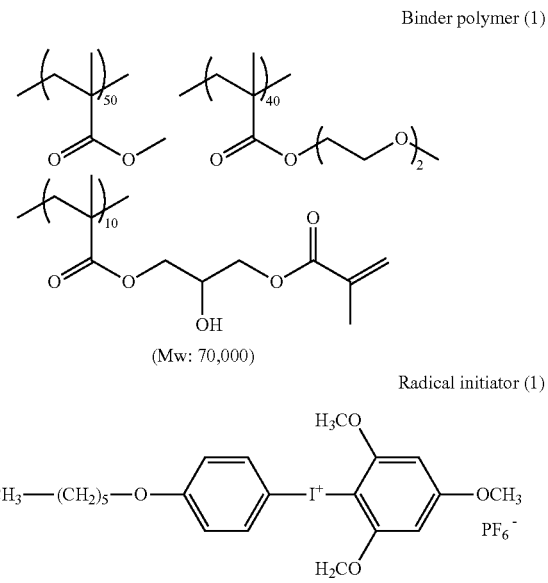

II-2. Production of Infrared Curable Color-forming Composition Film B-14

Infrared curable color-forming composition film B-14 (for Example 27) was produced in the same manner as in Infrared curable color-forming composition film B-3 except for not adding the radical generator.

II-3. Production of Infrared Curable Color-forming Composition Film B'-1

Infrared curable color-forming composition film B'-1 (for Comparative Example 3) was produced in the same manner as in Infrared curable color-forming composition film B-1 except for not adding the specific color-forming compound.

II-4. Production of Infrared Curable Color-forming Composition Film B'-2

Infrared curable color-forming composition solution (5) shown below was prepared, coated on a polyester film having a thickness of 0.18 mm using a bar so as to have a dry coating amount of 1.0 g/m² and dried in an oven at 100° C. for 60 seconds to produce Infrared curable color-forming composition film B'-2 (for Comparative Example 4).

<Infrared Curable Color-forming Composition Solution (5)>

| | |
|---|---|
| Binder polymer (1) shown above | 0.636 g |
| Radical initiator (1) shown above | 0.150 g |

-continued

| | |
|---|---|
| Polymerizable compound<br>Tris(acryloyloxyethyl) isocyanurate (NK ESTER A-9300, produced by Shin-Nakamura Chemical Co., Ltd.) | 0.192 g |
| Infrared absorbing dye (1) shown above | 0.080 g |
| Thermochromic compound (1) shown above | 0.160 g |
| Fluorine-based surfactant (1) shown above | 0.008 g |
| 2-Butanone | 1.091 g |
| 1-Methoxy-2-propanol | 8.609 g |

II-5. Production of Infrared Curable Color-forming Composition Film B'-3

Infrared curable color-forming composition solution (6) shown below was prepared, coated on a polyester film having a thickness of 0.18 mm using a bar so as to have a dry coating amount of 1.0 g/m² and dried in an oven at 100° C. for 60 seconds to produce Infrared curable color-forming composition film B'-3 (for Comparative Example 5).

<Infrared Curable Color-forming Composition Solution (6)>

| | |
|---|---|
| Binder polymer (1) shown above | 0.636 g |
| Radical initiator (1) shown above | 0.150 g |
| Polymerizable compound<br>Tris(acryloyloxyethyl) isocyanurate (NK ESTER A-9300, produced by Shin-Nakamura Chemical Co., Ltd.) | 0.192 g |
| Infrared absorbing dye (1) shown above | 0.080 g |
| Comparative color-forming agent aqueous dispersion (1) shown above | 1.900 g |
| Fluorine-based surfactant (1) shown above | 0.008 g |
| 2-Butanone | 1.091 g |
| 1-Methoxy-2-propanol | 8.609 g |

II-6. Evaluation of Color-forming Property of Infrared Curable Color-forming Composition Film The infrared curable color-forming composition film produced was exposed by TRENDSETTER 3244VX (produced by Creo Co.) equipped with a water-cooled 40 W infrared semiconductor laser under the conditions of output of 11.7 W, a rotational number of an external drum of 250 rpm and resolution of 2,400 dpi. The evaluation of color-forming property of infrared curable color-forming composition film was performed by measuring the color formation just after the exposure and at 2 hours lapse after the exposure kept in a dark place under room temperature condition. The color formation was measured in the same manner as in the infrared sensitive color-forming composition film described above. As the value of ΔL is larger, it is meant that the color-forming property is more excellent. The results are shown in Table B.

TABLE B

| | Infrared Curable Color-forming Composition | Specific Color-forming Compound | Color-forming Property (ΔL) | |
|---|---|---|---|---|
| | | | Just after Exposure | After 2 Hours Lapse |
| Example 14 | B-1 | W-1 | 11 | 9 |
| Example 15 | B-2 | W-4 | 12 | 10 |
| Example 16 | B-3 | W-5 | 12 | 10 |
| Example 17 | B-4 | W-6 | 11.5 | 9.5 |
| Example 18 | B-5 | W-7 | 11 | 9 |
| Example 19 | B-6 | W-8 | 10 | 8 |
| Example 20 | B-7 | W-9 | 10 | 8 |
| Example 21 | B-8 | W-10 | 10.5 | 8.5 |
| Example 22 | B-9 | W-11 | 11 | 9 |
| Example 23 | B-10 | W-12 | 10.5 | 8.5 |

TABLE B-continued

| | Infrared Curable Color-forming Composition | Specific Color-forming Compound | Color-forming Property (ΔL) | |
|---|---|---|---|---|
| | | | Just after Exposure | After 2 Hours Lapse |
| Example 24 | B-11 | W-14 | 10 | 8 |
| Example 25 | B-12 | W-15 | 10 | 8 |
| Example 26 | B-13 | W-19 | 9 | 7 |
| Example 27 | B-14 | W-5 | 9 | 7 |
| Comparative Example 3 | B'-1 | — | 2.5 | 0.5 |
| Comparative Example 4 | B'-2 | — | 5.0 | 3.0 |
| Comparative Example 5 | B'-3 | — | 5.5 | 3.5 |

From the results shown in Table B, it can be seen that the infrared curable color-forming composition film according to the invention exhibits the good color-forming property and the color fading due to aging is small. Also, the color-forming property is improved by making the cured film (comparison of Example 16 with Example 27). The reason for this is not clear in detail, but is believed that by making the cured film the glass transition temperature of the film is increased to stabilize the colored body.

Example 28 to 41 and Comparative Examples 6 to 8

III. Lithographic Printing Plate Precursor of on-press Development Type

III-1. Production of Lithographic Printing Plate Precursors C-1 to C-14

[Production of Support]

An aluminum plate (material: JIS A 1050) having a thickness of 0.3 mm was subjected to a degreasing treatment at 50° C. for 30 seconds using a 10% by weight aqueous sodium aluminate solution in order to remove rolling oil on the surface thereof and then grained the surface of the aluminum plate using three nylon brushes embedded with bundles of nylon bristle having a diameter of 0.3 mm and an aqueous suspension (specific gravity: 1.1 g/cm³) of pumice having a median size of 25 μm, followed by thorough washing with water. The aluminum plate was subjected to etching by immersing in a 25% by weight aqueous sodium hydroxide solution of 45° C. for 9 seconds, washed with water, then immersed in a 20% by weight aqueous nitric acid solution at 60° C. for 20 seconds, and washed with water. The etching amount of the grained surface was about 3 g/m².

Then, using an alternating current of 60 Hz, an electrochemical roughening treatment was continuously carried out on the plate. The electrolytic solution used was a 1% by weight aqueous nitric acid solution (containing 0.5% by weight of aluminum ion) and the temperature of electrolytic solution was 50° C. The electrochemical roughening treatment was conducted using a rectangular alternating current having a trapezoidal waveform such that the time TP necessary for the current value to reach the peak from zero was 0.8 msec and the duty ratio was 1:1, and using a carbon electrode as a counter electrode. A ferrite was used as an auxiliary anode. The current density was 30 A/dm² in terms of the peak value of the electric current, and 5% of the electric current flowing from the electric source was divided to the auxiliary anode. The quantity of electricity in the nitric acid electrolysis was 175 C/dm² in terms of the quantity of electricity when the aluminum plate functioned as an anode. The plate was then washed with water by spraying.

The plate was further subjected to an electrochemical roughening treatment in the same manner as in the nitric acid electrolysis above using as an electrolytic solution, a 0.5% by weight aqueous hydrochloric acid solution (containing 0.5% by weight of aluminum ion) having temperature of 50° C. and under the condition that the quantity of electricity was 50 C/dm² in terms of the quantity of electricity when the aluminum plate functioned as an anode. The plate was then washed with water by spraying.

The aluminum plate was then subjected to an anodizing treatment using as an electrolytic solution, a 15% by weight aqueous sulfuric acid (containing 0.5% by weight of aluminum ion) at a current density of 15 A/dm² to form a direct current anodized film of 2.5 g/m², washed with water and dried to produce Support A.

Thereafter, in order to ensure the hydrophilicity of the non-image area, Support A was subjected to silicate treatment using a 2.5% by weight aqueous sodium silicate No. 3 solution at 60° C. for 10 seconds and then was washed with water to produce Support B. The adhesion amount of Si was 10 mg/m². The center line average roughness (Ra) of Support B was measured using a stylus having a diameter of 2 μm and found to be 0.51 μm.

[Formation of Undercoat Layer]

Coating solution for undercoat layer having the composition shown below was coated on Support B described above so as to have a dry coating amount of 20 mg/m² to form an undercoat layer.

<Coating Solution for Undercoat Layer>

| | |
|---|---|
| Compound (1) for undercoat layer having structure shown below | 0.18 g |
| Hydroxyethyliminodiacetic acid | 0.10 g |
| Methanol | 55.24 g |
| Water | 6.15 g |

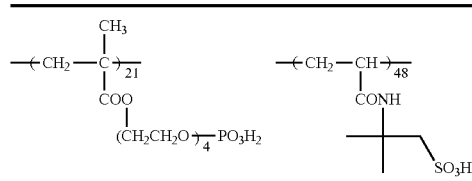

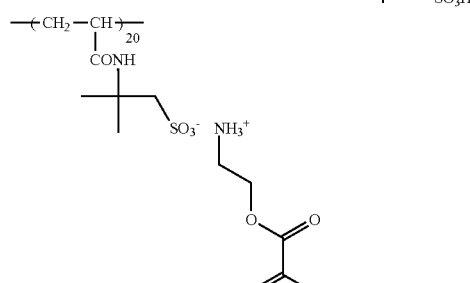

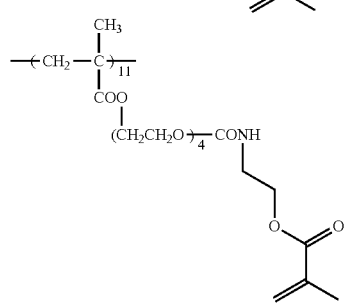

Compound (1) for undercoat layer (Mw: 100,000)

[Formation of Image-recording Layer]

Coating solution (1) for image-recording layer having the composition shown below was coated on the undercoat layer described above by a bar and dried in an oven at 100° C. for 60 seconds to form an image-recording layer having a dry coating amount of 1.0 g/m².

Coating solution (1) for image-recording layer was prepared by mixing Photosensitive solution (1) shown below with the microgel solution shown below just before the coating, followed by stirring.

<Photosensitive Solution (1)>

| | |
|---|---|
| Binder polymer (1) shown above | 0.240 g |
| Specific color-forming compound (compound shown in Table C) | 0.050 g |
| Radical initiator (1) shown above | 0.162 g |
| Polymerizable compound | 0.192 g |
| Tris(acryloyloxyethyl) isocyanurate (NK ESTER A-9300, produced by Shin-Nakamura Chemical Co., Ltd.) | |
| Hydrophilic low molecular weight compound Tris(2-hydroxyethyl) isocyanurate | 0.062 g |
| Hydrophilic low molecular weight compound (1) having structure shown below | 0.050 g |
| Oil-sensitizing agent (Phosphonium compound (1) having structure shown below) | 0.055 g |
| Oil-sensitizing agent Benzyl dimethyl octyl ammonium PF₆ salt | 0.018 g |
| Oil-sensitizing agent (Ammonium group-containing polymer having structure shown below (reduced specific viscosity: 44 ml/g)) | 0.035 g |
| Fluorine-based surfactant (1) shown above | 0.008 g |
| 2-Butanone | 1.091 g |
| 1-Methoxy-2-propanol | 8.609 g |

<Microgel solution>

| | |
|---|---|
| Microgel shown below | 2.640 g |
| Distilled water | 2.425 g |

The structures of Hydrophilic low molecular weight compound (1), Phosphonium compound (1) and Ammonium group-containing polymer, and the preparation method of microgel are shown below.

(1)

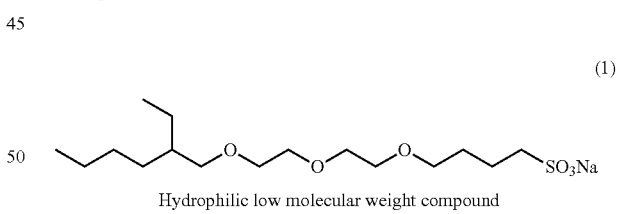

Hydrophilic low molecular weight compound (1)

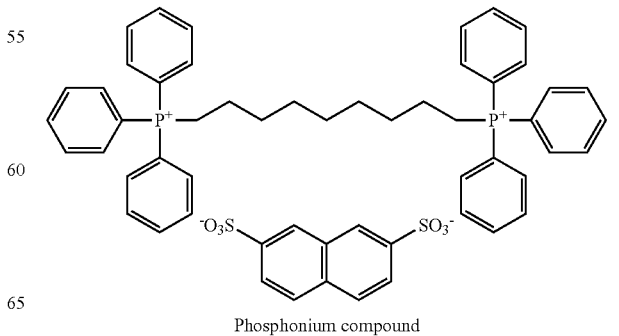

Phosphonium compound

-continued

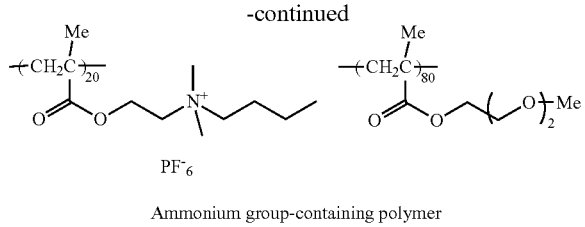

Ammonium group-containing polymer

<Preparation of Microgel>

An oil phase component was prepared by dissolving 10 g of adduct of trimethylolpropane and xylene diisocyanate (TAKENATE D-110N, produced by Mitsui Chemicals Inc.), 3.15 g of pentaerythritol triacrylate (SR444, produced by Nippon Kayaku Co., Ltd.) and 0.1 g of an alkylbenzenesulfonate (PIONIN A-41C, produced by Takemoto Oil & Fat Co., Ltd.) in 17 g of ethyl acetate. As an aqueous phase component, 40 g of an aqueous 4% by weight solution of polyvinyl alcohol (PVA-205, produced by Kuraray Co., Ltd) was prepared. The oil phase component and the aqueous phase component were mixed and the mixture was emulsified using a homogenizer at 12,000 rpm for 10 minutes. The resulting emulsion was added to 25 g of distilled water and stirred at room temperature for 30 minutes and then at 50° C. for 3 hours. The microgel liquid thus-obtained was diluted using distilled water so as to have the solid content concentration of 15% by weight to prepare the microgel. The average particle size of the microgel was measured by a light scattering method and found to be 0.2 μm.

[Formation of Protective Layer]

Coating solution for protective layer having the composition shown below was coated on the image-recording layer described above by a bar and dried in an oven at 120° C. for 60 seconds to form a protective layer having a dry coating amount of 0.15 g/m², thereby producing Lithographic printing plate precursors C-1 to C-14 (for Examples 28 to 41), respectively.

<Coating Solution for Protective Layer>

| | |
|---|---|
| Dispersion of inorganic stratiform compound (1) shown below | 1.5 g |
| Aqueous 6% by weight solution of polyvinyl alcohol (CKS 50, sulfonic acid-modified, saponification degree: 99% by mole or more, polymerization degree: 300, produced by Nippon Synthetic Chemical Industry Co., Ltd.) | 0.55 g |
| Aqueous 6% by weight solution of polyvinyl alcohol (PVA-405, saponification degree: 81.5% by mole, polymerization degree: 500, produced by Kuraray Co., Ltd.) | 0.03 g |
| Aqueous 1% by weight solution of surfactant (EMALEX 710, produced by Nihon Emulsion Co., Ltd.) | 0.86 g |
| Ion-exchanged water | 6.0 g |

<Preparation of Dispersion of Inorganic Stratiform Compound (1)>

To 193.6 g of ion-exchanged water was added 6.4 g of synthetic mica (SOMASIF ME-100, produced by CO—OP Chemical Co., Ltd.) and the mixture was dispersed using a homogenizer until an average particle size (according to a laser scattering method) became 3 μm. The aspect ratio of the particle thus-dispersed was 100 or more.

III-2. Production of Lithographic Printing Plate Precursor C'-1

Lithographic printing plate precursor C'-1 (for Comparative Example 6) was produced in the same manner as in Lithographic printing plate precursor C-1 except for changing Photosensitive solution (1) to Photosensitive solution (2) shown below.

<Photosensitive Solution (2)>

| | |
|---|---|
| Binder polymer (1) shown above | 0.240 g |
| Infrared absorbing dye (1) shown above | 0.030 g |
| Radical initiator (1) shown above | 0.162 g |
| Polymerizable compound | 0.192 g |
| Tris(acryloyloxyethyl) isocyanurate (NK ESTER A-9300, produced by Shin-Nakamura Chemical Co., Ltd.) | |
| Hydrophilic low molecular weight compound Tris(2-hydroxyethyl) isocyanurate | 0.062 g |
| Hydrophilic low molecular weight compound (1) shown above | 0.050 g |
| Oil-sensitizing agent (Phosphonium compound (1) shown above) | 0.055 g |
| Oil-sensitizing agent Benzyl dimethyl octyl ammonium PF$_6$ salt | 0.018 g |
| Oil-sensitizing agent (Ammonium group-containing polymer shown above) | 0.035 g |
| Fluorine-based surfactant (1) shown above | 0.008 g |
| 2-Butanone | 1.091 g |
| 1-Methoxy-2-propanol | 8.609 g |

III-3. Production of Lithographic Printing Plate Precursor C'-2

Lithographic printing plate precursor C'-2 (for Comparative Example 7) was produced in the same manner as in Lithographic printing plate precursor C-1 except for changing Photosensitive solution (1) to Photosensitive solution (3) shown below.

<Photosensitive Solution (3)>

| | |
|---|---|
| Binder polymer (1) shown above | 0.240 g |
| Infrared absorbing dye (1) shown above | 0.030 g |
| Thermochromic compound (1) shown above | 0.160 g |
| Radical initiator (1) shown above | 0.162 g |
| Polymerizable compound | 0.192 g |
| Tris(acryloyloxyethyl) isocyanurate (NK ESTER A-9300, produced by Shin-Nakamura Chemical Co., Ltd.) | |
| Hydrophilic low molecular weight compound Tris(2-hydroxyethyl) isocyanurate | 0.062 g |
| Hydrophilic low molecular weight compound (1) shown above | 0.050 g |
| Oil-sensitizing agent (Phosphonium compound (1) shown above) | 0.055 g |
| Oil-sensitizing agent Benzyl dimethyl octyl ammonium PF$_6$ salt | 0.018 g |
| Oil-sensitizing agent (Ammonium group-containing polymer shown above) | 0.035 g |
| Fluorine-based surfactant (1) shown above | 0.008 g |
| 2-Butanone | 1.091 g |
| 1-Methoxy-2-propanol | 8.609 g |

III-4. Production of Lithographic printing plate precursor C'-3

Lithographic printing plate precursor C'-3 (for Comparative Example 8) was produced in the same manner as in Lithographic printing plate precursor C-1 except for changing Photosensitive solution (1) to Photosensitive solution (2) and changing the microgel in the microgel solution to Comparative color-forming agent aqueous dispersion (1).

IV-5. Evaluation of Lithographic Printing Plate Precursor (i) Color-forming Property The lithographic printing plate precursor produced was exposed by TRENDSETTER 3244VX (produced by Creo Co.) equipped with a water-cooled 40 W infrared semiconductor laser under the conditions of output of 11.7 W, a rotational number of an external drum of 250 rpm and resolution of 2,400 dpi.

The color formation were measured just after the exposure and at 2 hours lapse after the exposure kept in a dark place under room temperature condition. Also, the lithographic printing plate precursor was subjected to the forced aging under conditions of temperature of 60° C. and humidity of 70% RH for 3 days, and the color formation thereof just after the exposure was measured. The color formation was measured in the same manner as in the infrared sensitive color-forming composition film described above. As the value of ΔL is larger, it is meant that the color-forming property is more excellent. The results are shown in Table C.

(ii) On-press Development Property

The lithographic printing plate precursor produced was exposed by LUXEL PLATESETTER T-6000III equipped with an infrared semiconductor laser (produced by Fujifilm Corp.) under the conditions of a rotational number of an external drum of 1,000 rpm, laser output of 70% and resolution of 2,400 dpi. The exposed image contained a solid image and a 50% halftone dot chart of a 20 μm-dot FM screen.

The exposed lithographic printing plate precursor was mounted without undergoing development processing on a plate cylinder of a printing machine (LITHRONE 26, produced by Komori Corp.). Using dampening water (ECOLITY-2 (produced by Fujifilm Corp.)/tap water=2/98 (by volume ratio)) and SPACE COLOR FUSION-G (N) Black Ink (produced by DIC Graphics Corp.), the dampening water and ink were supplied according to the standard automatic printing start method of LITHRONE 26, and printing was performed on 100 sheets of TOKUBISHI art paper (76.5 kg) at a printing speed of 10,000 sheets per hour. A number of the printing papers required until the on-press development of the unexposed area of the image-recording layer on the printing machine was completed to reach a state where the ink was not transferred to the printing paper in the non-image area was measured to evaluate the on-press development property. The results are shown in Table C.

(iii) Printing Durability

After performing the evaluation for the on-press development property described above, the printing was continued. As the increase in a number of printing papers, the image-recording layer was gradually abraded to cause decrease in the ink density on a printed material. A number of printed materials wherein a value obtained by measuring a halftone dot area rate of the 50% halftone dot of FM screen on the printed material using a Gretag densitometer decreased by 5% from the value measured on the 100th paper of the printing was determined. The number of printed materials of the lithographic printing plate obtained in Comparative Example 6 was taken as 100 and the numbers of printed materials of other lithographic printing plates were relatively evaluated. As the value is larger, it is meant that the printing durability is more excellent. The results are shown in Table C.

TABLE C

|  | Lithographic Printing Plate Precursor | Specific Color-forming Compound | Color-forming Property (ΔL) | | | On-press Development Property (sheets) | Printing Durability |
| --- | --- | --- | --- | --- | --- | --- | --- |
|  |  |  | Just after Exposure | After 2 Hours Lapse | After Forced Aging |  |  |
| Example 28 | C-1 | W-1 | 11 | 9 | 10 | 30 | 100 |
| Example 29 | C-2 | W-4 | 12 | 10 | 11 | 30 | 100 |
| Example 30 | C-3 | W-5 | 12 | 10 | 11 | 30 | 100 |
| Example 31 | C-4 | W-6 | 11.5 | 9.5 | 10.5 | 30 | 100 |
| Example 32 | C-5 | W-7 | 11 | 9 | 10 | 30 | 100 |
| Example 33 | C-6 | W-8 | 10 | 8 | 9.0 | 30 | 100 |
| Example 34 | C-7 | W-9 | 10 | 8 | 9.0 | 30 | 100 |
| Example 35 | C-8 | W-10 | 10.5 | 8.5 | 9.5 | 30 | 100 |
| Example 36 | C-9 | W-11 | 11 | 9 | 10 | 30 | 100 |
| Example 37 | C-10 | W-12 | 10.5 | 8.5 | 9.5 | 30 | 100 |
| Example 38 | C-11 | W-14 | 10 | 8 | 9.0 | 30 | 100 |
| Example 39 | C-12 | W-15 | 10 | 8 | 9.0 | 30 | 100 |
| Example 40 | C-13 | W-19 | 9 | 7 | 8.0 | 30 | 100 |
| Example 41 | C-14 | W-5 | 8.0 | 6.0 | 7.0 | 30 | 100 |
| Comparative Example 6 | C'-1 | — | 2.5 | 0.5 | 2.0 | 30 | 100 |
| Comparative Example 7 | C'-2 | — | 5.0 | 3.0 | 2.0 | 55 | 80 |
| Comparative Example 8 | C'-3 | — | 5.5 | 3.5 | 3.0 | 50 | 90 |

From the results shown in Table C, it can be seen that the lithographic printing plate precursor according to the invention exhibits the excellent color-forming property, and the high color formation is maintained even with the aging after the exposure. Also, the lithographic printing plate precursor according to the invention has the good preservation stability, and the high color formation is obtained even when the lithographic printing plate precursor is exposed after the forced aging. Further, the lithographic printing plate precursor according to the invention is also excellent in the on-press development property and can provide the lithographic printing plate having the good printing durability.

INDUSTRIAL APPLICABILITY

According to the invention, a light-sensitive color-forming composition and a curable color-forming composition each of which forms color at a high density by exposure with an infrared laser and has a small fading due to aging can be provided.

Also, according to the invention, a lithographic printing plate precursor which contains the curable color-forming composition in the image-recording layer, is extremely excellent in the plate inspection property, has good preservation stability and maintains a high color-forming property, is excellent in the on-press development property, and provides a lithographic printing plate having a good printing durability can be provided.

Further, according to the invention, a plate making method of producing a lithographic printing plate using the lithographic printing plate precursor described above can be provided.

Although the invention has been described in detail and by reference to specific embodiments, it is apparent to those skilled in the art that it is possible to add various alterations and modifications insofar as the alterations and modifications do not deviate from the spirit and the scope of the invention.

This application is based on a Japanese patent application filed on Feb. 27, 2013 (Japanese Patent Application No. 2013-37965), and the contents thereof are incorporated herein by reference.

The invention claimed is:

1. An infrared sensitive color-forming composition comprising: (A) a compound having an infrared absorbing skeleton and a thermochromic skeleton in a molecule thereof wherein the infrared absorbing skeleton and the thermochromic skeleton are connected with a covalent bond or an ionic bond; and (B) a binder, wherein the infrared absorbing skeleton is a cyanine dye residue represented by the following formula (3):

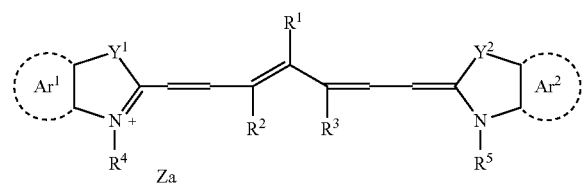

(3)

wherein, in the formula (3), $R^1$ represents a hydrogen atom, a halogen atom, $-OR^{10}$, $-N(R^{11})(R^{12})$ or $-SR^{13}$, $R^{10}$ and $R^{13}$ each represents an alkyl group or an aryl group, $R^{11}$ and $R^{12}$ each represents a hydrogen atom, an alkyl group or an aryl group, or $R^{11}$ and $R^{12}$ may be combined with each other to form a ring, $R^2$ and $R^3$ each represents a hydrogen atom or an alkyl group, or $R^2$ and $R^3$ may be combined with each other to form a ring, $Ar^1$ and $Ar^2$ each represents an atomic group necessary for forming a benzene ring or a naphthalene ring, $Y^1$ and $Y^2$ each represents a sulfur atom or a dialkylmethylene group, $R^4$ and $R^5$ each represents an alkyl group, Za represents a counter ion for neutralizing an electric charge, and the cyanine dye residue is connected to the thermochromic skeleton in $R^1$.

2. The infrared sensitive color-forming composition as claimed in claim 1, wherein the compound is represented by the following formula (1-1):

A-B1-C1 (1-1)

wherein, in the formula (1-1), A represents a thermochromic skeleton, B1 represents a single bond or a connecting group, and C1 represents an infrared absorbing skeleton.

3. The infrared sensitive color-forming composition as claimed in claim 1, wherein the thermochromic skeleton has a structure represented by the following formula (4):

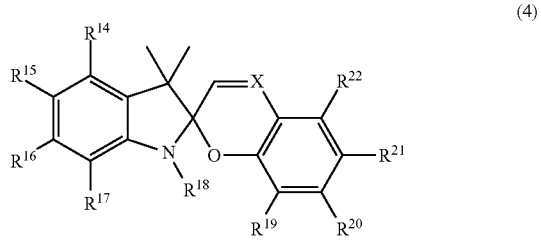

(4)

wherein, in the formula (4), $R^{14}$ to $R^{22}$ each represents a hydrogen atom, a halogen atom, an alkyl group, an aryl group, $-OR^{23}$, $-NR^{24}R^{25}$, $-SR^{26}$ or a nitro group, or any adjacent two of $R^{14}$ to $R^{22}$ may be combined with each other to form a ring, $R^{23}$, $R^{24}$, $R^{25}$ and $R^{26}$ each represents a hydrogen atom or an alkyl group, or $R^{24}$ and $R^{25}$ may be combined with each other to form a ring, X represents a carbon atom or a nitrogen atom, and the thermochromic skeleton is connected to the infrared absorbing skeleton in any of $R^{18}$, $R^{20}$ and $R^{22}$.

4. The infrared sensitive color-forming composition as claimed in claim 3, wherein the thermochromic skeleton has a structure represented by the following formula (5):

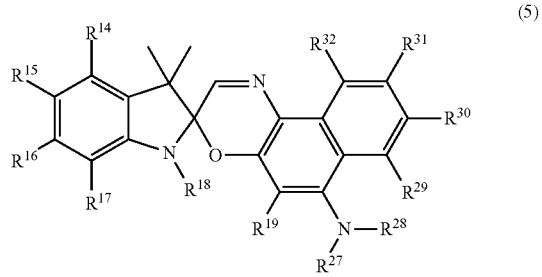

(5)

wherein, in the formula (5), $R^{14}$ to $R^{19}$ each represents a hydrogen atom, a halogen atom, an alkyl group, an aryl group, $-OR^{23}$, $-NR^{24}R^{25}$, $-SR^{26}$ or a nitro group, or any adjacent two of $R^{14}$ to $R^{19}$ may be combined with each other to form a ring, $R^{23}$, $R^{24}$, $R^{25}$ and $R^{26}$ each represents a hydrogen atom or an alkyl group, or $R^{24}$ and $R^{25}$ may be combined with each other to form a ring, X represents a carbon atom or a nitrogen atom, $R^{27}$ and $R^{28}$ each represents an alkyl group or an aryl group, or $R^{27}$ and $R^{28}$ may be combined with each other to form a ring, $R^{29}$ to $R^{32}$ each represents a hydrogen atom, a halogen atom, an alkyl group, an aryl group, $-OR^{23}$, $-NR^{24}R^{25}$ or $-SR^{26}$, and the thermochromic skeleton is connected to the infrared absorbing skeleton in any of $R^{27}$, $R^{28}$ and $R^{31}$.

5. The infrared sensitive color-forming composition as claimed in claim 1, wherein the compound is a compound represented by the following formula (6-1), (6-2) or (6-3):

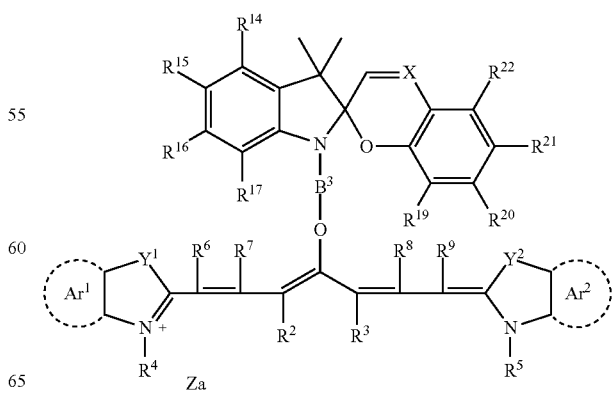

(6-1)

(6-2)

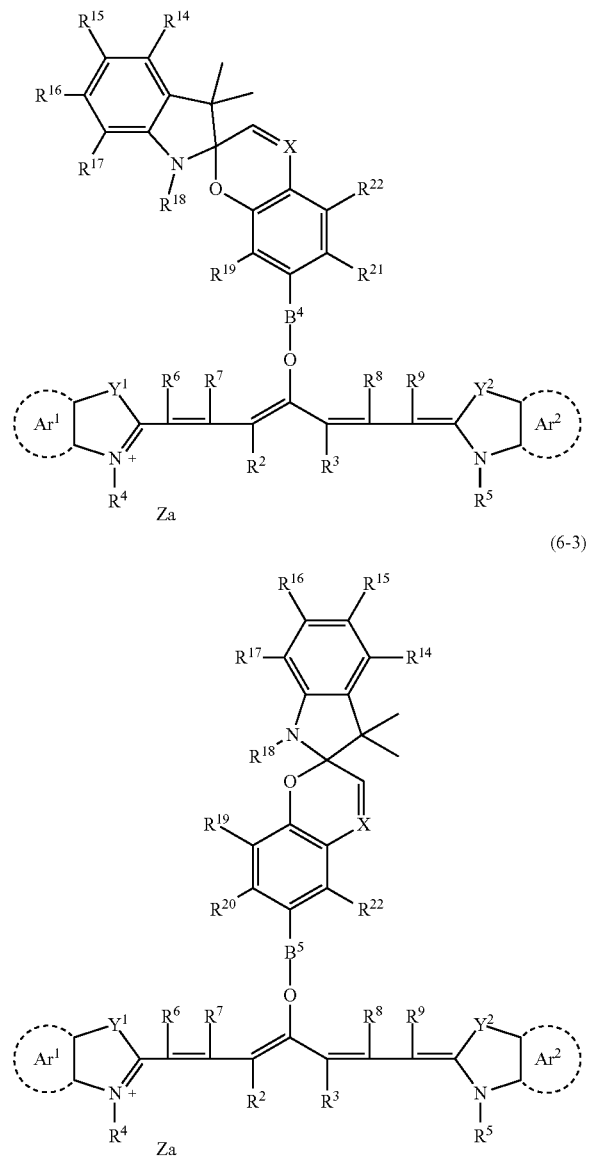

(6-3)

(6-4)

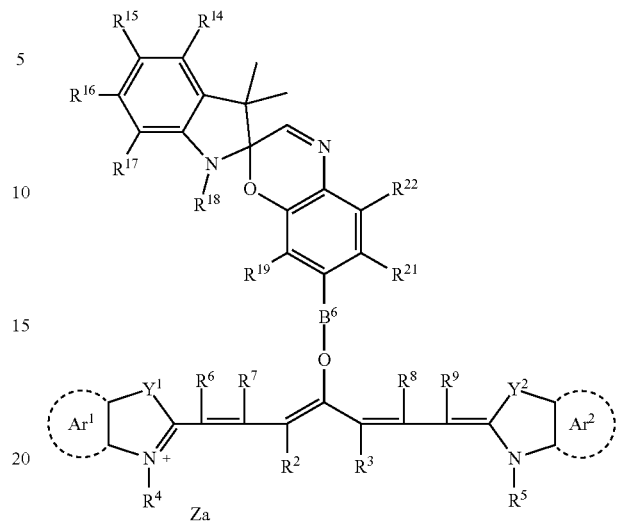

wherein, in the formula (6-4), $R^2$ and $R^3$ each represents an alkyl group, or $R^2$ and $R^3$ may be combined with each other to form a ring, $Ar^1$ and $Ar^2$ each represents an atomic group necessary for forming a benzene ring or a naphthalene ring, $Y^1$ and $Y^2$ each represents a sulfur atom or a dialkylmethylene group, $R^4$ and $R^5$ each represents an alkyl group, $R^6$, $R^7$, $R^8$ and $R^9$ each represents a hydrogen atom or an alkyl group, Za represents a counter ion for neutralizing an electric charge, $B^6$ represents an alkylene group having 10 or less carbon atoms, which may contain a nitrogen atom, $R^{14}$ to $R^{19}$ and $R^{21}$ to $R^{22}$ each represents a hydrogen atom, a halogen atom, an alkyl group, an aryl group, $-OR^{23}$, $-NR^{24}R^{25}$, $-SR^{26}$ or a nitro group, or any adjacent two of $R^{14}$ to $R^{19}$ and $R^{21}$ to $R^{22}$ may be combined with each other to form a ring, and $R^{23}$, $R^{24}$, $R^{25}$ and $R^{26}$ each represents a hydrogen atom or an alkyl group, or $R^{24}$ and $R^{25}$ may be combined with each other to form a ring.

7. The infrared sensitive color-forming composition as claimed in claim 1, wherein the compound (A) is a compound represented by the following formula (1-1):

A-B1-C1 (1-1)

wherein A is a thermochromic skeleton, B1 is a single bond or a connecting group, and C1 is an infrared absorbing skeleton, wherein the connecting group B1 is selected from the following structures:

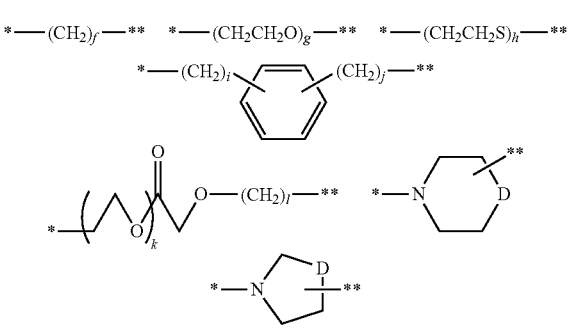

wherein

* represents a site which connects to the thermochomic skeleton, wherein, in the formulae (6-1), (6-2) and (6-3), $R^2$ and $R^3$ each represents an alkyl group, or $R^2$ and $R^3$ may be combined with each other to form a ring, $Ar^1$ and $Ar^2$ each represents an atomic group necessary for forming a benzene ring or a naphthalene ring, $Y^1$ and $Y^2$ each represents a sulfur atom or a dialkylmethylene group, $R^4$ and $R^5$ each represents an alkyl group, $R^6$, $R^7$, $R^8$ and $R^9$ each represents a hydrogen atom or an alkyl group, Za represents a counter ion for neutralizing an electric charge, $B^3$, $B^4$ and $B^5$ each represents a single bond or a connecting group, $R^{14}$ to $R^{22}$ each represents a hydrogen atom, a halogen atom, an alkyl group, an aryl group, $-OR^{23}$, $-NR^{24}R^{25}$, $-SR^{26}$ or a nitro group, or any adjacent two of $R^{14}$ to $R^{22}$ may be combined with each other to form a ring, $R^{23}$, $R^{24}$, $R^{25}$ and $R^{26}$ each represents a hydrogen atom or an alkyl group, or $R^{24}$ and $R^{25}$ may be combined with each other to form a ring, and X represents a carbon atom or a nitrogen atom.

6. The infrared sensitive color-forming composition as claimed in claim 5, wherein the compound is a compound represented by the following formula (6-4):

represents a site which connects to the infrared absorbing skeleton, f, g and h each represents an integer from 1 to 6, i, j, k and l each represents an integer from 0 to 6, D represents —N(Ra)—, —O—, —S— or —C(Rb)(Rc)-, and Ra, Rb and Rc each represents a hydrogen atom or an alkyl group; and the infrared absorbing skeleton C1 is a cyanine dye of formula (3) as set forth in claim 1**.

* * * * *